United States Patent

Clark, IV et al.

[15] 3,651,483

[45] Mar. 21, 1972

[54] METHOD AND MEANS FOR SEARCHING A COMPRESSED INDEX

[72] Inventors: William A. Clark, IV, Poughkeepsie, N.Y.; Kent A. Salmond, Los Gatos, Calif.; Thomas S. Stafford, Boca Raton, Fla.

[73] Assignee: International Business Machines Corporation, Armonk, N.Y.

[22] Filed: Jan. 3, 1969

[21] Appl. No.: 788,835

[52] U.S. Cl. .......... 340/172.5

[51] Int. Cl. .......... G06f 7/10

[58] Field of Search .......... 340/172.5; 235/157, 154; 178/6

[56] References Cited

UNITED STATES PATENTS

| | | | |
|---|---|---|---|
| 3,030,609 | 4/1962 | Albrecht | 340/172.5 |
| 3,242,470 | 3/1966 | Hagelbarger et al. | 340/172.5 |
| 3,275,989 | 9/1966 | Glaser et al. | 340/172.5 |
| 3,295,102 | 12/1966 | Neilson | 340/172.5 |
| 3,448,436 | 6/1969 | Machol, Jr. | 340/172.5 |

*Primary Examiner*—Paul J. Henon
*Assistant Examiner*—Harvey E. Springborn
*Attorney*—Hanifin and Jancin and Bernard M. Goldman

[57] ABSTRACT

Electronically searching a Compressed Index for a representation of a search argument (SA). The index comprises a sequence of compressed keys (CK's) generated with the method in patent application Ser. No. 788,807, in which the sequence of compressed keys represents a sorted sequence of uncompressed keys, and each compressed key (CK) has the FLK format as defined therein. As ascending sorted index is assumed for the described embodiments. An Equal Counter is used during the search to represent which byte (called A-byte) of the SA is being searched for. The A bytes are handled one byte at a time beginning with the highest order byte in the SA. The counter is initially set to reflect this beginning and it is incremented each time the A-byte compares equal with one of the key bytes (called K byte) in a current CK being searched.

Electronic means compares the Equal-Counter setting, $E_c$, with a factor-byte count, F, the latter being obtained from the F field in a CK. If $E_c$ is greater than F, the search is completed. If $E_c$ is less than F, the search continues using the next sequential CK in the compressed index. But, if $E_c$ is equal to F, the highest order K-byte in the current CK is compared against the current A-byte. If K<A, the search also continues using the next sequential CK. But if K>A, the search of the compressed index ends with the current CK. However, if K=A, the Equal Counter is incremented as indicated previously, the next lower order A-byte being obtained from the SA, and the next lower order K-byte being obtained from the current CK. These next A- and K-bytes are then compared; and if they are equal, the process is repeated until the last K-byte in the current CK has been found equal to an A-byte. If no A-byte remains in the SA for comparison to a remaining K-byte, the search of the compressed index is completed. If uncompared A-bytes remain in the SA, and no K-bytes remain uncompared in the current CK, the search continues using the next sequential CK.

Whenever the search ends at a CK, that CK is expected to represent the SA. A pointer associated with that CK is readout as part of the search ending operation. A data item addressed by that pointer is obtained, and the SA is verified against the data item to assure that the SA also represents the retrieved data item.

52 Claims, 41 Drawing Figures

INVENTORS
WILLIAM A. CLARK, IV
KENT A. SALMOND
THOMAS S. STAFFORD

BY Bernard M. Goldman
ATTORNEY

NOR-LATCH

LEGEND

INPUT = 0 OR 1
0 = DOWN LEVEL SIGNAL
1 = UP LEVEL SIGNAL
$\overline{\text{INGATE}}$ = 0
RESET = 0

NOR TRUTH TABLE

| INPUT-1 | INPUT-2 | OUTPUT-3 |
|---|---|---|
| 0 | 0 | 1 |
| 1 | 0 | 0 |
| 0 | 1 | 0 |
| 1 | 1 | 0 |

FIG. 4 DATA FLOW CONTROLS
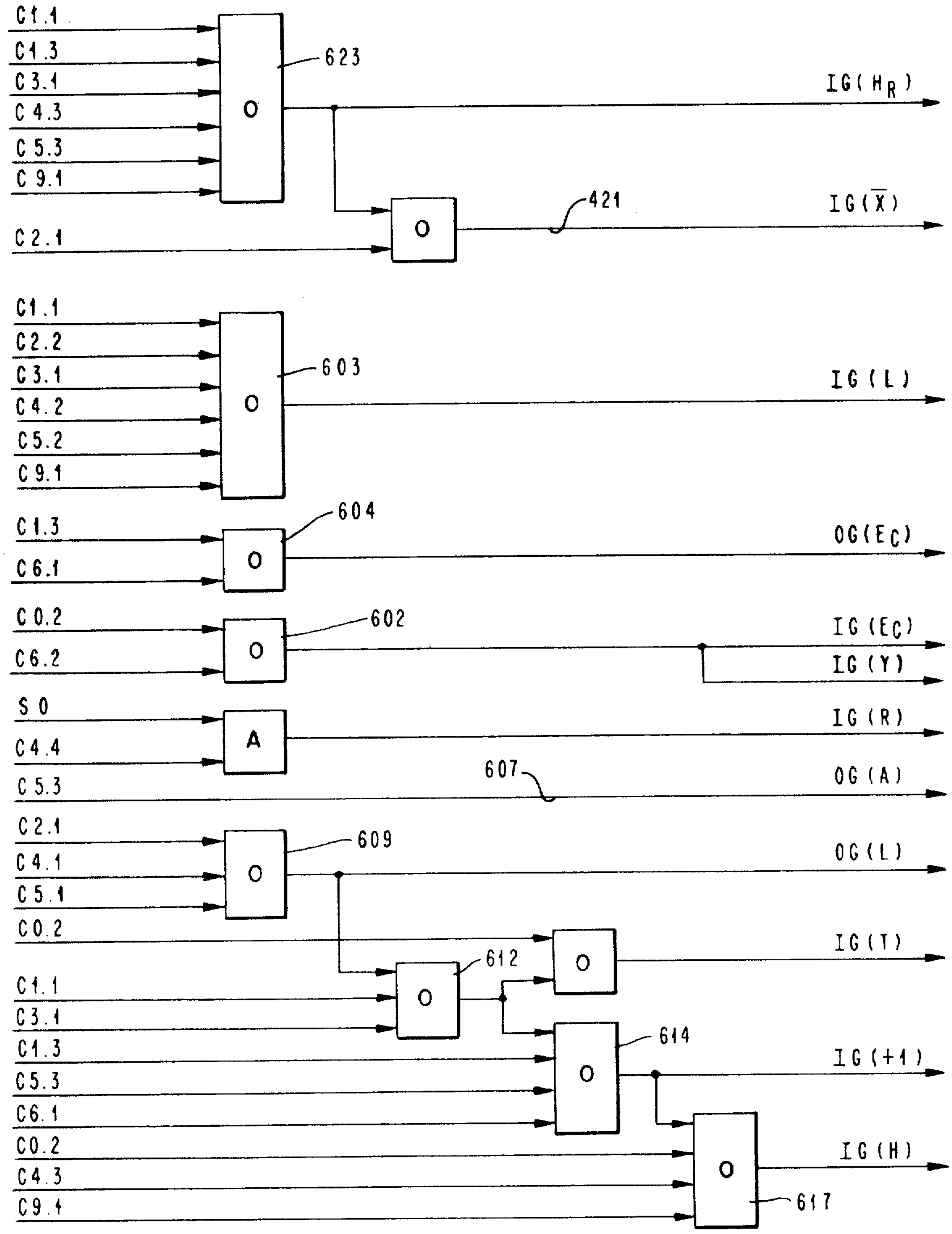

FIG. 5 BRANCHING MATRIX & STATUS LATCH CONTROLS
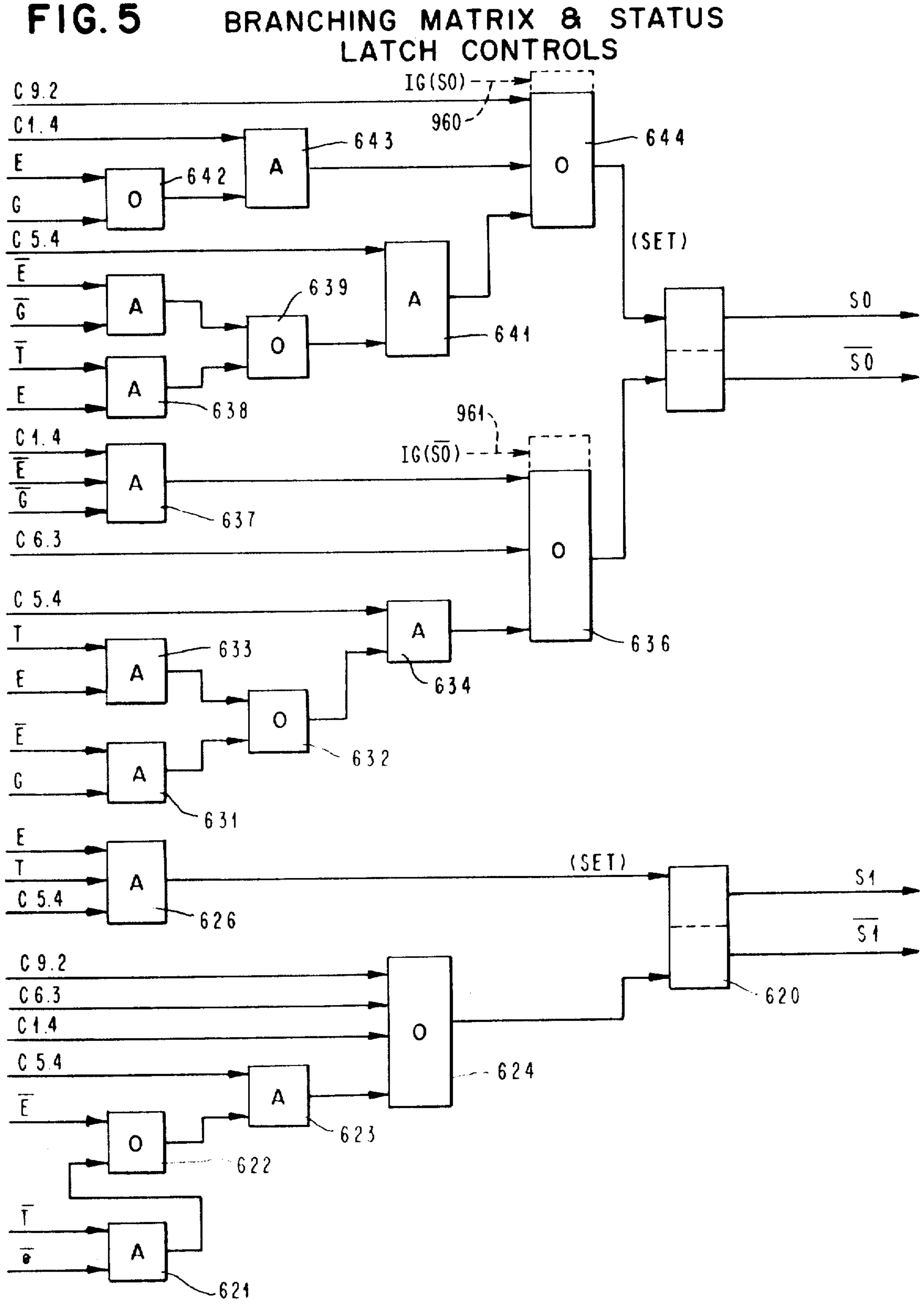

FIG. 6A CLOCK-STARTING CONTROLS
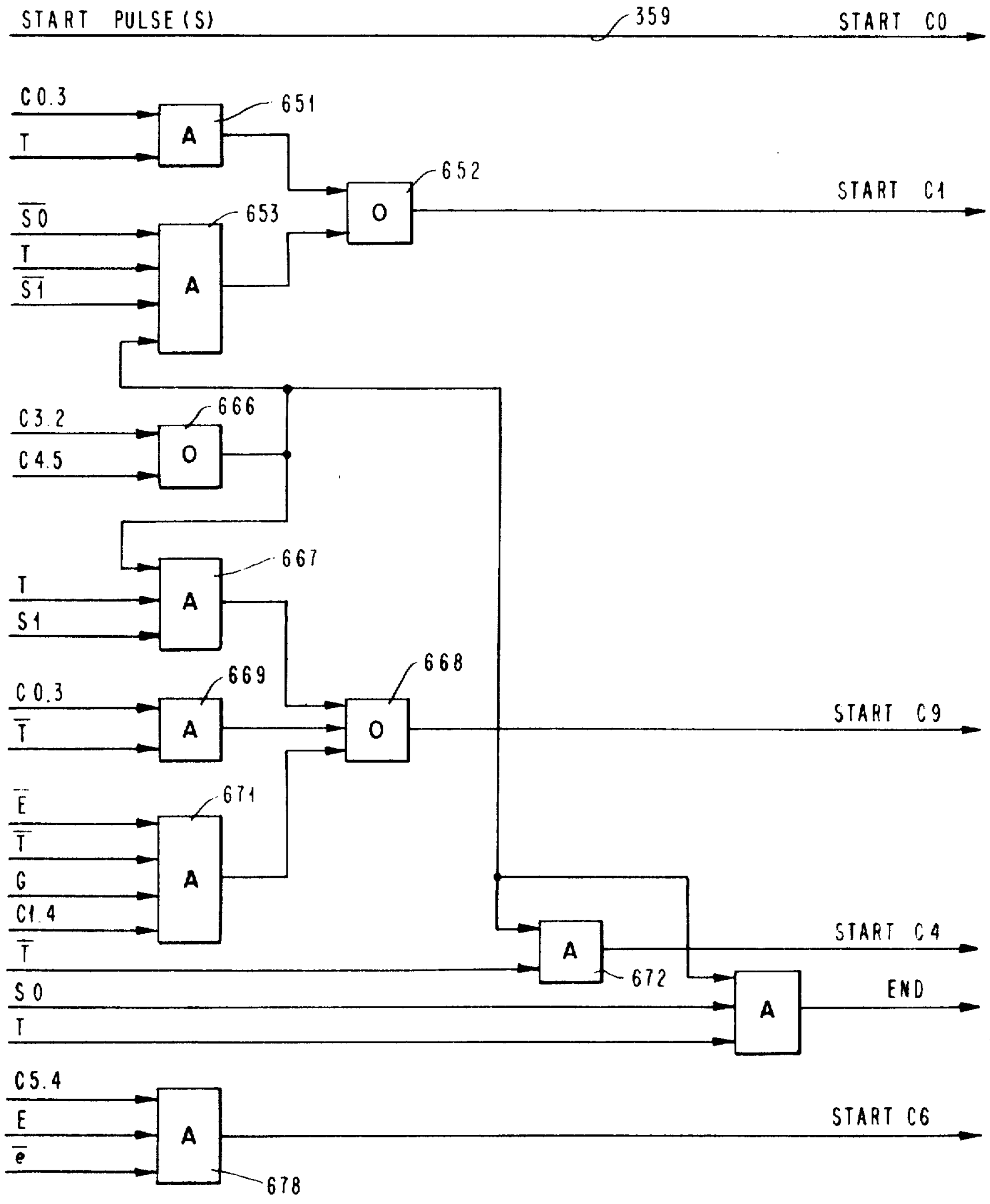

CLOCK-STARTING CONTROLS

CLOCK CIRCUITS

FIG. 8A

SEARCH MODE

CLOCKED DATA TRANSFERS

| CLOCK CYCLE | CLOCK PHASE | TRANSFER CONTROL |
|---|---|---|
| C0 | .1 | START: RESET ALL CIRCUITS. |
| | .2 | IG(Y); IG(A); IG(e); IG(H); IG($E_c$); IG(T). |
| | .3 | BM(T) - C1.1 |
| | | BM($\overline{T}$&e) - IG(S1) - C9.1 |
| C1 | .1 | IG($\overline{X}$); IG($H_R$); IG(+1); IG(H); IG(L); IG(T). |
| | .2 | Drop IG($\overline{X}$). |
| | .3 | IG($\overline{X}$); IG($H_R$); IG(+1); OG($E_c$); IG(H). |
| | .4 | BM($\overline{E}$&$\overline{G}$) -- IG($\overline{SO}$&$\overline{ST}$). |
| | | BM(E+G) -- IG(SO&$\overline{ST}$). |
| | | (1) BM ($\overline{E}$&$\overline{G}$&T) - C3.1 - (C3/7/11) |
| | | (2) BM ($\overline{E}$&$\overline{G}$&$\overline{T}$) - C2.1 - (C2/10) |
| | | (3) BM (E&$\overline{T}$) --- C5.1 |
| | | (4) BM (E&T) --- C11.1 - (C3/7/11) |
| | | (5) BM (G&$\overline{E}$&$\overline{T}$) - C10.1 - (C2/10) |
| | | (6) BM (G&$\overline{E}$&T) - C11.1 - (C3/7/11). |
| C2/10 | .1 | OG(L); IG(+1); IG(H); IG(T); IG($\overline{X}$). |
| | .2 | IG(L). |
| | .3 | BM ($\overline{T}$) - C2.1 - (C2/10) |
| | | BM (T) - C3.1 - (C3/7/11) |
| | | BM ($\overline{T}$) - C10.1 - (C2/10) |
| | | BM (T) - C11.1 - (C3/7/11) |

FIG. 8B

SEARCH MODE
CLOCKED DATA TRANSFERS

| CLOCK CYCLE | CLOCK PHASE | TRANSFER CONTROL |
|---|---|---|
| C3/7/11 | .1 | IG($\overline{X}$); IG(+1); IG($H_R$); IG(H); |
| | | IG(T); IG(L). |
| | .2 | BM($\overline{T}$) -------- 4.1 - (C4/8/12) |
| | | BM (T&$\overline{SO}$&$\overline{ST}$) - C1.1 |
| | | BM (T) ------ C9.1 |
| | | BM ($\overline{T}$&S1) ---- C8.1 - (C4/8/12) |
| | | BM (T&SO) ---- END |
| | | BM ($\overline{T}$) ------- C12.1 - (C4/8/12) |
| C4/8/12 | .1 | OG(L); IG(+1); IG(H); IG(T). |
| | .2 | IG(L). |
| | .3 | IG($H_R$); IG(H); IG($\overline{X}$). |
| | .4 | SO ----- IG(R). |
| | .5 | BM ($\overline{T}$) -------- C4.1 - (C4/8/12) |
| | | BM (T&$\overline{SO}$&$\overline{ST}$) -- C1.1 |
| | | BM ($\overline{T}$) -------- C8.1 - (C4/8/12) |
| | | BM (T&S1) ----- C9.1 |
| | | BM (T&SO) ----- END |
| | | BM ($\overline{T}$) -------- C12.1 - (C4/8/12) |
| C5 | .1 | OG(L); IG(+1);IG(H); IG(T). |
| | .2 | IG(L). |
| | .3 | IG($H_R$); IG(+1); IG($\overline{X}$); OG(A); IG(H). |
| | .4 | BM (E&$\overline{T}$+$\overline{E}$&$\overline{G}$) IG(SO) |
| | | BM (E&T) ---- IG(S1) |
| | | BM ($\overline{E}$+$\overline{e}$&$\overline{T}$) -- IG(S1) |
| | | BM (G&$\overline{E}$+E&T)- IG(SO). |

FIG. 8C

SEARCH MODE
CLOCKED DATA TRANSFERS

| CLOCK CYCLE | CLOCK PHASE | TRANSFER CONTROL |
|---|---|---|
| | | (6) BM (G&E&T) -- C3.1 - LG ($\overline{SO}$, $\overline{ST}$) |
| | | (7) BM (G&$\overline{E}$&$\overline{T}$) -- C2.1 - IG ($\overline{SO}$, $\overline{ST}$) |
| | | (8) BM (E&e) - C6.1 |
| | | (9) BM E&$\overline{e}$&T)- 7.1 - IG(S1) |
| | | (10) BM ($\overline{E}$&$\overline{G}$&T)- C11.1 - IG(SO) |
| | | (11) BM (E&$\overline{e}$&$\overline{T}$)- C10.1 - IG(SO) |
| | | (12) BM ($\overline{E}$&$\overline{G}$&$\overline{T}$)- C10.1 - IG(SO) |
| | | (13) BM (G&$\overline{E}$&T)- C3.1 |
| | | (14) BM (E&e&T) - C3.1 |
| | | (15) BM (E&e&$\overline{T}$) - C5.1 |
| C6 | .1 | OG($E_c$); IG(+1); IG(H). |
| | .2 | IG($E_c$); IG(Y); IG(A). |
| | .3 | BM(T) --- C5 |
| | | BM($\overline{T}$) --- C3-IG($\overline{SO}$,$\overline{ST}$). |
| C9 | .1 | IG($\overline{X}$); IG($H_R$); IG(H); IG(L). |
| | .2 | BM [IG (SO,$\overline{ST}$)] --- C2/10 |

SEARCH CLOCK SEQUENCING

CLOCK SEQUENCES DURING LATCH STATES

FIG. 15A

| KEY NO | UK FIELD 1 | 2 | 3 | 4 | 5 | 6 | 7 | 8 | 9 | 10 | 11 | 12 | 13 | 14 | Fn | Fx | L | POINTER FIELD 1 | 2 | 3 | 4 | 5 | 6 |
|---|---|---|---|---|---|---|---|---|---|---|---|---|---|---|---|---|---|---|---|---|---|---|---|
| 0 | B | B | B | B | B | B | B | B | B | B | B | B | B | B | 0 | 0 | 5 | R | R | R | R | R | R |
| 1 | B | B | B | B | D | B | B | B | B | B | B | B | B | B | 5 | 5 | 2 | R | R | R | R | R | R |
| 2 | B | B | B | B | B | B | D | B | B | B | B | B | B | B | 7 | 7 | 3 | R | R | R | R | R | R |
| 3 | B | B | B | B | B | B | B | B | B | D | B | B | B | B | 10 | 10 | 2 | R | R | R | R | R | R |
| 4 | B | B | B | B | B | B | B | B | B | B | B | D | B | B | 12 | 12 | 1 | R | R | R | R | R | R |
| 5 | B | B | B | B | B | B | B | B | B | B | B | B | D | B | 10 | 13 | 0 | R | R | R | R | R | R |
| 6 | B | B | B | B | B | B | B | B | B | D | B | B | B | B | 8 | 9 | 0 | R | R | R | R | R | R |
| 7 | B | B | B | B | B | B | B | D | B | B | B | B | B | B | 7 | 7 | 0 | R | R | R | R | R | R |
| 8 | B | B | B | B | B | B | D | B | B | B | B | B | B | B | 3 | 6 | 0 | R | R | R | R | R | R |
| 9 | B | B | D | B | B | B | B | B | B | B | B | B | B | B | 2 | 2 | 1 | R | R | R | R | R | R |
| 10 | B | B | D | B | B | B | B | B | B | B | B | B | B | B | 3 | 3 | 0 | R | R | R | R | R | R |
| 11 | B | B | D | B | B | B | B | B | B | B | B | B | B | B | 2 | 2 | 1 | R | R | R | R | R | R |
| 12 | B | B | D | B | B | B | B | B | B | B | B | B | B | B | 3 | 3 | 0 | R | R | R | R | R | R |
| 13 | B | B | D | B | B | B | B | B | B | B | B | B | B | B | 2 | 2 | 1 | R | R | R | R | R | R |
| 14 | B | B | D | B | B | B | B | B | B | B | B | B | B | B | 3 | 3 | 4 | R | R | R | R | R | R |
| 15 | B | B | B | B | B | B | D | B | B | B | B | B | B | B | 5 | 7 | 0 | R | R | R | R | R | R |
| 16 | B | B | B | B | D | B | B | B | B | B | B | B | B | B | 4 | 4 | 5 | R | R | R | R | R | R |
| 17 | B | B | B | B | B | B | B | B | D | B | B | B | B | B | 6 | 9 | 0 | R | R | R | R | R | R |
| 18 | B | B | B | B | B | D | B | B | B | B | B | B | B | B | 5 | 5 | 1 | R | R | R | R | R | R |
| 19 | B | B | B | B | B | D | B | B | B | B | B | B | B | B | 6 | 6 | 0 | R | R | R | R | R | R |
| 20 | B | B | B | B | B | D | B | B | B | B | B | B | B | B | 5 | 5 | 5 | R | R | R | R | R | R |
| 21 | B | B | B | B | B | B | B | B | B | D | B | B | B | B | 10 | 10 | 2 | R | R | R | R | R | R |
| 22 | B | B | B | B | B | B | B | B | B | B | B | D | B | B | 12 | 12 | 0 | R | R | R | R | R | R |
| 23 | B | B | B | B | B | B | B | B | B | B | B | D | B | B | 11 | 11 | 1 | R | R | R | R | R | R |
| 24 | B | B | B | B | B | B | B | B | B | B | B | D | B | B | 9 | 12 | 0 | R | R | R | R | R | R |
| 25 | B | B | B | B | B | B | B | B | D | B | B | B | B | B | 7 | 8 | 0 | R | R | R | R | R | R |
| 26 | B | B | B | B | B | B | D | B | B | B | B | B | B | B | 5 | 6 | 0 | R | R | R | R | R | R |
| 27 | B | B | B | B | D | B | B | B | B | B | B | B | B | B | 4 | 4 | 1 | R | R | R | R | R | R |
| 28 | B | B | B | B | D | B | B | B | B | B | B | B | B | B | 5 | 5 | 0 | R | R | R | R | R | R |
| 29 | B | B | B | B | D | B | B | B | B | B | B | B | B | B | 3 | 4 | 0 | R | R | R | R | R | R |
| 30 | B | B | D | B | B | B | B | B | B | B | B | B | B | B | 1 | 2 | 0 | R | R | R | R | R | R |
| 31 | D | B | B | B | B | B | B | B | B | B | B | B | B | B | 0 | 0 | 1 | R | R | R | R | R | R |
| 32 | D | B | B | B | B | B | B | B | B | B | B | B | B | B | 1 | 1 | 9 | R | R | R | R | R | R |
| 33 | B | B | B | B | B | B | B | B | B | D | B | B | B | B | 10 | 10 | 1 | R | R | R | R | R | R |
| 34 | B | B | B | B | B | B | B | B | B | B | D | B | B | B | 11 | 11 | 0 | R | R | R | R | R | R |
| 35 | B | B | B | B | B | B | B | B | B | B | D | B | B | B | 5 | 10 | 0 | R | R | R | R | R | R |
| 36 | B | B | B | B | D | B | B | B | B | B | B | B | B | B | 4 | 4 | 1 | R | R | R | R | R | R |
| 37 | B | B | B | B | D | B | B | B | B | B | B | B | B | B | 0 | 0 | 0 | R | R | R | R | R | R |

FIG. 15B

| KEY NO | UK FIELD 1 | 2 | 3 | 4 | 5 | 6 | 7 | 8 | 9 | 10 | 11 | 12 | 13 | 14 | F | L | POINTER FIELD 1 | 2 | 3 | 4 | 5 | 6 |
|---|---|---|---|---|---|---|---|---|---|---|---|---|---|---|---|---|---|---|---|---|---|---|
| 0 | B | B | B | B | B | B | B | B | B | B | B | B | B | B | 0 | 5 | R | R | R | R | R | R |
| 1 | B | B | B | B | D | B | B | B | B | B | B | B | B | B | 5 | 2 | R | R | R | R | R | R |
| 2 | B | B | B | B | B | B | D | B | B | B | B | B | B | B | 7 | 3 | R | R | R | R | R | R |
| 3 | B | B | B | B | B | B | B | B | B | D | B | B | B | B | 10 | 2 | R | R | R | R | R | R |
| 4 | B | B | B | B | B | B | B | B | B | B | B | D | B | B | 12 | 1 | R | R | R | R | R | R |
| 5 | B | B | B | B | B | B | B | B | B | B | B | B | D | B | 10 | 0 | R | R | R | R | R | R |
| 6 | B | B | B | B | B | B | B | B | B | D | B | B | B | B | 8 | 0 | R | R | R | R | R | R |
| 7 | B | B | B | B | B | B | B | D | B | B | B | B | B | B | 7 | 0 | R | R | R | R | R | R |
| 8 | B | B | B | B | B | B | D | B | B | B | B | B | B | B | 3 | 0 | R | R | R | R | R | R |
| 9 | B | B | D | B | B | B | B | B | B | B | B | B | B | B | 2 | 1 | R | R | R | R | R | R |
| 10 | B | B | D | B | B | B | B | B | B | B | B | B | B | B | 2 | 1 | R | R | R | R | R | R |
| 11 | B | B | D | B | B | B | B | B | B | B | B | B | B | B | 2 | 1 | R | R | R | R | R | R |
| 12 | B | B | D | B | B | B | B | B | B | B | B | B | B | B | 2 | 1 | R | R | R | R | R | R |
| 13 | B | B | D | B | B | B | B | B | B | B | B | B | B | B | 2 | 1 | R | R | R | R | R | R |
| 14 | B | B | D | B | B | B | B | B | B | B | B | B | B | B | 3 | 4 | R | R | R | R | R | R |
| 15 | B | B | B | B | B | B | D | B | B | B | B | B | B | B | 5 | 0 | R | R | R | R | R | R |
| 16 | B | B | B | B | D | B | B | B | B | B | B | B | B | B | 4 | 5 | R | R | R | R | R | R |
| 17 | B | B | B | B | B | B | B | B | D | B | B | B | B | B | 6 | 0 | R | R | R | R | R | R |
| 18 | B | B | B | B | B | D | B | B | B | B | B | B | B | B | 5 | 1 | R | R | R | R | R | R |
| 19 | B | B | B | B | B | D | B | B | B | B | B | B | B | B | 5 | 1 | R | R | R | R | R | R |
| 20 | B | B | B | B | B | D | B | B | B | B | B | B | B | B | 6 | 4 | R | R | R | R | R | R |
| 21 | B | B | B | B | B | B | B | B | B | D | B | B | B | B | 10 | 2 | R | R | R | R | R | R |
| 22 | B | B | B | B | B | B | B | B | B | B | B | D | B | B | 11 | 1 | R | R | R | R | R | R |
| 23 | B | B | B | B | B | B | B | B | B | B | B | D | B | B | 11 | 1 | R | R | R | R | R | R |
| 24 | B | B | B | B | B | B | B | B | B | B | B | D | B | B | 9 | 0 | R | R | R | R | R | R |
| 25 | B | B | B | B | B | B | B | B | D | B | B | B | B | B | 7 | 0 | R | R | R | R | R | R |
| 26 | B | B | B | B | B | B | D | B | B | B | B | B | B | B | 5 | 0 | R | R | R | R | R | R |
| 27 | B | B | B | B | D | B | B | B | B | B | B | B | B | B | 4 | 1 | R | R | R | R | R | R |
| 28 | B | B | B | B | D | B | B | B | B | B | B | B | B | B | 4 | 1 | R | R | R | R | R | R |
| 29 | B | B | B | B | D | B | B | B | B | B | B | B | B | B | 3 | 0 | R | R | R | R | R | R |
| 30 | B | B | D | B | B | B | B | B | B | B | B | B | B | B | 1 | 0 | R | R | R | R | R | R |
| 31 | D | B | B | B | B | B | B | B | B | B | B | B | B | B | 0 | 1 | R | R | R | R | R | R |
| 32 | D | B | B | B | B | B | B | B | B | B | B | B | B | B | 1 | 9 | R | R | R | R | R | R |
| 33 | B | B | B | B | B | B | B | B | B | D | B | B | B | B | 10 | 1 | R | R | R | R | R | R |
| 34 | B | B | B | B | B | B | B | B | B | B | D | B | B | B | 10 | 1 | R | R | R | R | R | R |
| 35 | B | B | B | B | B | B | B | B | B | B | D | B | B | B | 5 | 0 | R | R | R | R | R | R |
| 36 | B | B | B | B | D | B | B | B | B | B | B | B | B | B | 4 | 1 | R | R | R | R | R | R |
| 37 | B | B | B | B | D | B | B | B | B | B | B | B | B | B | 0 | 0 | R | R | R | R | R | R |

FIG. 22

SEARCH MODE CLOCKING

| CLOCK PHASE | TRANSFER CONTROL |
|---|---|
| C1A.1 | IG(L); IG(H); IG(+1); IG(1111); IG($HH_R$); IG($\overline{X}$)<br>IG(T)<br>IG(Q)<br>BM(I)------IG(S0)<br>BM($\overline{I}$)------IG($\overline{S0}$) |
| C1A.2 | DROP IG($\overline{X}$) |
| C1A.3 | BM(S0)------IG(L); IG(H); IG(+1); IG($HH_L$); IG($HH_R$);<br>IG($\overline{X}$); IG(T) |
| C1A.4 | DROP IG($\overline{X}$) |
| C1A.5 | OG($E_C$); IG(+1); IG(H)<br>BM(J)------IG($HH_L$); IG($HH_R$); IG($\overline{X}$)<br>BM($\overline{J}$)------IG(1111); IG($HH_X$) |
| C1A.6 | BM($\overline{E}$ & $\overline{G}$)-----IG($\overline{S0}$ & $\overline{S1}$)<br>BM(E & G)------IG(S0 & $\overline{S1}$)<br>(1) BM($\overline{E}$ & $\overline{G}$ & $\overline{T}$)----- C3.1--(C 3/7/11)<br>(2) BM($\overline{E}$ & $\overline{G}$ & T)----- C2.1--(C 2/0)<br>(3) BM(E & $\overline{T}$)---- C5.1<br>(4) BM(E & T)---- C11.1--(C3/7/11)<br>(5) BM(G & $\overline{E}$ & $\overline{T}$)---C10.1---(C 2/10)<br>(6) BM(G & $\overline{E}$ & T)----C11.1----(C 3/7/11) |

SPECIAL GATING CONTROLS

SPECIAL DATA FLOW COMBINING CONTROLS 856

FIG. 25 SPECIAL CLOCK CIRCUIT 855

| F FIELD (1/2 BYTE) | L FIELD (1/2 BYTE) | K FIELD (UP TO 15 K BYTES) |
|---|---|---|

| F (1/2 BYTE) | ALL-ONES FIELD (1/2 BYTE) | EXTENDED L (1 BYTE) | K FIELD (UP TO 256 BYTES) |
|---|---|---|---|

| ALL-ONES FIELD (1/2 BYTE) | L FIELD (1/2 BYTE) | EXTENDED F (1 BYTE) | K FIELD (UP TO 15 BYTES) |
|---|---|---|---|

| ALL-ONES FIELD (1/2 BYTE) | ALL-ONES FIELD (1/2 BYTE) | EXTENDED L (1 BYTE) | EXTENDED F (1 BYTE) | K FIELD (UP TO 256 BYTES) |
|---|---|---|---|---|

METHOD AND MEANS FOR SEARCHING A COMPRESSED INDEX

TABLE OF CONTENTS

| | Application column number |
|---|---|
| Abstract | 1 |
| Definition Table | 3 |
| Symbol Table | 5 |
| General Statement of Invention | 6 |
| Table I | 11 |
| Table II | 11 |
| Table III | 13 |
| Table IV | 14 |
| Table V | 14 |
| Basic Method | 18 |
| Pointer Architecture | 20 |
| Detailed Method Description | 21 |
| Legend | 24 |
| Exit Table | 24 |
| Detailed Example of FIGURE 16 Operation | 24 |
| Alternative Method Embodiments | 26 |
| Hardware Search System | 27 |
| Extended CK Field Embodiment | 30 |

This invention relates generally to information retrieval and particularly to a new electronically controlled technique for searching machine-readable indexes. The method and means for machine generation of indexes searched by the invention in this application are disclosed and claimed in another U.S. Patent application Ser. No. 788,807 filed on the same day as the subject application, by the same inventors, and is owned by the same assignee.

We live in an information explosion era. Information of every sort is being generated at an ever increasing rate. It is becoming ever more apparent that a bottleneck sometimes exists in not being able to quickly retrieve an item of information from the mass of information in which it is buried. Although much work has been done on information retrieval, no overall solution has been found thus far, even though many sophisticated information retrieval techniques have been conceived for accessing of information involving large numbers of documents or records.

Within the information retrieval environment, the invention relates to a tool useful in controlling a machine to locate information indexed by keys. Any type of uncompressed keys (UK's) arranged in sorted sequence can be converted into compressed-key form by the technique in application Ser. No. 788,807 to provide a Compressed Index, and such compressed index can be searched by the subject invention. Each compressed key may have associated with it an indication of the location of one or more items of information it represents. The location information may be an attached address, pointer, or it may be derivable from the key itself by means not part of this invention.

The subject invention is inclusive of an inventive algorithm which greatly improves the speed of searching a sorted index by searching a compressed form of the index.

Many different methods and means for searching an uncompressed sorted index are known and have been disclosed in the past. Uncompressed index searching is being electronically performed with computer systems, using special access methods, control means, and cataloging techniques. U.S. Pat. Nos. 3,408,631 to J. R. Evans, 3,315,233 to R. De Camp et al.; and 3,366,928 to R. Rice et al.; 3,242,470 to Hagelbarger et al.; and 3,030,609 to Albrecht are examples of the state of the art.

Current computer information retrieval is limited in a number of ways, among which is the very large amount of storage required. The uncompressed key format results in having to scan a large number of bytes in every key entry while looking for a search argument. This is time consuming and costly when searching a large index, or when repeatedly searching a small index. It is this area which is attacked by the subject invention, which greatly reduces the number of scanned bytes per key entry in a searched index. A result obtained is smaller search-storage requirements and faster searching due to less bytes needing to be machine-sensed. A significant increase in searching speed results without changing the speed of a computer system.

Current electronic computer search techniques, such as in the above-cited patents, have uncompressed keys accompanying records on a disc or drum for indexing the subject matter contained in an associated record. A search for the associated record may be done either by the key or by the address of the record. For example in U.S. Pat. Nos. 3,408,631, 3,350,693, 3,343,134, 3,344,402, 3,344,403, and 3,344,405 uncompressed key can be indexed on a magnetically recorded disk. A key can be electronically scanned by a search argument for a compare-equal condition. Upon having a compare-equal condition, a pointer address associated with the respective uncompressed key is obtained and used to retrieve the record represented by the key which may be elsewhere on the disk. This pointer, for example, may include the location on the disk device, or on another device, where the record is recorded. The computer system can thereby automatically access the addressed record. After being located, the record may be used for any required purpose.

This invention pertains to searching a compressed form of a sorted index. The compressed form removes a type of redundancy attributable to the sorted nature of the index. The compressed form of index may be generated by the method of application Ser. No. 788,807 mentioned previously. This invention is for searching an index uniquely compressed to have its sorting-redundancy removed; and hence this invention does not overlap prior art searching methods.

The prior art on redundancy removal has not recognized the removal of sorting-induced redundancy. Examples of pertinent but nonrelated prior compression techniques are found in: U.S. Pat. Nos. 2,978,535 (E. F. Brown) and 3,225,333 (A. W. Vinal) on digitized TV signals; 3,185,824 (H. Blasbalg) and 3,237,170 (F. W. Ellersick, Jr.) on counting numbers of mismatches between successive frames of a digital communication signal; 3,237,170 (H. Blasbalg) for coding repetitious bit patterns; 3,275,989 (E. L. Glaser et al.) relates to commands which only contain that portion which is changed from the previous command; 3,223,982 (G. Sacerdoti et al.) relates to the use of the changed part of an address in relation to the prior address; 3,278,907 (H. J. Barry et al.) for time compressing Doppler radar signals, and U.S. Pat. No. 3,490,690 to C. T. Apple et al. (assigned to the same assignee as the subject application) relates to a technique for reducing test data.

Many of the above patents pertain to data compression techniques which are intended to be reversible. That is, they compress the data, transmit it, and reconstruct the original uncompressed data from the received compressed data. Reversibility is not a requirement with the subject invention, because index compression has the primary objective of fast searchability with less storage.

It is therefore an object of this invention to provide a method and system which can quickly search a Compressed Index having some or all of its sorting-redundancy removed.

It is another object of this invention to provide a key search method and system which can search a compressed index to reduce the number of bytes needed to be machine scanned during a search, when compared to a similar search through the corresponding uncompressed index. This greatly increases the machine search speed in relation to the speed of searching the sorted uncompressed source index at the same machine byte rate.

It is a further object of this invention to search a compressed index in which the size of each compressed key (CK) entry is largely independent of the length of its corresponding uncompressed key (UK). For example, an uncompressed key which is hundreds or thousands of bytes long might be represented as a compressed key having a single byte in the compressed index. The amount of index compression is primarily dependent on the "tightness" of the index, that is the amount of variation in the sorted relationship among the uncompressed keys in the index.

The invention uses a compressed key (CK) format which identifies the boundary locations of any key bytes (K) it may include in relation to the byte positions in the uncompressed key from which is was derived. The number (L) of key bytes (K) in a compressed key is also obtainable from the compressed key format. A particular implementation of this format uses a field (L) in each compressed key which specifies its number of key bytes and the position of its highest order byte in its corresponding uncompressed key. Pointer addresses and data may be associated with their respective compressed keys by being positioned next to their respective keys.

It is another object of this invention to search any compressed index having such a format.

It is still another object of this invention to search any compressed index, regardless of whether the number of key bytes in any compressed key is minimum or not.

Commonly used terms in this specification have their definitions consolidated in the following DEFINITION TABLE. A SYMBOL TABLE follows to consolidate commonly used symbols found in the specification. Many items in the SYMBOL TABLE are further defined in the DEFINITION TABLE.

DEFINITION TABLE

ARGUMENT BYTE: Any single byte in the search argument which is currently being searched for in the compressed index. It is generally designated by its acronym, i.e., A-BYTE, and sometimes is called a SEARCH BYTE or SEARCH ARGUMENT BYTE. The position of the current A-byte in the search argument is represented by the current setting of an equal counter.

APEX LEVEL: The highest in the index. It usually comprises only a single block.

BINARY SEARCH: A search in which a set of sorted items is divided into two parts, where one part is rejected, and the process is repeated on the accepted part until the item with the desired property is found. (The binary search is a well known and widely used computer programming technique for finding an argument in a sorted table.)

BLOCK: A collection of recorded information which is machine-accessible as a unit. A block is also called a RECORD. The meaning of block and record ordinarily found in the computer arts is applicable.

COMPRESSED BLOCK: An index block comprising compressed index entries. It is also called a COMPRESSED INDEX BLOCK.

COMPRESSED INDEX: An index of keys which are compressed by the method described in prior application Ser. No. 788,807.

COMPRESSED INDEX ENTRY: An index entry having a compressed key and a related pointer.

COMPRESSED KEY: A reduced form of a key which in most situations contains a substantially smaller number of characters, or bits, than the original key it represents. It is generated by the method described in prior application Ser. No. 788,807. It is generally referenced by its acronym CK. A CK is sometimes referred to by its format, FLK in which F is the factor field, L is the length field, and K is zero or more key byte(s).

COMPRESSED KEY FORMAT: The recorded form of a compressed key symbolically designated as FLK or LFK, representing the recorded sequence of fields within a compressed key. It is generated by the method described in prior application Ser. No. 788,807, in which each compressed key has zero, one, or more K-bytes comprising the K-field. L is a field (which may be a single byte) containing the number of K-bytes in the compressed key. F is a factor field (which may be a single byte) related to the number of bytes not appearing on the high-order side of the K-field in the compressed key.

DATA BLOCK: Data grouped into a single machine-accessible entity. A data block is also called a DATA LEVEL BLOCK.

DATA LEVEL: The collection of data, which may be called a data base, which is retrievable through the index. The data level comprises one or more data blocks.

DUMMY UNCOMPRESSED KEY: A simulated uncompressed key which represents the first key that can exist in a sorted sequence of uncompressed keys. It is the lowest possible key in an ascending sequence of keys, for which it is comprised of the lowest character in the collating sequence; or it is the highest possible key in a descending sequence of keys, for which it is comprised of the highest character in the collating sequence. For example, the lowest possible key in an ascending sequence would have at least one null character when the EBCDIC character set is used, in which the null character comprises eight binary zeros, and it may be called a "NULL UK."

EQUAL BYTES: The number of consecutive high-order bytes in an UK which are equal to corresponding bytes in the prior UK being compared in a sorted sequence while generating a compressed index.

EQUAL COUNTER: A counter or register with a setting which indicates the current number of consecutive high-order bytes of a search argument which have been found to be equal to K-bytes during the search of a compressed index. The equal counter setting is initialized before searching a compressed index to indicate the highest-order byte position in the search argument. The equal counter setting is incremented each time an A-byte is found to be equal to a selected K-byte.

FACTORED BYTE: A byte not found in the K-field of a CK which was on the high-order side of the K-field in the related UK pair from which the CK was generated.

FACTOR FIELD: A field in a compressed key designated by the acronym, F-field. It is derived by any of the methods described in Pat. application Ser. No. 788,807.

FIRST HIGH CK: The compressed key scanned during a search at which are found the ending conditions for the search. The search ending condition is signalled by the first CK during the search indicating any of a number of conditions called first high conditions. The major first high conditions are: (1) the CK factor field content indicates a more significant byte position than currently indicated by the setting of the equal counter, or (2) the current factor field content is equal to the equal counter setting, and a K-byte of the CK is greater than a corresponding A-byte, or (3) a K-byte is equal to the last A-byte of the search argument.

INDEX: A recorded compilation of keys with associated pointers for locating information in a machine-readable file, data set, or data base. The keys and pointers are accessible to and readable by a computer system. The purpose of the index is to aid the retrieval of required data blocks containing the required information.

INDEX BLOCK: A sequence of index entries which are grouped into a single machine accessible entity.

INDEX ENTRY: An element of an index block having a single pointer. The entry may contain compressed or uncompressed key(s).

KEY: A group of characters, or bits, forming one or more fields in a data block or data item, utilized in the identification or location of the data block or item. The key may be part of the data, by which a data block, record, or file is identified, controlled or sorted. The ordinary meaning for key found in the computer arts is applicable.

KEY BYTE: A character found in the K-field of a compressed key. It is also called a K-BYTE.

KEY FIELD: A field in a CK having one or more K-bytes. The key field is also called K-FIELD, or KEY BYTE FIELD. The K-field exists in a CK only when the L-field is not zero. The K-field usually follows the L and F control fields in a CK recorded in a compressed index.

LEFT SHIFT CK: A relationship of a CK to its prior CK. The relationship is found in the sequential UK comparisons from which the CK and its prior CK are generated. A LEFT SHIFT CK occurs when its generating UK comparison found a *smaller* number of equal bytes than were found in the prior UK comparison.

LOWEST LEVEL: All index blocks which have entries with pointers that address data blocks. The lowest level is also called the LOW LEVEL.

NOISE BYTE: All bytes in an uncompressed key to the right of a difference byte position (i.e., to the right of the leftmost unequal byte) found during generation of the compressed keys. In a compressed key, the noise bytes are missing. The acronym N is sometimes used to designate a noise byte.

NO SHIFT CK: A relationship of a CK to its prior CK. The relationship is found in the sequential UK comparisons from which the CK and its prior CK are generated. A NO SHIFT CK occurs when its generating UK comparison found the *same* number of consecutive high-order equal bytes than were found in the prior UK comparison.

POINTER: An address with a compressed key entry which locates a related data block or data item.

RIGHT SHIFT CK: A relationship of a CK to its prior CK. The relationship is found in the sequential UK comparisons from which the CK and its prior CK are generated. A RIGHT SHIFT CK occurs when its generating UK comparison found a *greater* number of equal bytes than were found in the prior UK comparison.

SEARCH ARGUMENT: A known reference word, or argument, which is a name or designator which may be assigned to a data block or data item. The search argument is used to search an index for a representation of the desired data block represented by the search argument. The desired data block is expected to have a key field identical to the search argument. The acronym SA is used to represent the search argument. Each byte of the search argument is called an A-byte. For example, an employee's name may be the SA used in searching for his record in a company index sequenced by employee names.

SELECTED K-BYTE: A K-byte which is obtained for comparison with an A-byte. Those K-bytes which are bypassed (or skipped) during the search of a compressed index are not selected K-bytes.

UNCOMPRESSED INDEX: An ordinary index of sequence uncompressed keys.

UNCOMPRESSED KEY: It has the ordinary meaning for KEY understood in the data processing arts. It is generally referred to by its acronym UK. (The reason for adding the description "uncompressed" in this specification is to distinguish the ordinary key from a reduced form, which is called herein by the term, compressed key.)

UNCOMPRESSED KEY PAIR: A pair of adjacent uncompressed keys in a sorted sequence of keys which are used to generate a compressed key. It is also called a UK PAIR.

UNEQUAL BYTE POSITION: The position of the highest order unequal byte in an uncompressed key determined by a comparison between it and the prior uncompressed key in a sorted sequence of keys while generating the compressed keys. It is also called the DIFFERENCE POSITION or D-BYTE POSITION. It is the leftmost unequal byte, and the first unequal byte after all consecutive high-order equal bytes in the comparison of a UK pair. In many cases it is the rightmost K-byte in the compressed key derived from the comparison.

SYMBOL TABLE

| | |
|---|---|
| A-BYTE | Argument byte. |
| CK | Compressed key. A subscript on CK particularizes it. |
| CK's | Plural for CK. |
| $CK_i$ | The current CK being examined while searching a sequence of CK's. |
| $i$ | A subscript on an item which particularized the item as being the current item being examined during the process. |
| $i-1$ | A subscript on an item which particularized the item as being the prior item examined during the processing sequence. |
| $i+1$ | A subscript on an item which particularizes the item as being the next item to be examined during the processing sequence. |
| D | Unequal byte position. Also, difference byte position. |
| E | Number of equal bytes in a UK comparison. (A subscript particularizes it.) |
| $E_A$ | Number of equal bytes in the prior UK comparison. |
| $E_B$ | Number of equal bytes in the current UK comparison. |
| K-BYTE | Key byte. (A subscript on K further particularizes it.) |
| K-FIELD | The field in a CK having one or more K-bytes. |
| $K_i$ | The current K-byte being examined while searching a sequence of compressed keys. |
| N | A noise byte representation in an uncompressed key. (Noise bytes are not needed for compressed index searching.) |
| LFK | A compressed key format which has the sequence of L-field, F-field, and zero, one, or more K-bytes comprising a K-field. |
| FLK | Another format for a compressed key in which the sequence of the F- and L-fields is reversed from the LFK format. |
| F | The factor field in a CK having a value equal to the number of factor bytes missing from the CK. |
| L | A field in a CK having a value indicating the number of key bytes in a CK. Also, the value of the current L-field in a register after decrementing the value to determine when the end of each CK is reached during the scan of an index. |
| R | Pointer. It comprises one or more bytes representing an address of a data block related to the compressed key with which the pointer is associated. |
| UK | Uncompressed key. (A subscript on UK further particularizes it.) |
| UK's | Plural for UK. |

GENERAL STATEMENT OF INVENTION

The invention searches a compressed index for a representation of a search argument. To do this, it fetches bytes from a compressed index in the sequence in which they were recorded as a result of any of the generation methods disclosed and claimed in previously cited application Ser. No. 788,807. The fetched bytes are examined by the search method in the subject application for the purpose of finding a place in the compressed index which represents a particular search argument. The search argument is therefore specified before the search method begins, and the search method only needs one byte at a time (called A-byte) from the search argument beginning with its highest order byte (which by convention is its leftmost byte). An initial operation (which is sometimes also an ending operation) on each compressed key being fetched is to examine the content of its F-field, which is the "factor field" that was previously generated by the method in application Ser. No. 788,807. The F-field may be a single byte or less, and it is a control field at a predetermined position in each compressed key.

Also, an equal count, $E_c$, is computed within the search method by an equal counter. At the beginning of a search, the equal counter is set to an initial value, such as zero.

Early in the search method, the equal count, $E_c$, is compared to the F-field in each fetched compressed key, such as found in its first byte position. An unique comparison between the F-field and the equal count (i.e., $E_c$:F) controls the remainder of the search method.

The search of the compressed index may end or continue as a result of the $E_c$ to F comparison. With an ascending compressed index, the search ends if $E_c$ is greater than F, or if they are equal when the CK has no K-bytes. However the search continues if $E_c$ is less than F, or if $E_c$ is equal to F and there are K-bytes.

Another control field, L, (which may be a single byte or less) is also located at a predetermined position in each CK. If the content of the L-field is zero there is no K-field. If L is not zero there are K-bytes, and the number of K-bytes in the CK is represented by the number in the L-field.

If $E_c$ equals F and L is not zero, the search decision on the CK being fetched cannot be made until the K-bytes in the CK are examined. The K-bytes are examined one at a time in the order that they are fetched from the recorded index. To do this, each K-byte is compared to a single A-byte taken from the search argument (SA) at a byte position represented by the current equal count.

The comparison between the A-byte and the K-byte now determines future course of the search. If A is greater than K, the next compressed key can be immediately entered to continue the search, thereby skipping any remaining K-bytes. If A is less than K, the search is completed with the current compressed key. If A is equal to K, the next lower order K-byte and next lower order A-byte are accessed and compared, until all key bytes in the current compressed key compare equal with A-byte, or until an A and K compare unequal. Each time a next K-byte is obtained, the equal count, $E_c$ is incremented to its next count, and the next lower order A-byte is accessed for a comparison. If an unequal comparison occurs, any remaining K-bytes can be bypassed, and the next compressed key (CK) immediately entered to continue the search.

The L-field is also used to determine when the end of the current CK is reached during the fetching sequence, because the number of K-bytes is variable among the CK's from zero to a large number. This housekeeping process is done by decrementing the L-value of a CK each time a K-byte is fetched, so that when the decremented L-value reaches zero, it is known that the last K-byte in the CK has been fetched.

If the last search argument byte compares equal to a last K-byte in a CK, the search is completed in the special case where the next CK key is one at the search ends. But if one or more K-bytes remain after the last search byte has been compared, the search of the compressed index ends with the currently fetched CK.

The search ending conditions previously mentioned occur when the search argument is indicated to be less than the first CK encountered in the search of the compressed index; then the following CK's in the index need not be fetched. For this reason, the search ending condition is often referred to in this specification as occurring at the first "high" compressed key. The data represented by this compressed key generally will contain at predetermined location(s) an uncompressed key field which will be equal to the search argument being searched for, if the search argument is represented by a CK in the compressed index. The data representation with a CK is disclosed herein as a pointer immediately following in sequence after its associated CK; the pointer addresses the location of the data, which is usually at a nonsequential location.

When the search argument is higher than any key in the index, the search ends when the end-of-index is reached, which can be identified by a special character, or when all zeros are provided in the key byte boundary and identification field in the last compressed key of the index, such as having zeros in both the F- and L-fields in the last CK.

The foregoing and other objects, features and advantages of the invention will be apparent from the following more particular description of preferred embodiments of the invention, as illustrated in the accompanying drawings.

Figure 1:
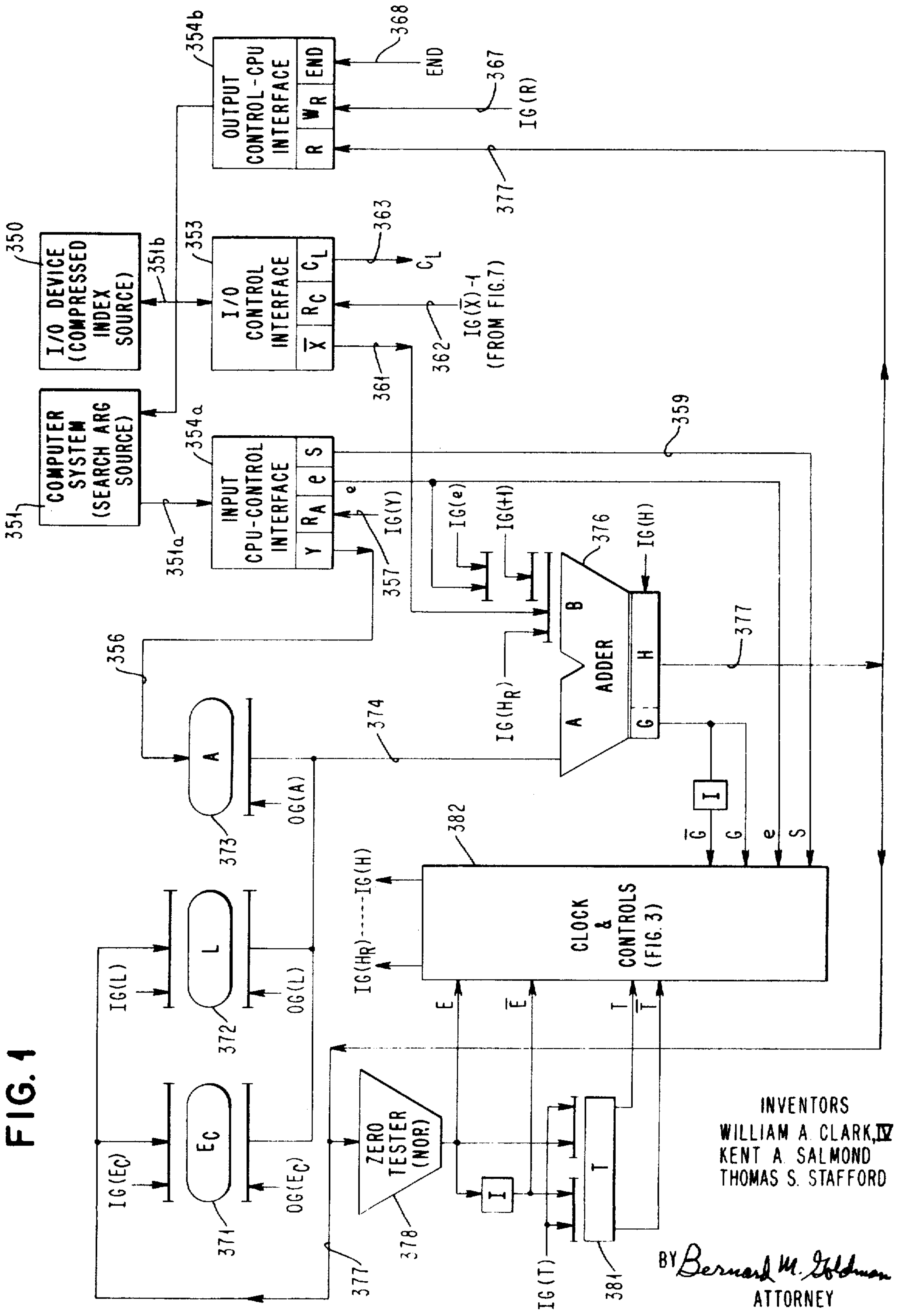
FIG. 1 illustrates a first data path embodiment of the invention.
Figure 3:
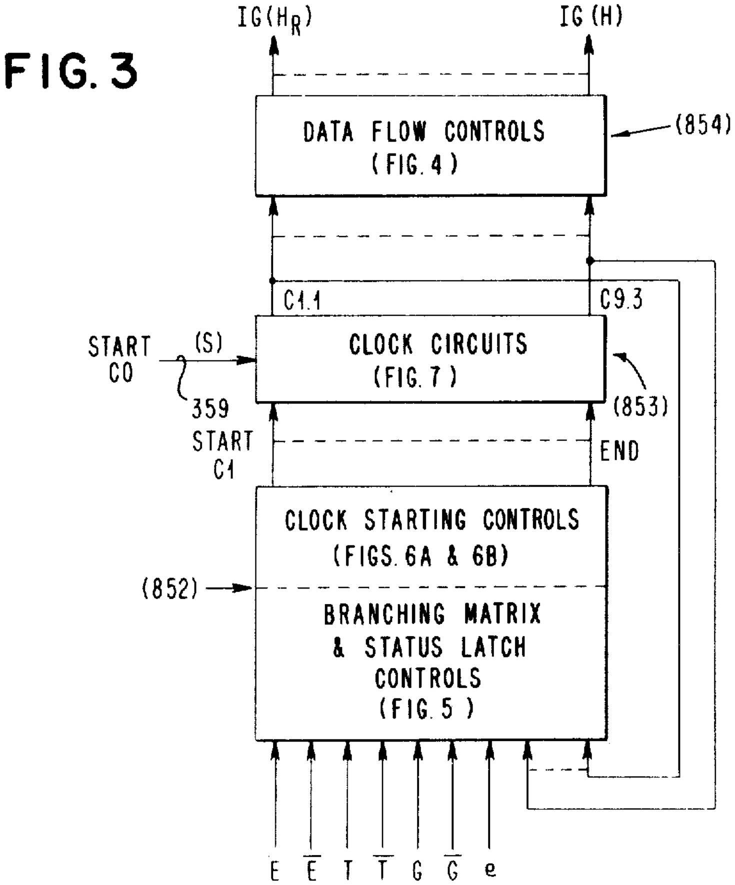
FIG. 3 shows a layout for a Sequencing and Branching Control embodiment for use in FIG. 1.
Figure 6B:
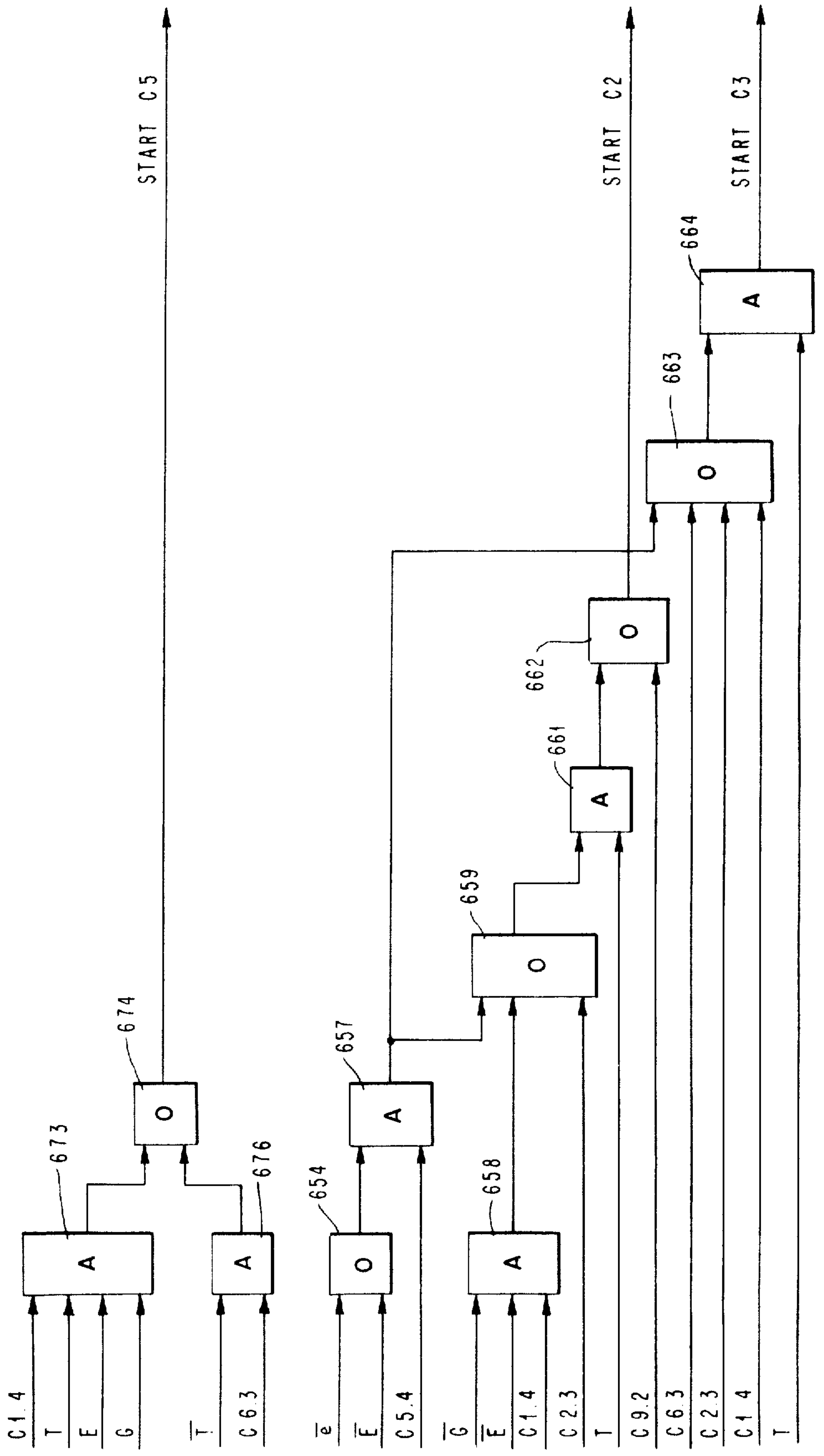
Figure 7:
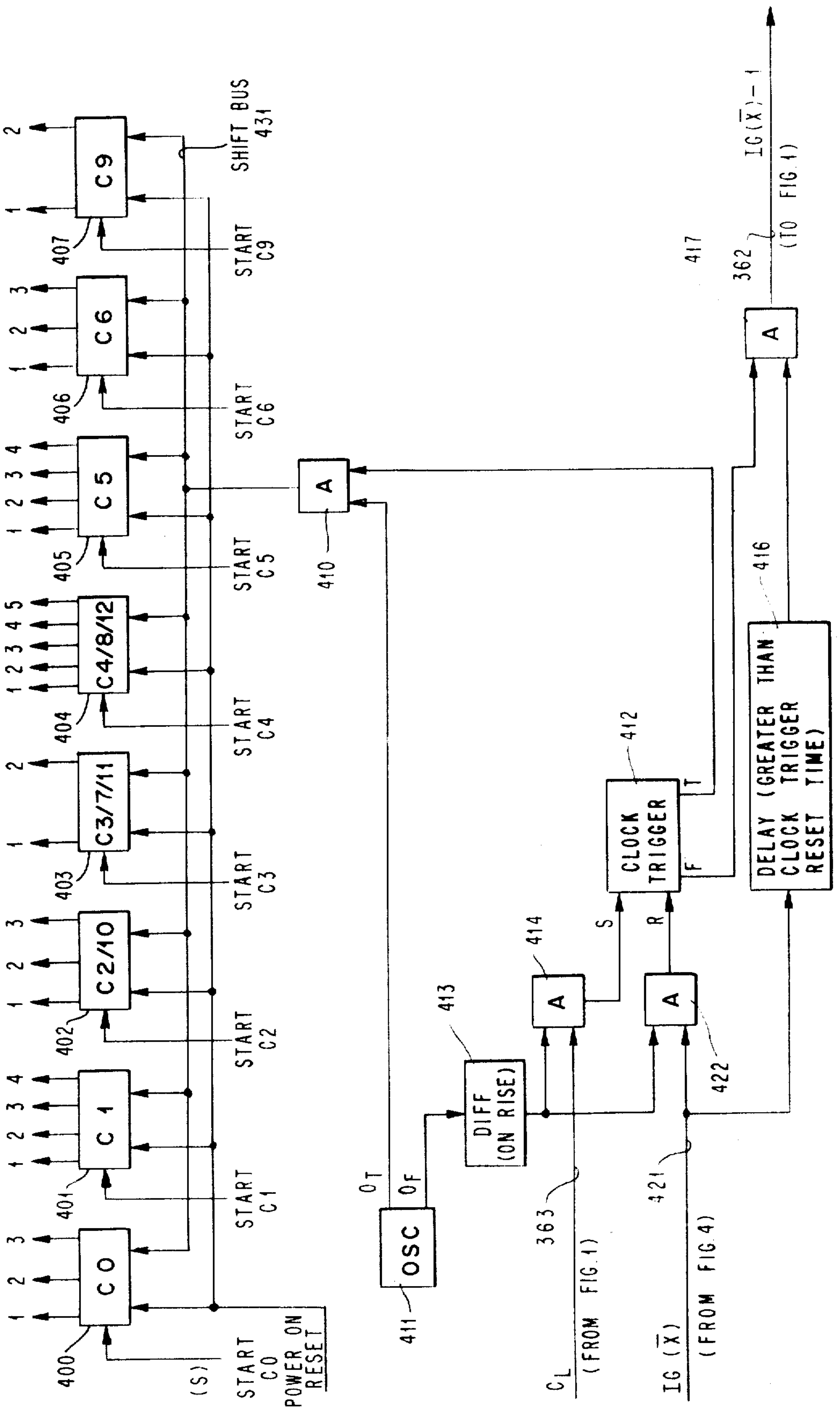
Figure 9A:
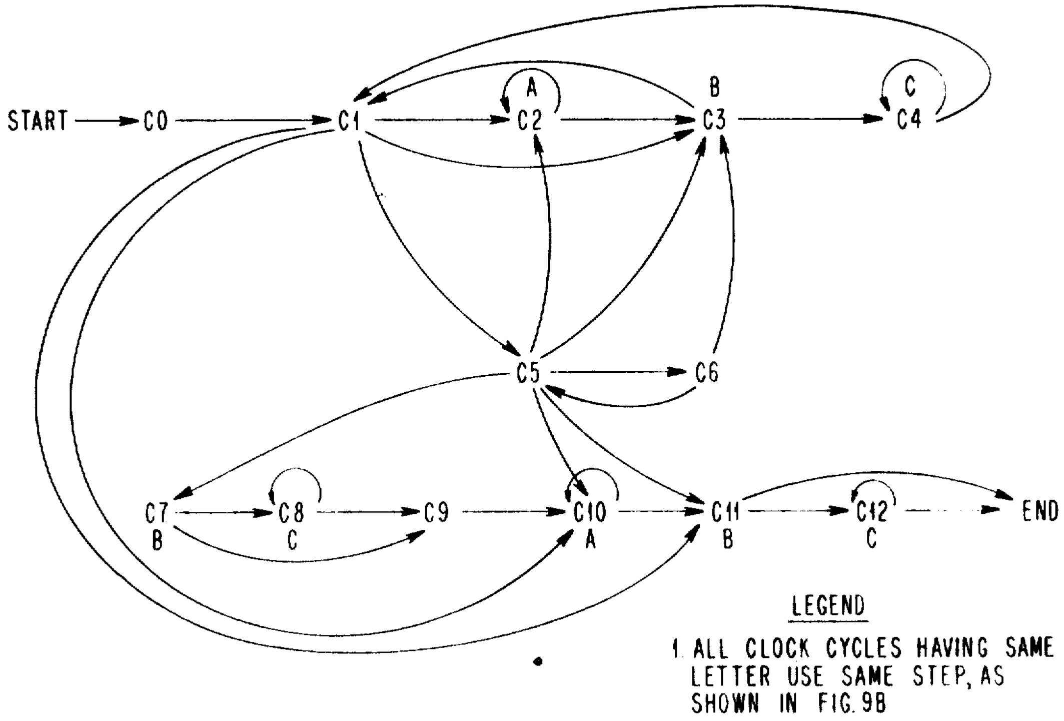
Figure 10:
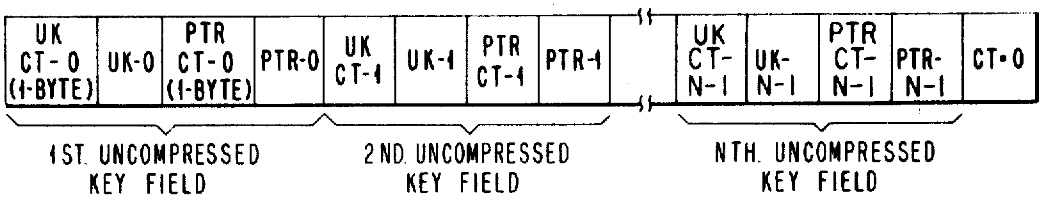
Figure 11A:
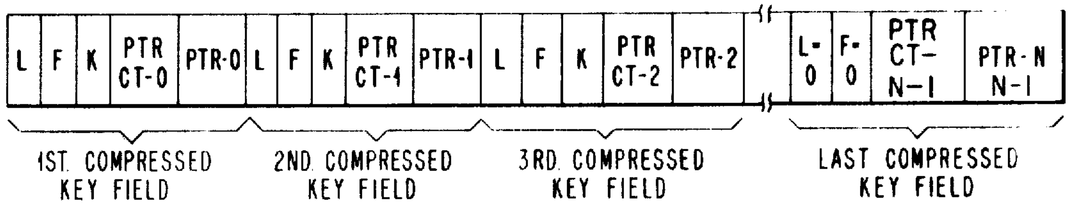
Figure 12:
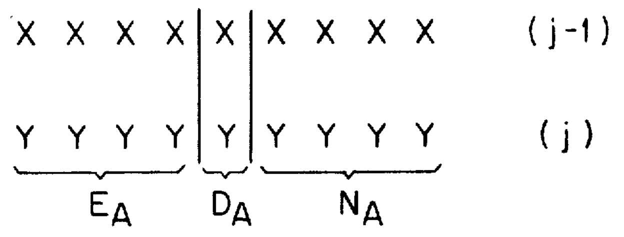
Figure 13:
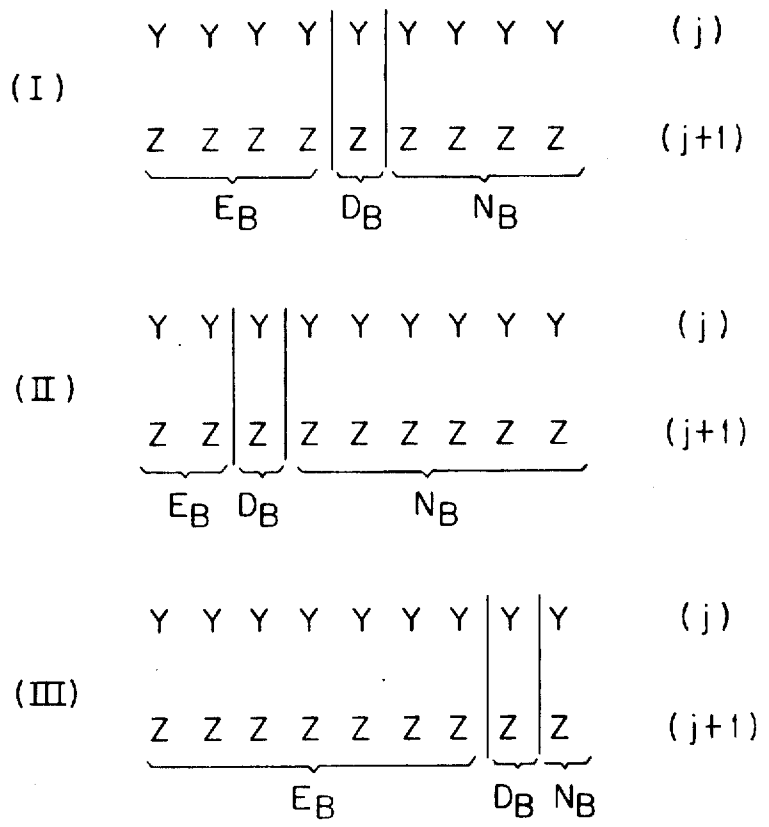
Figure 14A:
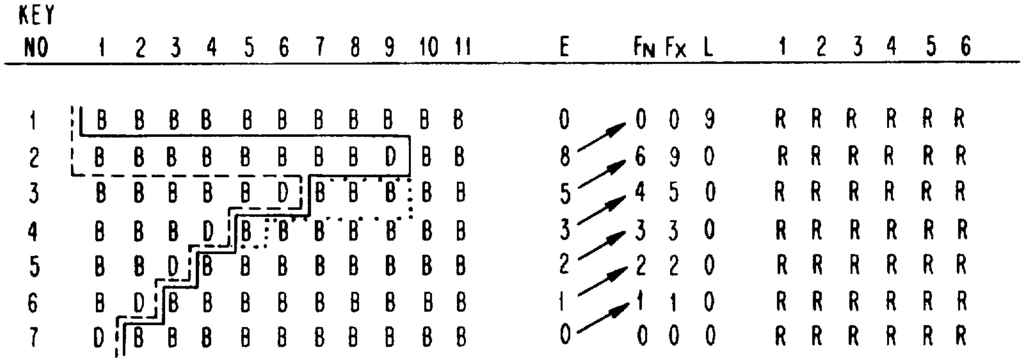
Figure 16:
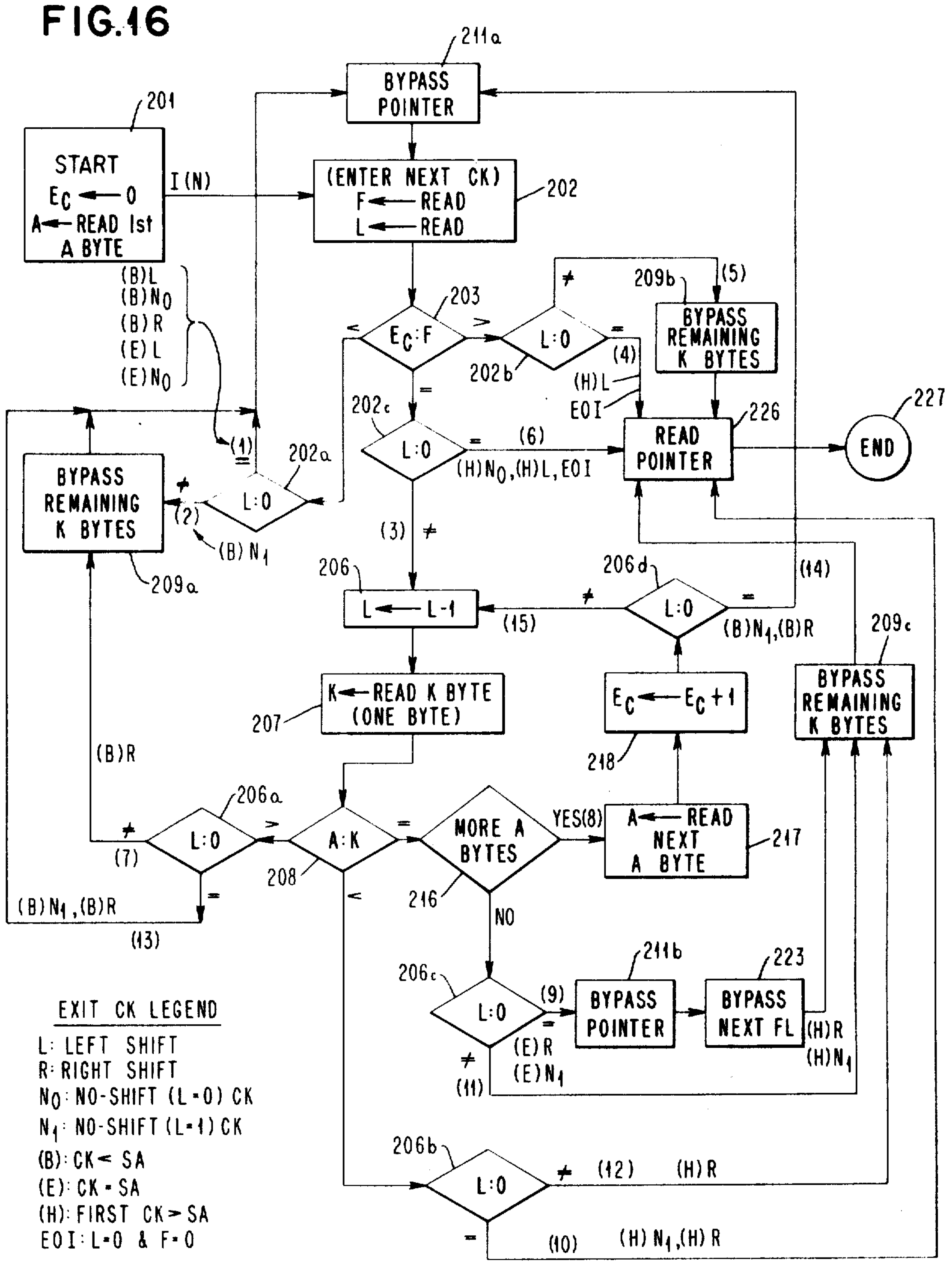
Figure 17A:
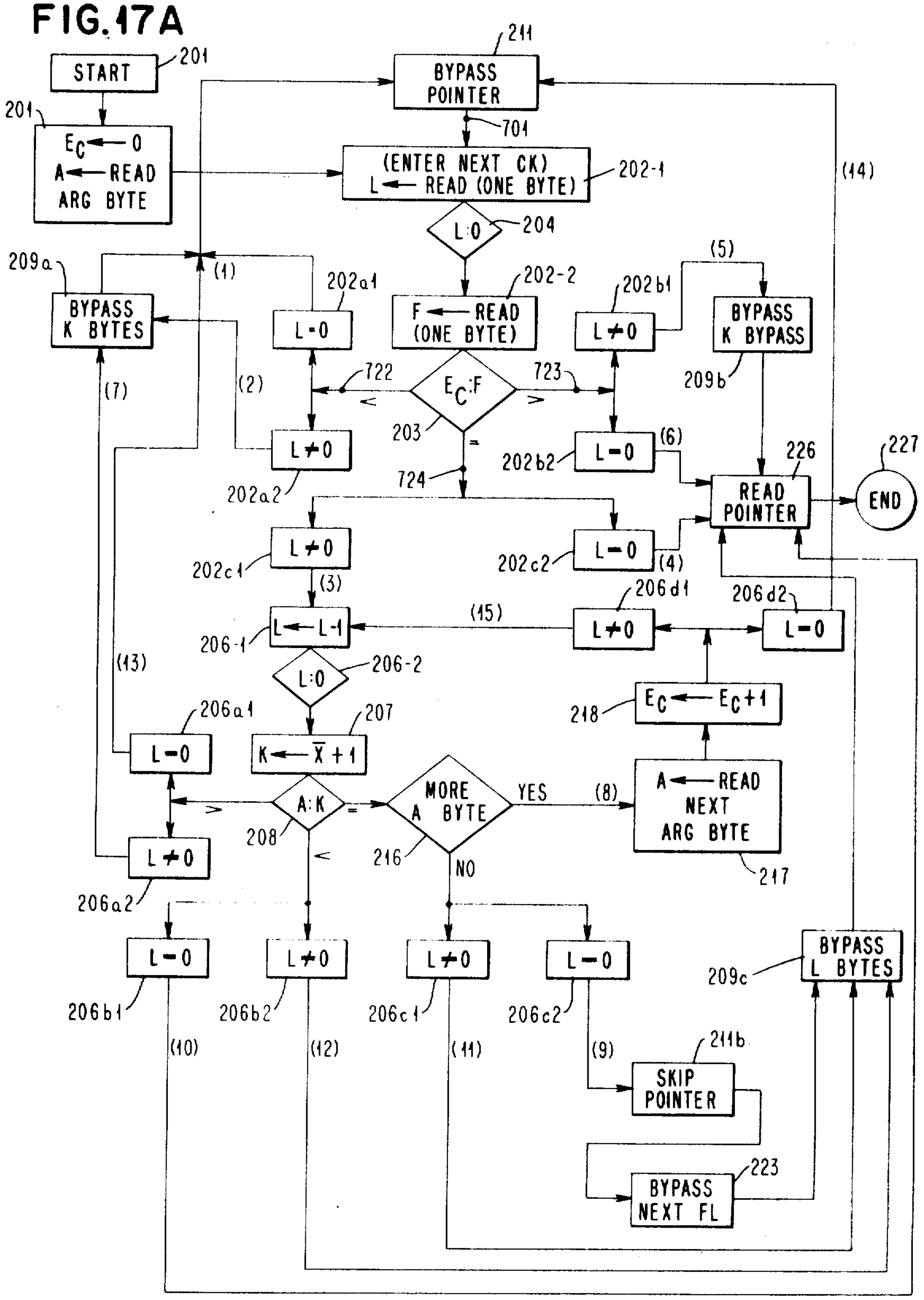
Figure 17B:
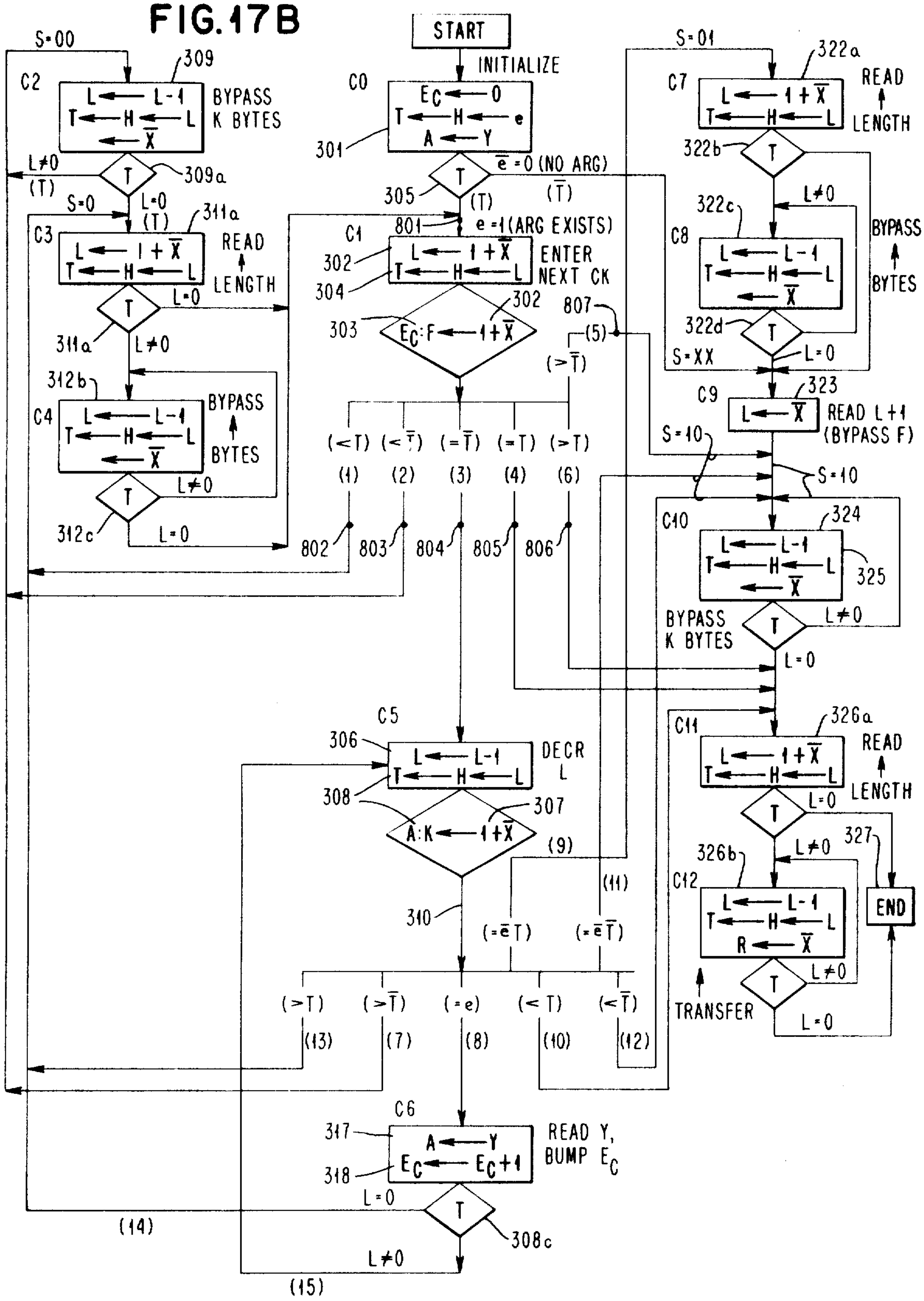
Figure 18:
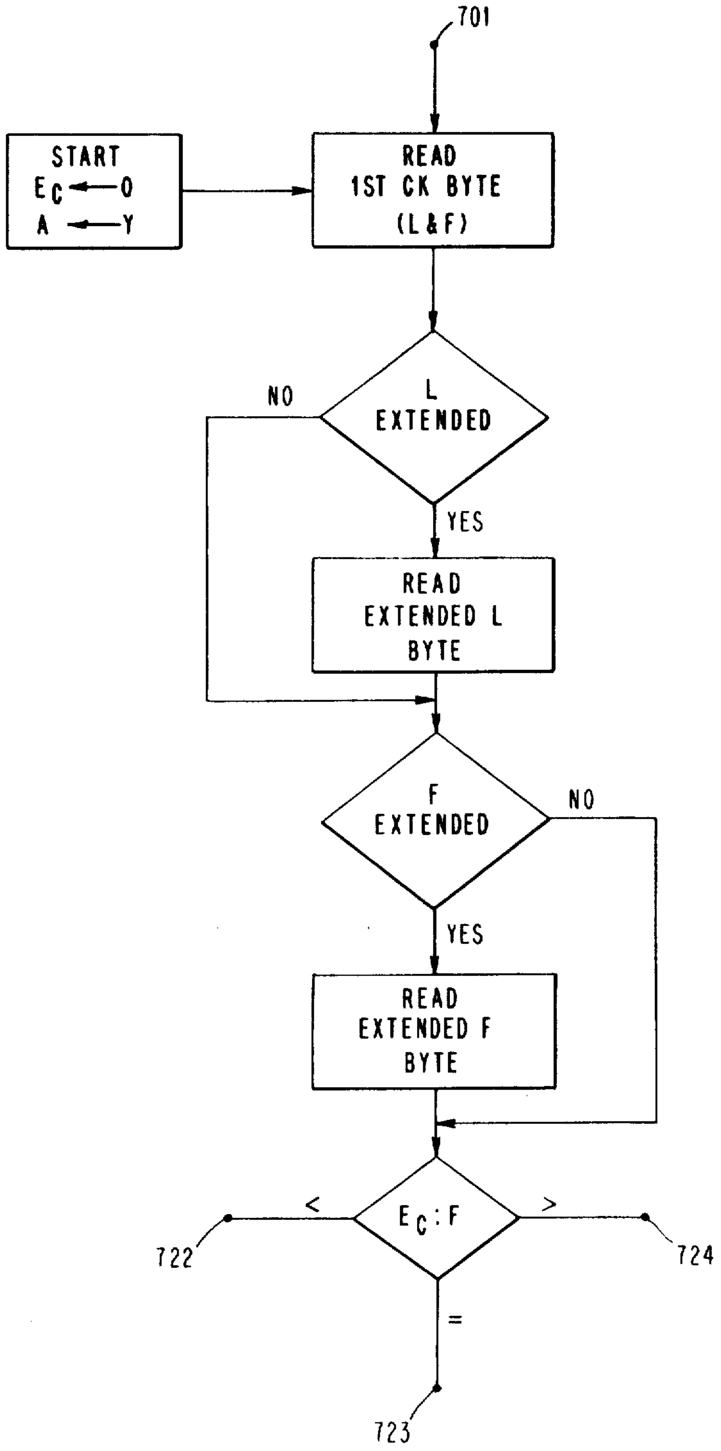
Figure 19:
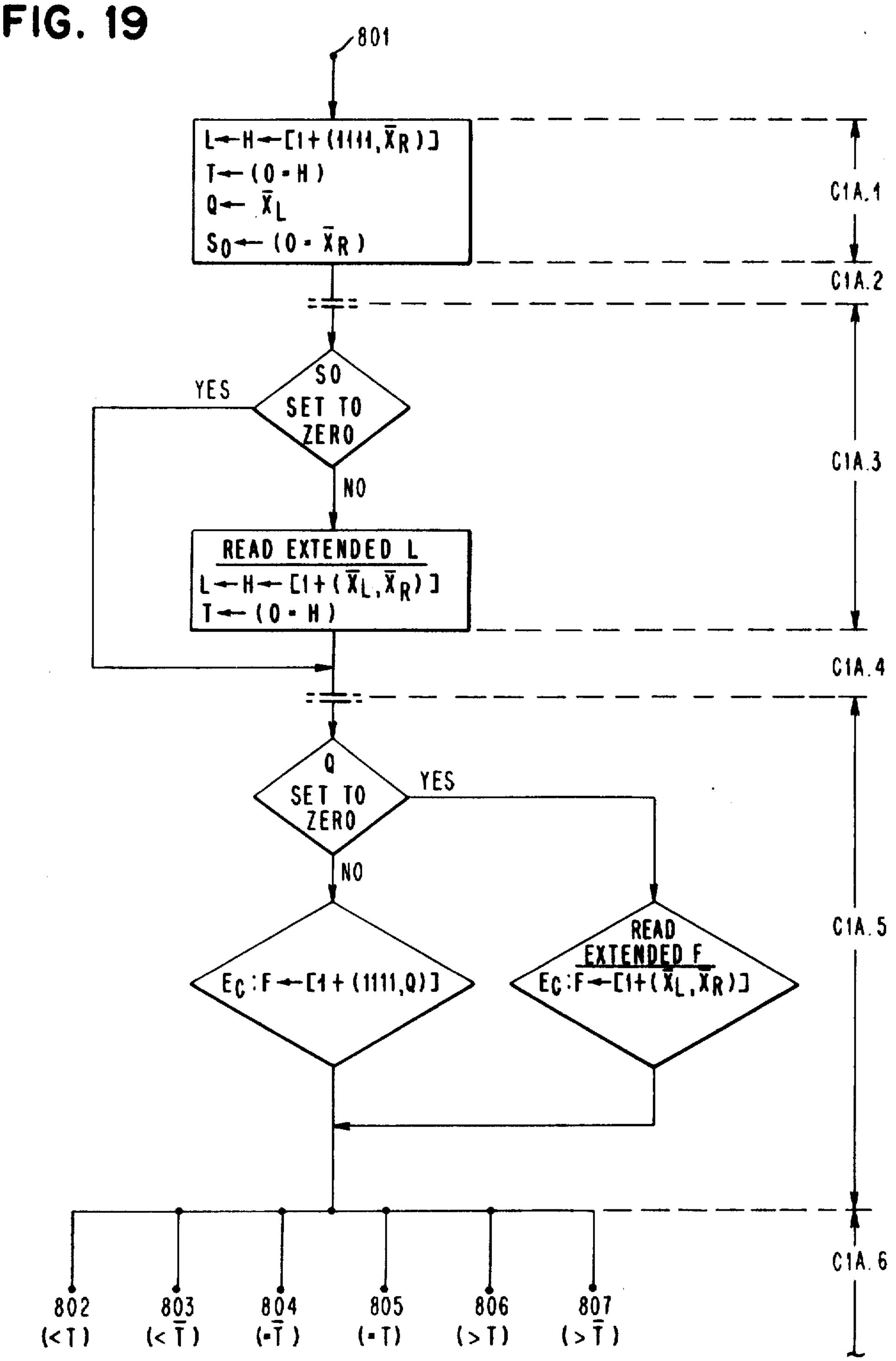
Figure 20:
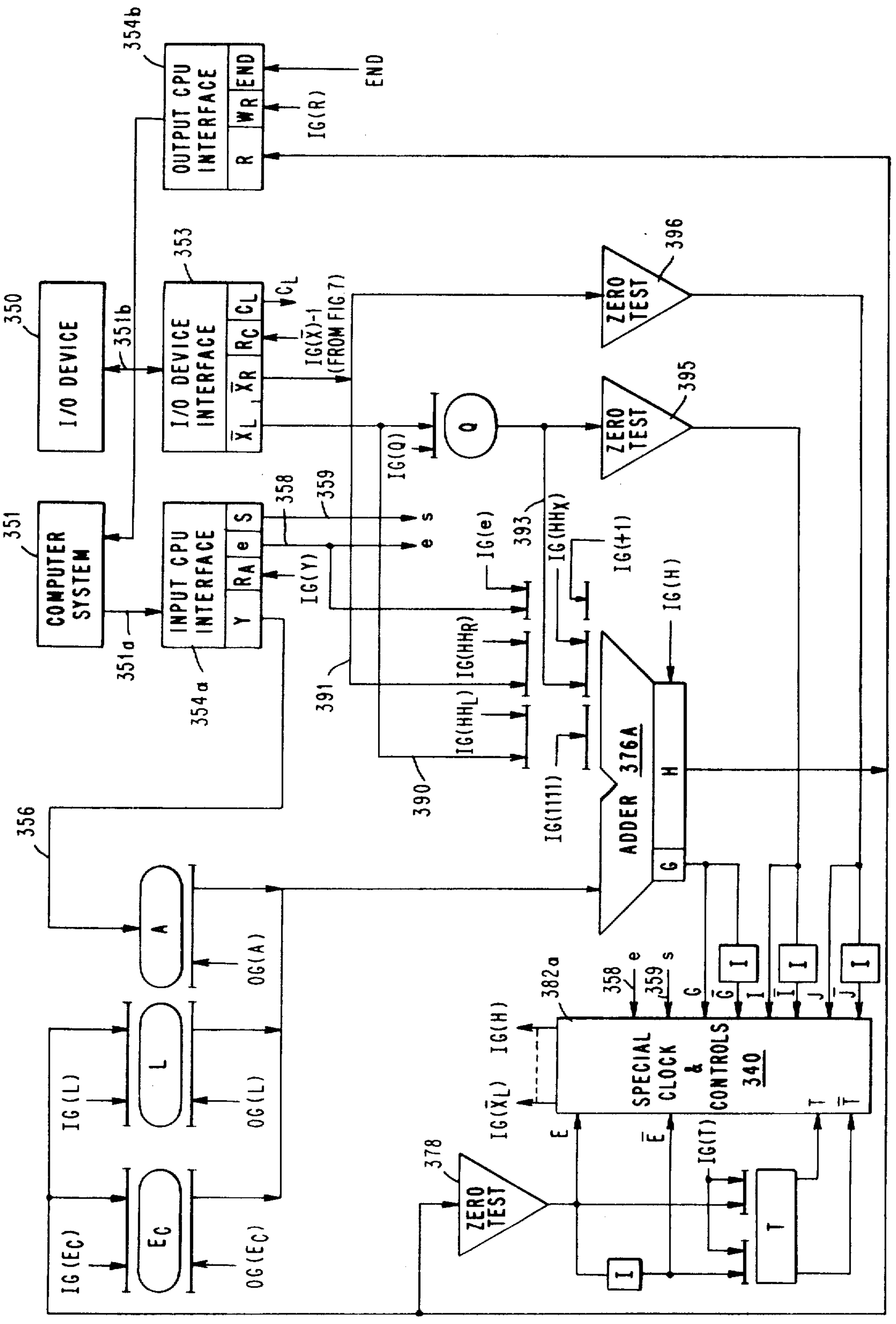
Figure 21:
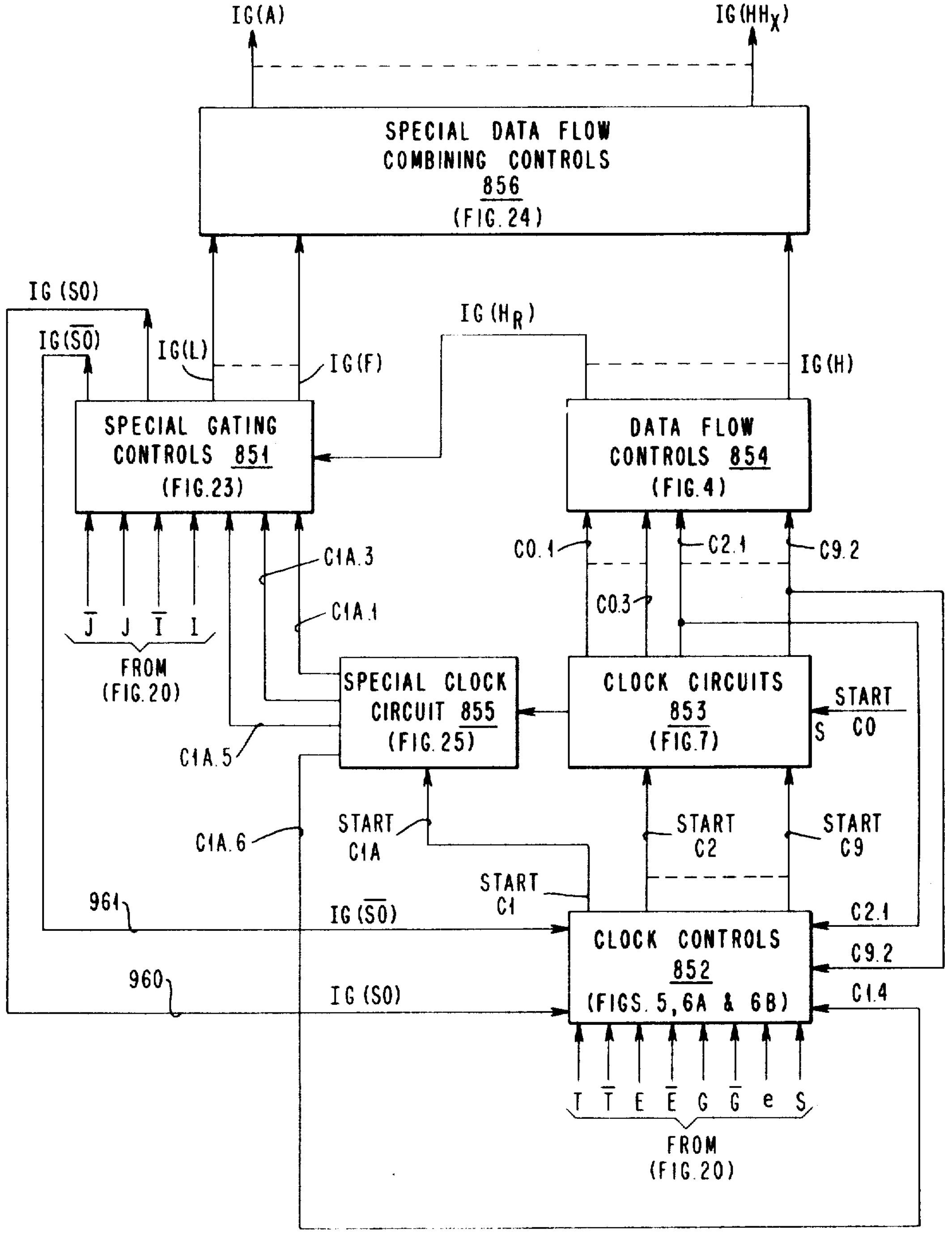
Figure 23:
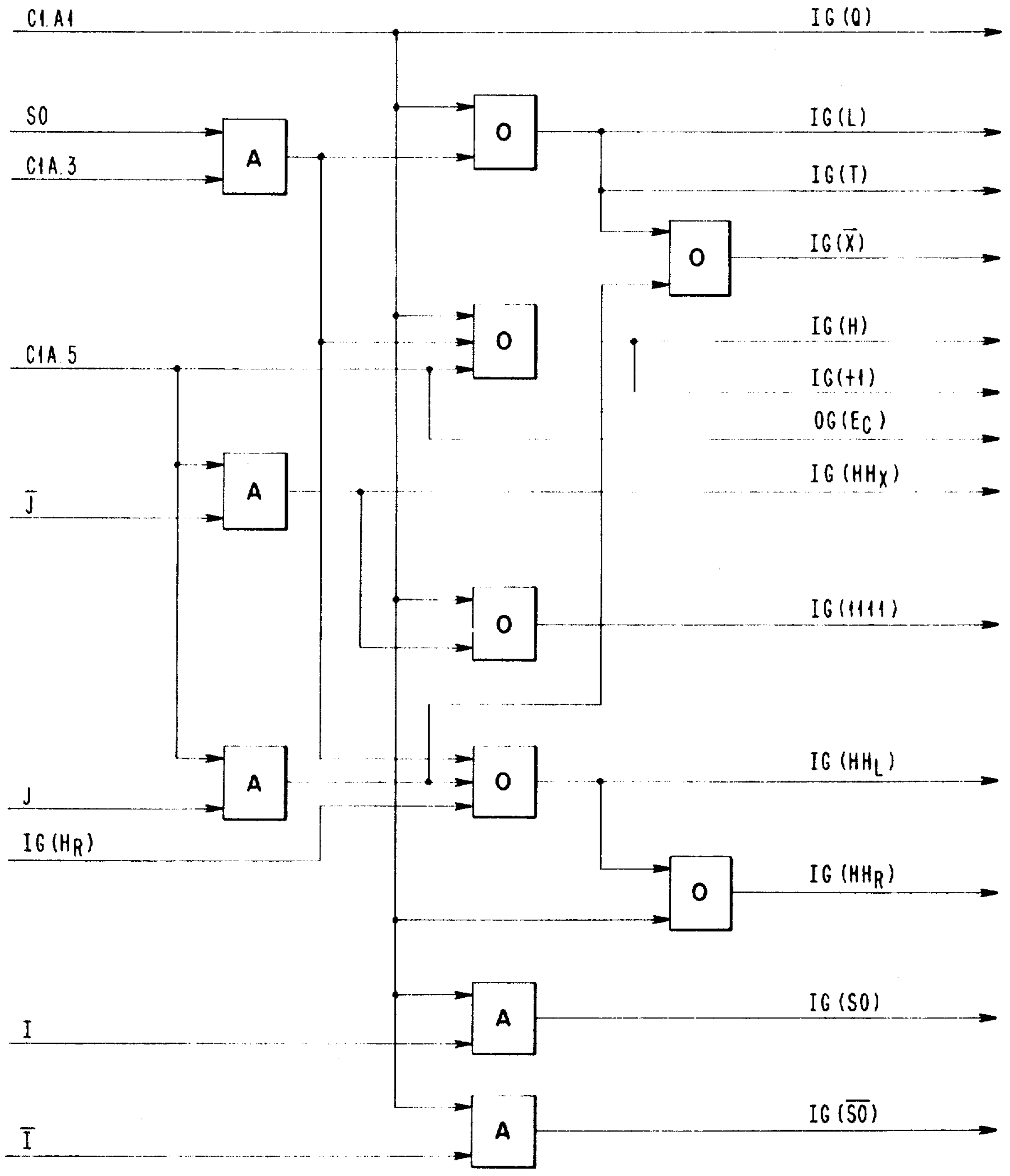
Figure 24:
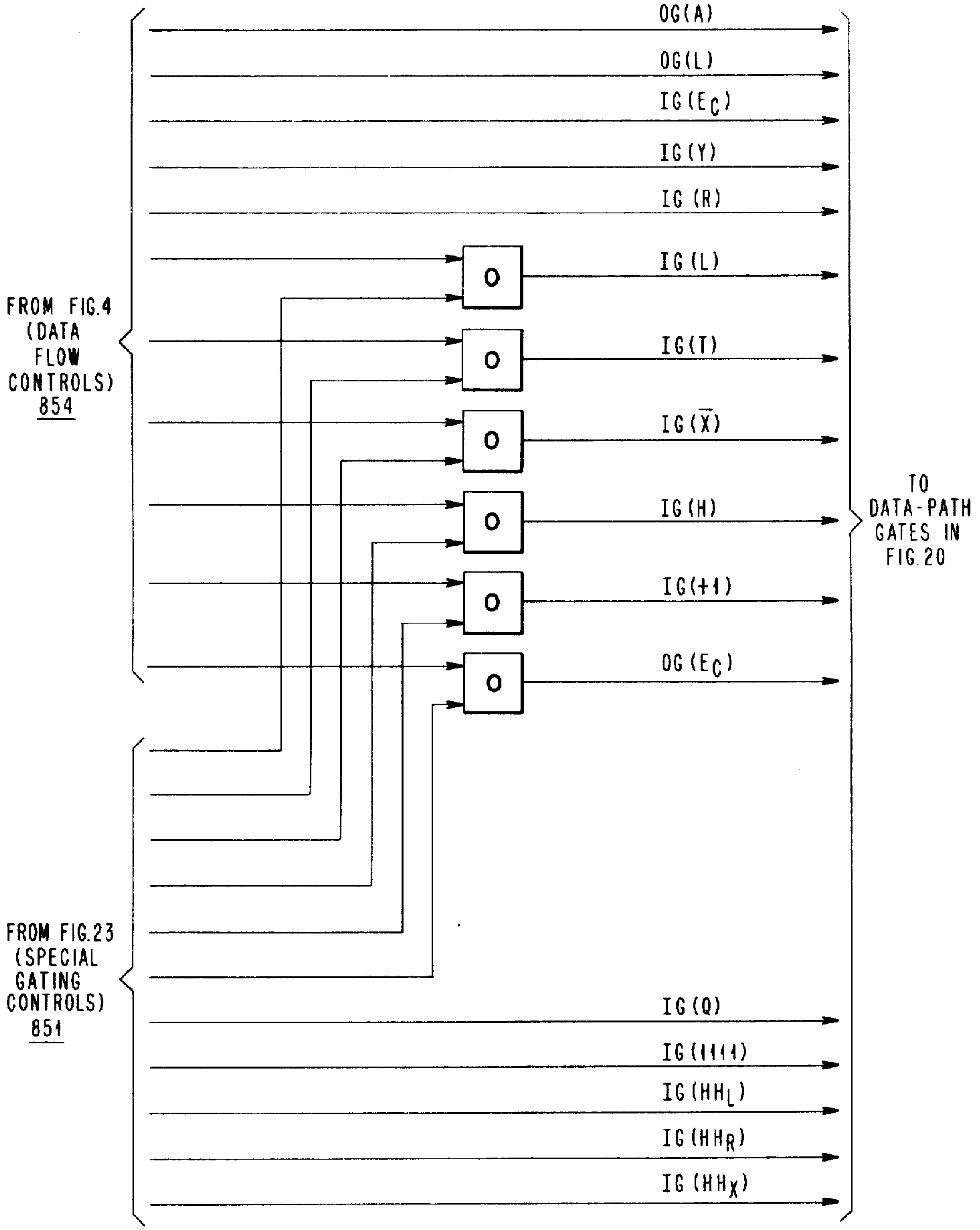

FIGS. 4, 5, 6A, and 6B illustrate an embodiment of circuits used in the Sequencing and Branching Controls represented in FIG. 3;

FIG. 7 illustrates a clock circuit for use in FIG. 3;

FIGS. 8A through 8C provide a Control Signal Sequence Chart representing the cycle timing for one embodiment of control signals generated for gating the data flow path in FIG. 1 with the method represented in FIG. 17B;

FIGS. 9A and B illustrate clock sequencing for the clock in FIG. 7;

FIG. 10 represents a recording or communicating media format for a sorted UK sequence;

FIG. 11A represents a recording or communicating media format for a generated CK sequence;

FIG. 11B–E represent different recording formats for compressed keys;

FIGS. 12 and 13 assists in defining certain basic characteristics of a UK pair used in generating the uncompressed keys searched with the subject invention;

FIGS. 14A, B, and C represent sorted UK sequences from which are respectively generated left-shift, right-shift, and no-shift types of CK's;

FIG. 15A illustrates a sorted UK sequence and a CK sequence generated therefrom with maximum byte compression;

FIG. 15B illustrates a sorted UK sequence and a CK sequence generated therefrom in which every no-shift key has one K-byte;

FIG. 16 represents a general flow diagram of a basic method embodiment of the invention;

FIG. 17A represents a modified inventive method embodiment of the invention;

FIG. 17B illustrates a detailed method embodiment used by the data path in FIG. 1;

FIG. 18 shows another inventive method embodiment of the invention;

FIG. 19 is a detailed inventive method embodiment of the invention used by the data path in FIG. 20;

FIG. 20 shows a second data-path embodiment for the invention;

FIG. 22 provides a Control Signal Sequence Chart representing control signals generated for gating the data path in FIG. 20 with the method represented in FIG. 19;

FIGS. 21, 23 and 24 represent Special Circuits identified with the second data path embodiment in FIG. 20;

FIG. 25 illustrates a Special Clock Circuit for use with the system in FIG. 21;

FIGS. 26A–D represent other recording formats for compressed keys.

FIGS. 16, 17A, 17B, 18, and 19 illustrate embodiments of methods for searching any compressed Index generated by any of the methods or means described herein.

The "Compressed Index Generation" operates on an input stream of the index keys which are in normal uncompressed form and are in sorted order. They may be sorted in ascending or descending order, and the respective keys may be variable length. Additional information may be appended with each key, such as associated information, a pointer address which can locate either directly or indirectly a record with which the respective key is associated.

FIG. 12 shows any two adjacent keys in any sorted uncompressed index stream, in which Uncompressed Keys (UK's) *x...x* and *y...y* are any two successive keys in the sorted sequence. Each key is comprised of a plurality of bytes (characters). The X's and Y's in the respective UK's represent their byte position, which can vary in number among the different UK's. The byte positions in any key differ in importance during the sorting operation from the leftmost byte position being the most significant, to the rightmost being the least significant. The keys in FIG. 12 are shown aligned at their leftmost bytes, which are their most significant bytes for the purposes of this invention as well as in the sorting sequence. The bytes in any key likewise decrease in significance as their position increases from the leftmost byte in any key, in pair. to the operation of this invention.

The invention generates Compressed Keys (CK's) by using a sequence of comparisons between all adjacent UK's in an index or subindex. Thus a comparison is made between the pair $(j-1)$ and $j$ followed by a comparison between a next pair $j$ and $(j+1)$. Thus each UK, except the first and last in the index, is the second UK of one comparison pair and then is the first UK of the next comparison pair Each comparison is made between the byte positions having the same sorting significance, i.e., the leftmost X- and Y-bytes are compared, the second leftmost bytes are compared, etc. The result of these byte comparisons will invariably find an unequal comparison (D), since each key in the index differs in some way from every other key. For example, such difference may be found in the addresses with identical names in an index.

Any UK comparison operation in this invention need not go beyond the leftmost *unequal* byte position D (i.e., most significant). The unequal byte position D may be the leftmost or any other byte. If not the leftmost, it has equal bytes (E) on its left. The lesser significant byte positions to the right of unequal byte position D are designated noise bytes N since they are not required in the generation of compressed keys.

Thus in any comparison of adjacent uncompressed keys, such as *x...x* and *y...y*, it is possible for no byte position or for all but the least significant byte position to be equal E-positions. With most UK pairs, the leftmost difference (D) byte position will be a byte position between the leftmost and rightmost in the comparison.

Often two compared keys *x...x* and *y...y* will have different byte lengths. In this case the first byte of the longer key beyond the least significant byte position of the shorter key is by definition an unequal byte position. This unequal byte comparison defines the byte from the longer key as *greater than* the lack of a byte from the shorter key. Whenever this happens, the shorter key can be assumed to have on its right side the lowest byte in the collating sequence being used, such as the blank byte.

It is assumed in FIG. 12 that an ascending sort is used for the uncompressed index stream. If a descending sort were instead used, the greater than, and less than operations would be reversed throughout the embodiment.

FIG. 12 represents a comparison A between UK*x* and UK*y*, which have positions ($j$−1) and $j$ in the UK sorted index sequence. The equal positions in this comparison are identified as $E_A$, the most significant unequal byte position is $D_A$, and the noise bytes are $N_A$.

FIG. 13 represents the next sequential comparison B between UK*y* and UK*z*, which are the next pair at index positions $j$ and ($j$+1).

The next comparison B uses the second uncompressed key *y...y* of the prior comparison as the first uncompressed key for the next comparison. Thus, in FIG. 13 uncompressed key *y...y* is the same uncompressed key as *y...y* in FIG. 12 which represents the immediately preceding comparison A. The uncompressed key *z...z* thus immediately follows uncompressed key *y...y* in the sorted sequence of uncompressed keys.

The subscripts A and B in FIGS. 12 and 13 represent any two sequential comparisons from which respective E, D, and N are derived.

The invention relates the difference byte positions (D) in any two adjacent comparisons. There are three possibilities in this adjacent comparison relationship, which are represented in FIGS. 13, by Cases I, II, and III. The first Case I in FIG. 13 represents the difference position $D_B$ as being at the *same* byte position as the difference position $D_A$ in the immediately preceding uncompressed key comparison shown in FIG. 12. The Case I $D_B$ may be called a "no-shift" with respect to $D_A$ because $D_B$ has not shifted its byte position therefrom.

The second Case II in FIG. 13 represents the difference position $D_B$ as being at a more significant byte position than difference position $D_A$ in FIG. 12. The Case II $D_B$ may be called a "left-shift" with respect to $D_A$. The third Case III in FIG. 13 represents the difference position $D_B$ as being at a less significant byte position than difference position $D_A$ in FIG. 12. The Case III $D_B$ may be called a "right-shift" with respect to $D_A$.

As the relative difference position $D_B$ varies in relation to the preceding difference position $D_A$ the number of equal byte position $E_B$ will correspondingly vary, and the number of noise byte position $N_B$ will vary. Since the difference position D is always one position to the right of the equal byte positions, then D=E+1.

Each UK in an index sequence represents an item of data. Each of these UK items of data must be represented in any generated sequence of Compressed Keys (CK's).

The $j$th CK represents the item of information represented by the $j$th UK.

Any comparison of the $j$ and ($j$+1) UK's generates the $j$th CK while using certain information derived from the immediately prior comparison of the ($j$−1) and $j$ UK's. The contents of CK is dependent upon the information from the immediately preceding comparison, of which the most important information is the $D_A$ position determined during the immediately prior comparison. Whether the prior CK bytes were zero or not may also be required. The $D_A$ position information can be stated in any of a number of ways, such as its byte count from the most significant byte position in the respective comparison, or by stating the number of equal positions ($E_A$) determined during the same comparison since the $D_A$ position is one byte position greater than the $E_A$ value.

In the case of the first pair of UK's being compared, zero conditions are presumed to precede the first comparison operation.

The first comparison in any index sequence of Uncompressed Keys (UK's) for generating compressed keys preferably starts with a comparison between the first two uncompressed keys in the sorted sequence. This first comparison is used for generating the first Compressed Key (CK) which may represent the item of information represented by the first UK, such as being appended to it. Next a second comparison of the second and third UK's and information from the first comparison are used for generating the second CK, which then will represent the item represented by the second UK. Then the third comparison compares the third and fourth UK's in the sorted sequence, etc., until the end of the uncompressed index is reached. Hence each CK represents the item of information represented by the first UK in the pair from which the CK was generated.

The minimum Compressed Key (CK) format has a minimum number of K-bytes derived from one of the uncompressed keys during a comparison. The minimum CK format takes one or more K-bytes from any "right-shift" UK, does not take any K-bytes from a "left-shift" UK, and takes either one or zero K-bytes from a "no-shift" UK. It is always possible to have more than the minimum byte format for a CK by adding to it more bytes from the UK from which the K-bytes were derived, while maintaining the relative positions among the K-bytes. Such nonminimum information is redundant, but may be useful under special circumstances, such as where part of the information is erroneous.

Two additional elements of information are needed with any CK in addition to the K-bytes in order to properly use the CK during a searching operation. One element of information locates each K-byte of any CK by byte-position count from the most significant byte in the UK from which the K-byte was derived.

The second additional element locates the next CK. In this embodiment, these two elements take the form of two fields called: a factor length (F) field, and a compressed key length (L) field. They are part of each CK. The complete CK format then becomes FLK or LFK depending on where the preference is for F or L to appear first in the format.

The byte length (L) of the K-field in a CK is dependent upon which of the three cases shown in FIG. 13 (no-shift, left-shift, or right-shift) occurs during a particular comparison. In the second case of FIG. 13 (left-shift), no K-bytes appear in the CK, and L is zero. In the first case in FIG. 13 (no-shift), the minimum K-bytes is zero (L=0) or one (L=1) depending upon whether the prior CK has not-zero or zero K-bytes, respectively. Hence if the D-position continues with the same value during an unbroken sequence of comparisons, the CK's with no K-bytes (L=0) will alternate with the CK's with one K-byte (L=1) because of the dependency upon the zero or non-zero condition immediately preceding K-bytes. In the third case in FIG. 13 (right-shift), the CK will have one or more than one K-byte (L ≠ 0). Hence in Case III, the K-field may have a variable number of bytes, which are equal to the number of byte positions from after the $D_A$ position through the $D_B$ position; this may be defined in a number of ways, such as $L=D_B-D_A=(E_B+1)-(E_A+1)=E_B-E_A$.

The factor (F) field of a CK represents the number of continuous byte positions from and including the most significant, which are not any K-byte in the current CK, but which were represented by *previous* K-bytes in the compressed index. The subscript B (i.e., $F_B$) designates a value in the current CK, while subscript A (i.e., $F_A$) designates a value in the immediately prior CK. Hence while generating each CK its $F_B$ value is recorded into its F field, as is shown in every flow diagram in the related application Ser. No. 788,807, for example in that application see step $F_B \rightarrow$ DSDR in FIG. 3C, and steps 31, 33, 35, and 37 in FIGS. 6A, 6B, 7, 11, 12C, and step 39 in FIG. 12B.

The factor $F_B$ field is dependent upon whether the current UK does a "no-shift," "left-shift," or "right-shift" as described in regard to FIG. 13. Also $F_B$ is influenced by $L_A$ being zero or not.

For the minimum K-byte conditions, the $F_B$ field has the following values: for a "no-shift" or a "left-shift" CK, the $F_B$ value is dependent upon whether the $L_A$ value for the immediately prior CK is zero or not. When $L_A$ is zero in the "no-shift" case, the $F_B$ value is the same as the equal ($E_B$) value. While $L_A$ is not zero in the "no-shift" case, $F_B$ can be any value from a maximum of $E_A+1$ through a minimum of $E_B+1$. In the "left-shift" case regardless of whether $L=0$, $F_B$ can be any value from $E_A+1$ through $E_B+1$. But where $L=0$ for the "right-shift" case, $F_B=E_A$; and where L is not zero, $F_B=E_A=1$.

An example of CK's with minimum K-fields is illustrated by the following Table I:

TABLE I

| UK | CK | | | |
|---|---|---|---|---|
| | E | F | L | K |
| Englehard, Hans | 11 | 0 | 12 | Engelhard, L |
| Engelhard, Ludwig | 3 | 12–4 | 0 | |
| English, Irvine J | 9 | 3 | 7 | lish, J |
| English, Jas J | 1 | 10–2 | 0 | |
| Ericson, Oscar | 1 | 1 | 1 | s |
| Eskind, Ralph R. | 2 | 2 | 1 | p |
| Esposito, Blas | 1 | 3–2 | 0 | |
| Evancie, Kenneth G | 1 | 1 | 1 | z |
| Ezequelle, Jonathan A | 0 | 2–1 | 0 | |
| Fahnestock & Co | 2 | 0 | 3 | Fam |
| Famularo, Jos J | 2 | 3 | 0 | |
| Farewell, Richd L | 3 | 2 | 2 | rr |
| Farrar, Carl E | 1 | 4–2 | 0 | |
| Feeney, Kermit | 2 | 1 | 2 | en |
| Fennell, Lee T | 2 | 3 | 0 | |
| Ferris, Harriet Akin, Mrs. | 8 | 2 | 7 | rris, R |
| Ferris, Raymond W | | | | |

With Case I in FIG. 13, a simplification in operation may be obtained by having a single K-byte, which is the $D_B$ byte, and $L=1$ always. However this results in less compression for any index having "no-shift" sequences, which is a common occurrence in large indexes. An example of CK's using this operation is illustrated by the following Table II:

TABLE II

| UK | CK | | | |
|---|---|---|---|---|
| | E | F | L | K |
| Englehard, Hans | 11 | 0 | 12 | Engelhard, L. |
| Engelhard, Ludwig | 3 | 4 | 0 | |
| English, Irvine J. | 9 | 3 | 7 | lish, J. |
| English, Jas J | 1 | 2 | 0 | |
| Ericson, Oscar | 1 | 1 | 1 | s |
| Eskind, Ralph R | 2 | 2 | 1 | p |
| Esposito, Blas | 1 | 3 | 0 | |
| Evancie, Kenneth G | 1 | 1 | 1 | z |
| Ezequelle, Jonathan A | 0 | 1 | 0 | |
| Fahnestock & Co | 2 | 0 | 3 | Fam |
| Famularo, Jos J | 2 | 2 | 1 | r |
| Farewell, Richd L | 3 | 3 | 1 | r |
| Farrar, Carl E | 1 | 2 | 0 | |
| Feeney, Kermit | 2 | 1 | 2 | en |
| Fennell, Lee T | 2 | 2 | 1 | r |
| Ferris, Harriet Akin, Mrs. | 8 | 3 | 6 | ris, R |
| Ferris, Raymond W | | | | |

Accordingly any compressed index can be represented by the format FLK. The values of F and L can be represented by a byte each, or they might occupy a fraction of a byte, such as one-half byte each. If F and L each occupy one-half of an eight-bit byte, each can accommodate values from 0 through 15; this has been found to be sufficient in practice to accommodate almost all compressed indexes, because the average number of K-bytes per CK has been found to be less than one in large indexes. In general, K decreases as the indexes become larger, because large indexes are generally more tightly packed, i.e., more redundant.

To accommodate L-values longer than 15 bytes, and/or F-values longer than 15 bytes, one of the four-bit codes for each half-byte F and L can be used to extend a CK to the next following CK entry. This extension would reduce the maximum length of F or L to 14 for any nonextended CK. The extended CK would indicate an extension of either or both of F or L by placement of the four-bit extension code (such as 15) respectively in either or both of F or L. If only F has an extension code, the extension CK will not have any K-bytes and its L is zero; hence it is one byte long. If L has the extension code, the same CK has 14 K-bytes, and the L-field in the following extension CK will indicate how many more K-bytes are being carried with the extension CK which should be chained to the K-bytes in the immediately preceding index entry. Any number of extension CK's may be used in this manner to accommodate a CK of any F- or L-length. However, CK's having more than 14 K-bytes are very rare in known indexes. CK's having more than 14 F-bytes are more common. Each such extension CK adds only one byte for the additional F- and L-fields. Chained K-bytes do not cause any redundancy in the system.

Two basic alternative situations exist in determining the derivation of the K-bytes of the CK's in an index. That is, the K-bytes can be derived from either UK in a pair being compared. In "Basic Situation-I" the K-bytes are derived from the bytes in the first UK of the compared pair of UK's. In "Basic Situation-II" the K-bytes are derived from the bytes in the second UK of the compared pair of UK's.

Once a choice is made between Situation I or II, all CK's in the index must thereafter be derived using the rules of the chosen situation. In general, Situation-II has been found preferable to Situation-I, because the K-bytes derived from the second UK will be *greater than* the K-bytes derived from the first UK in a compared pair. The *greater than* condition has an advantage in search operations.

Most indexes lead to a more basic source of information than the index itself, although in some cases the information is directly appended with the index. In most cases the indexed information is too large to efficiently have it appended to the UK or CK. Accordingly, it is necessary in most cases to append with each key entry an additional item of information which will directly or indirectly lead to the indexed information.

Such additional item of information may be the address of the required information, or it may instead be the address of another address which is part of a chain of addresses that lead to the indexed information. In such case, a pointer is appended with each key. The pointer is an address which can be used to locate the indexed information or to locate the next pointer in a chain leading to the indexed information.

There are two possibilities in appending a pointer to any CK. These two possibilities may be identified as "Pointer Appendage I" or "Pointer Appendage II." Pointer Appendage I associates the first UK pointer with the CK generated from every compared pair of UK's. Pointer Appendage II associates the second UK pointer with the CK generated from every compared pair of UK's. Once one of these pointer appendage choices is made between I and II, consistency is essential thereafter in continuing to use the same pointer appendage rule. Considerations in the choice involve the fact that there is one more pointer than there are real CK's generated by comparison between real UK's. That is, each UK will have its pointer, and there will be one less CK generated than there are compared pairs of UK's. This difference between the number of real CK's and real pointers can be alleviated in an advantageous way by adding a fictitious CK at the beginning or the end of the index.

Pointer Appendage I requires an initial dummy CK to accommodate the pointer with the first UK. Pointer Appendix II requires a dummy CK at the end of the index to accommodate the last pointer which otherwise might not be accommodated. Pointer Appendage II is the preferred method because the dummy CK can also be used to identify the end of the compressed index.

Compressed Keys with a minimal or greater number of bytes derived from the corresponding Uncompressed Key have been described. The minimal size compressed key eliminates all byte redundancy found in the sorted list of uncompressed keys. However there are circumstances under which it is desirable to retain some of the redundancy. For example, if only the noise bytes are eliminated, and all factored bytes are retained, sufficient redundancy remains to search the partly compressed index on the same basis as the corresponding uncompressed index could be searched. The following Table III illustrates this type of compression:

TABLE III

| UK | CK | | |
|---|---|---|---|
| | E | L | K |
| Engelhard, Hans | 11 | 12 | Engelhard, L |
| Engelhard, Ludwig | 3 | 3 | Eng |
| English, Irvine J | 9 | 10 | English, J |
| English, Jas J | 1 | 1 | E |
| Ericson, Oscar | 1 | 2 | Es |
| Eskind, Ralph R | 2 | 3 | Esp |
| Esposito, Blas | 1 | 1 | E |
| Evancie, Kenneth G | 1 | 2 | Ez |
| Ezequelle, Jonathan A | 0 | 1 | F |
| Fahnestock & Co | 2 | 3 | Fam |
| Famularo, Jos J | 2 | 2 | Fa |
| Farewell, Richd L | 3 | 4 | Farr |
| Farrar, Carl E | 1 | 1 | F |
| Feeney, Kermit | 2 | 3 | Fen |
| Fennell, Lee T | 2 | 2 | Fe |
| Ferris, Harriet Akin, Mrs. | 8 | 8 | Ferris, R |
| Ferris, Raymond W | | | |

With any CK in Table III, one or more additional bytes (noise bytes) may be added to the right of its K-bytes from the same UK that the required K-bytes were derived. The limiting case with such added noise bytes is when the CK has all of the bytes of its UK, and then no compression exists.

Alternatively to Table III, the minimum K-bytes and the noise (N) bytes may be retained, and the factor (F) bytes eliminated. This is not equivalent to retaining the D-byte and N-byte as illustrated by the following Table IV, which is searchable under this invention:

TABLE IV

| UK | CK | | | |
|---|---|---|---|---|
| | E | F | L | K |
| Engelhard, Hans | 11 | 0 | 6 | Ludwig |
| Engelhard, Ludwig | 3 | 4 | 14 | lish, Irvine J |
| English, Irvine J | 9 | 3 | 11 | lish, Jos J |
| English, Jas J | 1 | 2 | 13 | ricson, Oscar |
| Ericson, Oscar | 1 | 1 | 14 | skind, Ralph R |
| Eskind, Ralph R | 2 | 2 | 12 | posito, Blas |
| Esposito, Blas | 1 | 3 | 17 | vancie, Kenneth G |
| Evancie, Kenneth G | 1 | 1 | 20 | zequelle, Jonathan A |
| Ezequelle, Jonathan A | 0 | 1 | 15 | Fahnestock & Co |
| Fahnestock & Co | 2 | 0 | 13 | mularo, Jos J |
| Famularo, Jos J | 2 | 2 | 15 | rewell, Richd L |
| Farewell, Richd L | 3 | 3 | 11 | rar, Carl E |
| Farrar, Carl E | 1 | 2 | 14 | eeney, Kermit |
| Feeney, Kermit | 2 | 1 | 12 | nnell, Lee T |
| Fennell, Lee T | 2 | 3 | 23 | rris, Harriet Akin, Mrs. |
| Ferris, Harriet Akin, Mrs | 8 | 3 | 9 | Raymond, W |
| Ferris, Raymond W | | | | |

Another less than minimum variation is to include with the minimal K-bytes at least the most significant noise byte by increasing it to the next higher character in the collating sequence being used. This is particularly appropriate when the rules described for Basic Situation I are used, since it causes a *greater than* situation for the K-bytes, which is advantageous for searching the compressed index. In the latter case, whenever the first noise byte is the highest character in the collating sequence, the next noise byte is also added to the K-bytes because the highest character cannot be raised in value. If any added noise byte is the highest character, the next noise byte is added until an added noise byte is not the highest character in the collating sequence. Only the last-added noise byte is raised to the next higher value in the collating sequence. It will be rare that more than one noise byte is required. The following Table shows an example of index compression using the latter type of operation with the Binary-Coded-Decimal Collating sequence in which byte A follows the comma (,):

TABLE V

| UK | F | L | K |
|---|---|---|---|
| BOON, CLYDE E | 0 | 5 | BOONA |
| BOONSTRA, PIET W | 4 | 0 | — |
| BOOS, Donald | 3 | 2 | SA |
| BOOTH, RICHARD R. | 3 | 5 | TH, RJ |
| BOOTH, ROBERT A. | 7 | 2 | OC |
| BOOTH, RONALD | 8 | 0 | — |
| BOOTH, VERNON | 6 | 0 | — |
| BORCHLEWICZ, ROBERT J | 2 | ? | — |
| . | | | |
| . | | | |
| . | | | |
| BOYD, DARRELL C | 0 | 0 | — |

F = No. of bytes factored from the left end of the key.

L = No. of bytes of the key recorded in this index entry.

The shift concept of "left-shift, no-shift, and right-shift" compressed keys need not be studied to be able to make and use this invention, since the shift concept is not directly used by the steps within the method of the invention, such as in FIG. 16. However the shift concept is useful to those who want a deep background understanding of the internal functioning of the invention, and of the theory behind the invention. It is for these reasons that the shift concept is presented in FIGS. 12, 13, 14A, B, C and FIGS. 15A, B.

FIGS. 14A, B, and C represent UK sequences for illustrating the operations of the compressed key generation methods described in detail in previously cited copending application Ser. No. 788,807. The UK's and corresponding CK's in FIGS. 14A, B, and C numbered in the left vertical column titled "Key No." The byte positions in each UK are numbered 1 through 11 across the top of FIGS. 14A, B, and C. Each UK byte is represented by a symbol B, which may be any character in any character set, within the constraints of the sorted sequence of UK's. That is, any byte in any column can only be equal or higher in the collating sequence than its immediately preceding byte in that column; it cannot be lower than its preceding byte in the same column for ascending sort conditions. The reverse is true for a descending sort.

Although a fixed number of byte positions is assumed for each UK illustrated in FIGS. 14A, B, and C, the representation is true for varying numbers of bytes in the UK's. The difference position identified as $D_B$ in FIG. 13 (obtained by comparing any pair of UK's) is designated by a D in FIGS. 14A, B, and C to indicate the different byte position in the second UK of any pair being compared. Equal E bytes for any pair comparison are found to the left of each D-byte, and noise N-bytes are found to the right of each D-byte.

A solid vertical line is drawn to the right of each D-byte, and it is connected to each adjacent vertical line by a horizontal line.

The vertical dashed lines in FIGS. 14A, B, and C similarly are drawn on the right boundary of the factor byte positions F.

The $F_N$ column represents a minimum F-value. The $F_X$ column represents a maximum F-value. The $F_N$ and $F_X$ values differ only for some left-shift CK's, and they are equal for no-shift and right-shift CK's. The vertical dotted lines are drawn on the right side of only those $F_X$ positions which differ from the $F_N$ positions in the same UK. Where $F_X$ and $F_N$ are equal, the vertical dashed lines represent both $F_N$ and $F_X$.

The K-byte field for any CK is bounded on the left by a vertical dashed line and is bounded on the right by a vertical solid line. Where the solid line ($D_B$ boundary) and dashed line (F-boundary) bound the *same* UK byte, or where the solid line is to the *left* of either the dashed line or dotted ($F_X$ boundary), no K-byte field exists for the corresponding CK and its $L_B$ is zero. The byte lengths of the fields F (factor), L (number of K-bytes), and E (number of Equal bytes) are represented in FIGS. 14A, B, and C by the respectively identified columns therein. The pointer byte associated with each UK is represented by R's in the Figures.

The first CK for each FIG. 14A, B, or C always represents a right-shift case, where $L_A$ and $F_A$ are initially set to zero. Hence the difference byte position can only shift to the right during the comparison of the first and second UK's. Thereafter in FIG. 14A, the difference byte positions (represented by the solid line) move to the left to illustrate the left shift cases. It is apparent in FIG. 14A that the first CK has an F-value of zero, and it has nine K-bytes defined by the D-position in UK-2 and accordingly its L-field is nine. The compressed keys following the first in FIG. 14A are left-shift keys as can be seen from the decreasing values of E. The left-shift keys have no K-bytes and hence each has an L of zero. The F- and L-quantities for the CK's are shown in the respectively marked columns in FIG. 14A and each is associated with the pointer at the same key number.

FIG. 14A illustrates the minimum $F_N$ value (vertical dashed lines) and the maximum $F_X$ value (vertical dotted lines). In any case, the F-field can be any value between $F_N$ and $F_X$ (the vertical dashed and dotted lines). The $F_N$ dashed line position may be preferred because it obtains a lower numerical value. In any case, no K-byte is required for a left-shift CK.

Figure 14B:
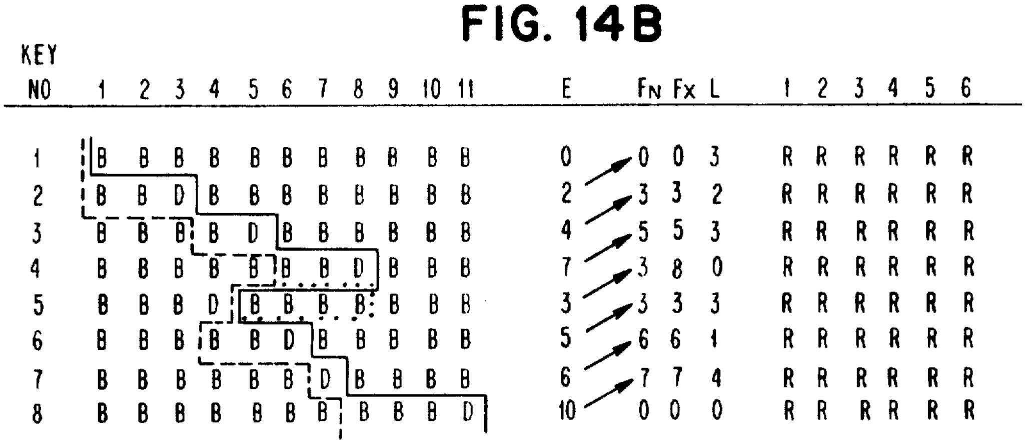

FIG. 14B illustrates the right-shift key follows an $L_A$ value of zero or not zero respectively. For example, CK–3 having an F and L of five and three is a right-shift key having a prior non-zero $L_A$ of two. However, Key Number 5 is a right-shift key following a key having an $L_A$ of zero. When $L_A$ is zero for a right-shift case, the prior difference byte position is included as a K-byte, which is required for searching continuity. Where the prior $L_A$ is not zero, the prior difference position is not included as a K-byte, since it is represented by an E (equal) byte in the F-field of the current CK. The $F_N$ and $F_X$ values are equal for right-shift keys.

Figure 14C:
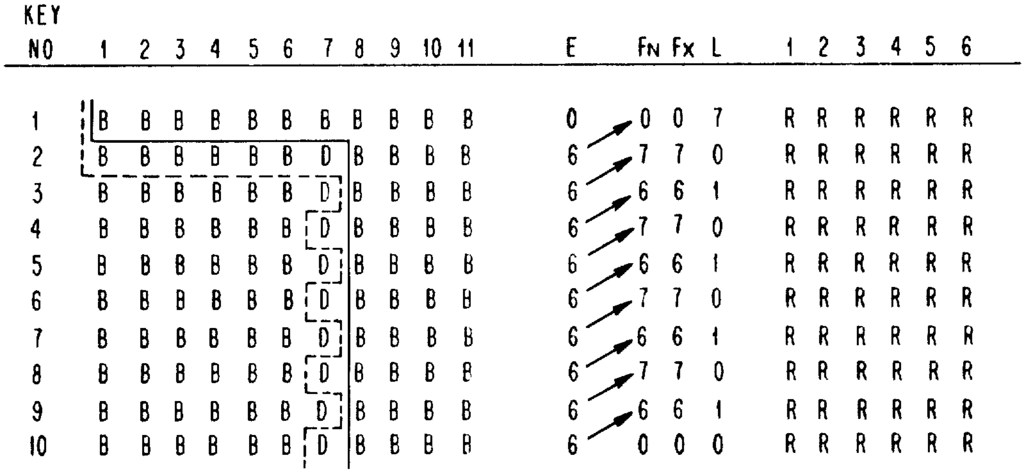

FIG. 14C illustrates the alternation in $L_B$ between zero and one when a sequence of no-shift cases occur, i.e., where the difference byte position $D_B$ remains the same during a sequence of UK compare operations. Accordingly, where a prior $L_A$ is not zero, $L_B$ becomes zero; and where prior $L_A$ is not zero, $L_B$ becomes one. The alternation in FIG. 14C occurs as L changes from 0 to 1 and back to zero, while F varies oppositely between 7 and 6. The $F_N$ and $F_X$ values are equal for no-shift keys.

FIG. 15A represents a general sequence of UK's in which the dotted, dashed, and solid lines defining $F_X$, $F_N$ and K-byte boundries represent the operation of different detailed generation methods in previously cited application Ser. No. 788,807. The corresponding F- and L-values for the CK's generated from the illustrated UK's are therein represented along with a representation of the associated pointer. This type of chart gives a dynamic view of what happens during the generation of CK's from a sequence of UK's. It is noted in FIG. 15A that a total of 48 K-bytes represent the 37 CK's therein illustrated out of a total of 518 UK bytes. Accordingly FIG. 15A illustrates a key compression of less than one-tenth of the number of UK bytes. With one byte added to each CK to represent the F- and L-values, the compression for the CK's in FIG. 15A is about one-seventh of the Uncompressed Key bytes. In practice with large indexes, the compression has been found to average less than one K-byte per key.

FIG. 15B represents the same UK sequence shown in FIG. 15A. FIG. 15B shows the lack of alternation for the no-shift sequences, which have a single K-byte and an $L_B$ of 1. The apparent simplication over the method represented in FIG. 15A results in less average key compression, where no-shift sequences are encountered. No shift-sequences are expected to be common in any large index. In FIG. 15B, 51 K-bytes result among the total of 518 UK bytes, compared to 48 K-bytes in FIG. 15A for the same set of UK's.

In any embodiment utilizing the method of this invention, it is essential that a particular format be provided for the input stream of Uncompressed Keys and for the output stream of Compressed Keys. Many aspects of the format are arbitrary, but once a format is selected, it must be adhered to since an operating embodiment is generally restricted to a particular format to obtain minimization in its design. FIG. 10 illustrates a particular format for the input string of UK's and their Pointers. Similarily, FIG. 11A provides a particular format for the resulting output string of CK's and their pointers.

In FIG. 10 each UK designation is subfixed with a number from 0 to N representing the position of the UK in the sorted sequence beginning with UK–0 and ending with UN–N.

The input format in FIG. 10 accommodates variable-length UK's by having a UK count field (UK CT) precede each UK; it may comprise a single byte of eight bits for accommodating UK-lengths up to 255 bytes. The count field is also subfixed with the same subfixed number (*0–n*) as is the UK to which it is applicable. A pointer (PTR) field is associated with each UK and has the same subfix as the UK with which is it associated. The pointer addresses the item represented by the UK. The pointer may also be variable length, and the length may be specified by a pointer count field (PTR CT) preceding each pointer field (PTR) with the same subfix. The pointer count (PTR CT) also need not use more than one byte of eight bits to accommodate a pointer address of up to 255 bytes.

The end of a UK stream is indicated after the last pointer (PTR–*n*) by an all zero byte. This all zero byte will occur when a next UK count field is expected, and therefore a valid count field cannot be zero. Accordingly, the UK generation operation terminates when a zero UK count is sensed.

Figure 11B:
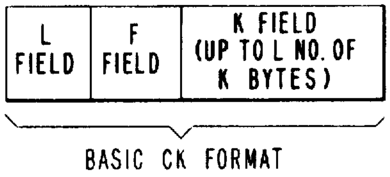

The CK (Compressed Key) format in FIG. 11A arbitrarily presumes the sequence LFK for each CK. L is the number of K-bytes in the CK, F is the number of bytes factored from the most significant side of the UK, and K represents the UK bytes in the CK, which can be absent. Any order among L and F may be used, although the order chosen must be used without exception. The format in FIG. 11A is preferred. The Basic CK format is shown in FIG. 11B. The L- and F-fields may each occupy a single byte of eight bits, or they may together occupy a single byte of eight bits, such as four bits each. The choice is dependent on the size of the L- and F-fields expected for the contemplated Index usage. The K-bytes, if any, are last in the format, with the K-bytes sequenced in the same order as in the UK from which they were derived. The pointer count (PTR–CT), and pointer (PTR) immediately follow the LFK field, and they are taken directly from the corresponding fields associated with the UK which is being represented by the CK. The last CK in a Compressed Index in Fig. 10 is indicated by having all zero bits in its L-field and F-field which are followed by the PTR CT–N and PTR–N fields, which is the corresponding field associated with the last UK in the Uncompressed Index.

It is possible to extend the L- or the F-fields to represent large numbers of characters for a relatively few CK's even though the average CK length for a Compressed Index might be small, for example between one and two bytes. Usually only a small percentage of CK's in an Index will have more than a few bytes. Accordingly it may be efficient to have an LF representation which is small, such as a single byte, which is adequate to represent for example over 95 percent of the CK's in an Index. Then special extender fields can be used for the less than 5 percent remaining of the CK's.

Figure 11C:
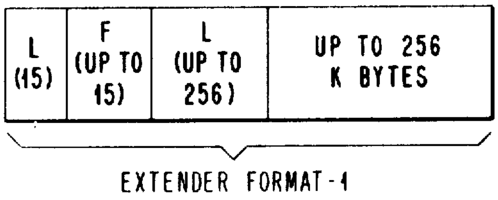
Figure 11D:
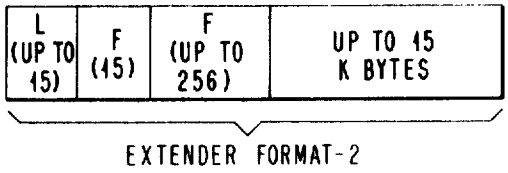

FIG. 11C shows an extender format which permits one-half byte L- and F-fields to be extended to accommodate up to 255 bytes each. As previously mentioned, L and F cannot both be zero in the format of FIG. 11A except for the last CK in a compressed Index.

The four bits for either L or F can be coded to 15 codes other than zero. One of these 15 codes, such as the code for 15, may be reserved to indicate an *extended situation* for each field. In the latter case, the L- and F-fields can each accommodate a maximum value of up to 15 bytes, i.e., a maximum value of 14. However, if either or both of the L- and F-fields should overflow beyond 14, the overflow condition is indicated by the 15 code placed in the respective field which has overflowed 14. The 15 code for either of both L or F indicates that one or two extender bytes such as in FIG. 11C, D, or E immediately follow the basic L, F-byte and before the K-bytes.

One extender byte is added if either the basic L- or F-field contains the 15 code indicating an overflow. The extender byte then entirely contains the L- or F-field for representing up to 255 bytes. An extender byte can hence be taken as the sole representation of the L- or F-value. If the L-field is extended, the number of following K-bytes is equal to the value represented in the extender byte for L.

Figure 11E:
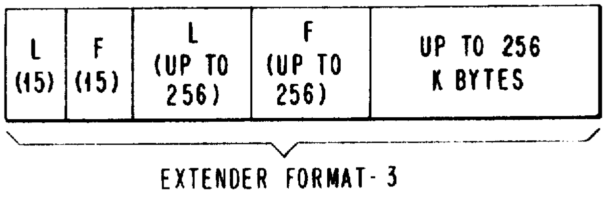

FIG. 11E represents the case where both the L- and F-fields are required to be extended beyond 14. Thus two extender bytes are added, and they have the same order as the basic L- and F-fields. Each extender value therefore contains the respective true L- and F-values. For example, if 33 K-bytes exist, and the F-value is 21, the L- and F-fields in the Basic CK Format for that CK will each contain a 15 code to indicate following L and F extender bytes which will have the quantities 33 and 21 respectively. Thirty-three K-bytes will follow the F extender byte in the CK.

The format in FIG. 10 shows an input stream of input UK's provided as the result of a prior computer UK sorting operation, such as sorting program of conventional type for handling variable-length keys, each immediately proceeded by a count field of the number of bytes in the following key, and each UK immediately followed by a pointer field for locating the data represented by the UK. The embodiment uses a variable length pointer field which is inclusive of a fixed length pointer field as a special case. For example, a fixed length pointer may comprise two bytes from which the address of the respective key can be derived by an appropriate algorithm, such as the algorithm being used in the IBM OS/360 System Program called Basic Direct Access Method (BDAM). A discussion of the addressing under this program may be found in the publicly available IBM Manual having form Number Z28–6617.

The variable pointer field may nevertheless be used with a fixed length pointer to accommodate some of the information indexed by the UK; hence the pointer count byte would designate the end of the pointer and information field and the beginning of the next UK field.

The number of bytes allocated to the UK count field must of course be compatible with the maximum permissible length for the UK's. The single byte count field (UK CT) used in FIG. 10 accommodates a maximum UK length of 255 bytes which is considered adequate for almost all situations. If required, a two-byte count field can be used, which will accommodate a maximum UK length of over 16,000 bytes.

The input byte sequence described in connection with FIG. 10 is transmitted from a source 81 into a source memory 83 shown in FIG. 1 which may be any type of byte randomly accessible memory, such as magnetic core memory, thin film memory, monolithic memory, etc.

FIG. 11A illustrates the format for the compressed keys (CK's) outputed from a Destination Memory such as I/O device 350 in FIG. 1. This CK stream is in a form which can thereafter be used for searching for the information indexed therein.

The destination memory may be any kind of memory including a sequential memory such as a disk or drum, continuous or incremental tape, or a random accessible memory such as even the same memory in which the compressed keys are generated.

Accordingly an Uncompressed Index string of bytes having the format represented in FIG. 10 provides the Compressed Index string of bytes represented in FIG. 11A.

In FIG. 1, I/O device 350 stores the CK's as a Compressed Index comprising a string of bytes having the format shown in FIG. 11A.

Additionally, two different data path embodiments with different control circuits are disclosed herein for executing the unique methods disclosed herein.

The first search-mode data path embodiment is shown in FIGS. 1–9B. It is used for searching a Compressed Index shown in FIG. 11A with the basic CK format shown in FIG. 11B in which the L-field and F-field each occupy different one-byte positions in a physical store and are transferred as separate one-byte signals in the data path. Hence with an eight-bit byte, excluding redundancy, for each of the L- and F-fields in the FIG. 11B format, the L- and F-fields can each represent a value up to 256, followed by up to 256 K-bytes. As shown in FIG. 11A, each Compressed Key has an associated pointer (PTR).

A second data path embodiment is shown in FIGS. 20–27A and B. It can search an index having any of the formats in FIGS. 11A–E, in which the basic L- and F-fields together occupy a single byte, so that they can be transferred in parallel by a single-byte signal transfer bus. In the second embodiment, the L- and F-fields in the format of FIG. 11B may each occupy half bytes of four bits, and each K-byte may occupy a single byte. Each extender byte for L or for F in FIG. 11C, D or E may occupy a full byte.

Any of the disclosed methods in FIGS. 16, 17A, 17B, 18, and 19 can search a Compressed Index using a maximum or minimum $F_B$ value, as defined in previously cited application Ser. No. 788,807, or any value therebetween. Also, they are capable of searching for any Uncompressed Search Argument (SA) that was represented in the Uncompressed Index from which the Compressed Index was generated. Further, any of these methods are capable of searching for any Uncompressed Argument that was not represented in the Uncompressed Index from which the Compressed Index was generated, and can indicate that the SA will not be found therein. Any of these methods can find the approximate place of insertion in the Compressed Index for a Search Argument, if it is required to be later inserted as a key into the Compressed Index.

BASIC METHOD

Any of these methods, such as in FIG. 16, can begin searching a Compressed Index at any CK having a Factor field F of zero. Only the first CK in the index can be guaranteed to have a zero factor field value, and hence a search will normally start at the beginning of the compressed index. The first CK in the Compressed Index has a zero F-field and a nonzero L-field. A zero F-field also occurs in the Compressed Index for each CK generated from a UK pair in which the difference position was at the most significant byte position. (The "difference position" is the byte position D shown in FIGS. 12, 13, 14, and 15A and 15B. The subscripted forms of D are $D_A$ and $D_B$ in FIGS. 12 and 13 respectively representing the prior and current "difference positions".) The search of a Compressed Index proceeds sequentially through the ordered CK's until the search ends, which occurs where the SA is found, where the SA is indicated not in the Compressed Index, or when the End of Index or End of Record is reached. Where an End of Record is indicated without a found condition or an End of Index, the search is continued with the next record.

Any of these methods, such as in FIG. 16, compares the SA bytes to the K-bytes sequentially provided from the beginning of a search. Only a single SA byte, hereafter called an A-byte, need be handled at any one time. The A-bytes are handled in the order in which they exist in the SA, with the most significant A-byte being handled first. A register, or other physical storage location, is provided to store each received A-byte while it is being searched, and such register may be called an A-register.

An Equal Counter $E_C$ is acted upon by each of these methods, such as in FIG. 16. The Equal Counter, $E_C$, is a register or an addressable and available physical storage location. The $E_C$ counter is initialized to a zero value before making a search pass through a Compressed Index. The $E_C$ content is incremented by one for each A-byte found equal to a CK bytes during a search pass.

The Equal Counter content $E_C$ at any time designates the byte position in the SA of the current A-Bytes being handled. That is, the current A byte is located at the ($E_C$+1) byte position in the SA from its most significant byte position.

The conditions for ending a search with any of these methods is represented in FIG. 16 by the respective paths (4), (5), (6), (9), (10), (11), and (12) to step 226, which reads the pointer with the current CK, and enters step 227 which ends the operation.

The SA may or may not be found in the compressed index, because it may not have been represented as a UK in the Source Uncompressed Index from which the Object Compressed Index was generated. The Object Compressed Index is designed with the objective of being efficiently searchable whether or not the SA is known before hand to have been in the Source Uncompressed Index. Another searchability objective is to permit the search to end as soon as possible before the End of Index is reached whether or not the SA is found in the Index. The objectives are attained by ending a Search upon sensing the *first* CK to compare-high with the SA. Or stated in converse terms, the search ends the *first time* the SA compares-low with any CK, which is another way of expressing the substance in the prior sentence. This CK may be called either an "End of Search" CK, or a "first-high" CK. Before the SA compares-low, the SA compares-high or compares-equal with every prior CK in the Object Compressed Index, unless the SA compares-low with the first CK in the Index. When the SA *first* compares-low with a CK, its associated pointer is read. Conventional computer programs, such as the IBM OS/360 Basic Partitioned Access Method (BOAM), can retrieve the information when given a pointer. Also the information retrieval can instead be done manually by using the pointer, as well as by using a programmed computer system.

The retrieved information (retrieved with the use of a pointer) is used to reconstruct the UK which represented it in the Source Uncompressed Index, since the UK byte positions are known in the retrieved information.

The SA is compared to the reconstructed UK. If the SA compares-equal with this reconstructed UK, a verification is thereby made that the SA has found the looked-for data; but if they do not compare equal, the SA is not represented in the Compressed Index. Conventional data retrieval methods perform similar types of compare operations with uncompressed keys for verifying the correctness of a retrieval. This Uncompressed Comparison therefore verifies whether the SA is or is not in the Index.

If required, the Index can later be updated to include such SA not currently in the Index.

If the SA was not represented as a UK in the Source Uncompressed Index, the first compare-high condition nevertheless correctly ends the search. It indicates at the earliest possible time that the SA cannot be found later in the Index; and hence, it saves the time which would be wasted by further scanning the Compressed Index. The End of Search CK also closely identifies the place in the Compressed Index where a key would need to be inserted at a later time if the Index is to be updated with the SA.

A compare-equal between corresponding bytes A and K in the SA and any CK does not necessarily end the search. Any right-shift CK, or no-shift (L=1) CK may compare-equal or compare-low to the SA *prior to* the first compare-high CK. This compare-equal condition is represented in FIG. 16 by exit (14) which causes the next CK to be entered when any CK compares-equal to the SA, and more SA bytes remain to be handled.

If the comparison of the SA were continued *after* the first compare-high CK, further insignificant compare-equal, low or high situations with later CK's are possible. Such "after" comparisons are with the "noise" part of the SA, i.e., with byte positions of less significance than the D position in the first compare-high CK.

POINTER ARCHITECTURE

The "pointer design" found in the Object Compressed Index is executed when it is generated from the Source Uncompressed Index, in the manner described in the prior cited application Ser. No. 788,807.

The "pointer design" ties each respective UK pointer to the CK derived from the next UK. That is, each CK has a pointer which accesses the information represented by its adjacent prior UK. Thus if the SA is equal to the logically prior UK, the CK with the pointer of that prior UK is the *first* compare-high CK with respect to that SA. Also, if an SA is not equal to an originally listed UK but is less than its logically next CK, the SA will compare-high with that CK to end the search. Hence, this "pointer design" causes the first CK to compare-high with the SA to have the correct pointer for ending a search; and any CK which compares-equal with an SA can not have the correct pointer. Consequently, the only pointer which must be read during a search is the pointer with the *first* high CK. All other pointers may be skipped.

The "pointer design" is described in more detail by the pointer displacement represented by the arrows in FIGS. 14A–C, 15A, and 15B. This displacement may be explained in terms of the generation of each CK from "UK pair," i.e., a pair of adjacent Uncompressed Keys, UK–Y and UK–Z, in a sorted Index of UK's such as found in FIG. 15A. FIG. 13 represents any "UK pair," UK–Y and UK–Z, as the $j$th UK and $(j+1)$th UK, respectively. The CK was derived from UK–Z, while its associated pointer is obtained from UK–Y. In terms of FIG. 13, the pointer with the $j$th UK is associated with the CK derived from the $(j+1)$th UK while comparing the $j$ and $(j+1)$ UK's. This causes the derived CK to *compare-high* with the corresponding byte positions in the $j$th UK, so that a search will end with the *first* compare-high CK, when the SA is equal to the $j$ UK, or less than the $(j+1)$ UK. Then, any search can properly end upon sensing an SA having its *first* compare-high condition with a CK (which is the compressed form of UK–Z) and to read its pointer. This is the correct pointer since it is the only pointer which can possibly obtain the information indexed by the SA. Hence, the pointer with the first compare-high CK is read out and available at the end of the search.

Accordingly with this "pointer design," the first high CK, exclusive of its associated pointer, cannot itself represent the searched information because it has been found *higher than* the SA. But the *first* CK in the Index sequence to *compare-high* with the SA, is associated with the only pointer which can be representative of the searched-for information. Hence the pointer with the *first high CK* is the only pointer which can retrieve the information represented by the immediately prior logical UK, which is the only UK which can be equal to the SA.

Thus if the SA was represented in the Source Index as a UK, a compare-equal CK may exist immediately before the first high CK. This double CK condition of a compare-equal CK immediately followed by a compare-high CK might be used to signal that the SA was in the Source Index without retrieving information with any pointer; but not all cases of the SA being in the Index can be detected by this method.

Hence the detection of the first CK higher than the SA is the purpose of the method in FIG. 16. That is, this first higher CK represents the first high UK in the original Index.

The detection of the SA to CK relationship is not a simple matter of only comparing K-bytes to A-bytes to find the first compare-high condition, as would be done if the SA were compared against the original UK Index in a conventional search for the SA. The F-field of a CK can, in some cases, alone and without any K-bytes, determine the first high-condition for a CK, and thereby cause a search to end via exit paths (4) or (5). Step 203 in FIG. 16 compares the F-field to the current $E_C$ counter content for a determination of whether a CK is higher or lower than the SA. (The colon symbol, :, inside any diamond-shaped box in the Figures has the meaning "is compared to." For example $E_C$:F means $E_C$ compared to F.) Step 203 cannot make a final determination of an equal condition between the CK and SA, but its exit path (3) can begin the process of such final determination.

The Exit CK Legend in FIG. 16 clearly represents the exit condition for each type of key. The two-digit notation, such as (B)L is later described in detail. It has a first digit in parentheses which represents the relationships: less than (B), equal to (E), or greater than (H) between a CK and the SA. The second digit represents the type of CK involved.

DETAILED METHOD DESCRIPTION

The method of FIG. 16, as well as most of the other methods, begin with Step 201, which resets the Equal Counter content $E_C$ to all zeros, and causes the most significant A-byte in the SA to be read into an A-byte register. Then Step 202 is entered which reads the F- and L-fields of the next CK. Initially the next CK is the first CK in the Compressed Index. The L-field (which represents the number of K-bytes in the CK) may be transferred to a register correspondingly designated L. A zero-test can then be performed on the contents of the L-register, and the test result may be stored in a trigger (or bit position) as a "1" or "0." The test results can later be sensed by way of Steps 202*a*, *b*, and *c*.

Step 203 then executes a comparison between the $E_C$ counter and F-field. The colon symbol (:) in the drawings means "is compared with." The first CK has a zero F-field. Since initially $E_C$ is set zero, Step 203 finds equality on its first comparison and goes to Step 202*c*, which acts accordingly to sense the zero or nonzero state of L, and thereby to channel the operation along path (6) or (3).

Subsequent executions of Step 203 with CK's after the first will not necessarily result in equality, in which case any of Steps 202*a*, 202*b* or 202*c* can be entered to also select among paths (1), (2), (3), (4), (5), or (6) in FIG. 16. Only a single one of paths (1)–(6) is taken while handling any single CK.

Paths (1) and (2) branch into another iteration of Steps 202, and 203 for handling the next CK without handling any K-byte. Paths (4), (5), and (6) end the operation for a given SA by causing a pointer to be read out. Only path (3) is used for handling K-bytes, and it enters Step 208 for a comparison between the A- and K-bytes. Path (3) also uses Step 206 for decrementing the L-value in order to maintain a count of the remaining number of unhandled K-bytes in the current CK, after the next K-byte. With exit steps (1), (4) and (6), the greater than or less than relationship between an SA and a CK which does not have K-bytes (left-shift, or no-shift (L=0) CK's) is determined by Step 203. It can also determine in some cases that an SA is higher than a right shift CK without handling any of its K-bytes.

As shown in FIG. 16 by the exit CK legend, the equal relationship between $E_C$ and F determined by Step 203 takes path (3) and (11) with no-shift (L=1) and right-shift CK's whether or not a first compare high exists, and takes path (6) with no-shift (L=0) CK's and left-shift CK's when any is a first compare-high CK.

If $E_C$ is less than F, the current A-byte must be greater than a factored byte at the ($E_C$+1) byte position in the UK from which the current CK was derived. In this case no further processing of this CK is necessary whether it is right-shift, no-shift, or left-shift; and the search proceeds to the next CK. In going to the next CK, any intervening bytes, such as L, K, or pointer bytes may be skipped over to speed the searching process. This skipping is assisted by entering Step 202*a* to determine whether path (1) or (2) in FIG. 16 should be followed. If no K-bytes exist (L=0), path (1) is taken to Step 211*a*, which skips the pointer bytes associated with the rejected CK, so that the next CK may be entered by Step 202. If K-bytes exist at Step 202*a* (L not zero), path (2) is taken by entering Step 209*a* to skip the K-bytes, and then Step 211*a* is entered to skip the pointer bytes as with path (1).

From Step 203 the path (4) condition of $E_C$ being greater than F is found when the left-shift CK is the first CK higher than the SA. The left-shift CK can follow any type of CK.

The path (5) condition terminates a search under certain conditions for left-shift condition even though redundant K-bytes are included in the CK.

The equal exit from Step 203 enters Step 202*c*. If L=0 path (6) is taken the pointer is read and the search is terminated. Path (6) is taken when the first CK higher than the SA is a left-shift case or a nonshift case with no K-bytes.

However, a right-shift CK or a no-shift CK with a K-byte is determined by Step 202*c* finding a nonzero L-byte. Then path (3) is selected for processing each K-byte with respect to the Current A-byte. The K-bytes are processed one at a time in their CK sequence with the most significant (leftmost) K-byte first. An initial housekeeping Step 206 is entered by path (3), in order to determine when all K-bytes for the current CK have been fetched. This is done by decrementing the current L-register contents by one, and storing the decremented value back into the L-register. The decrement L-value is zero-tested and stored for sensing by any of Steps 206*a*, *b*, *c*, and *d*. The test results can be stored in the same place used to store the result for Steps 202*a*, *b*, and *c*.

Path (4) or (6) is also used to terminate a search upon occurrence of the last CK, i.e., L=0 and F=0, such as shown in FIG. 11A. Thus if F=0 and $E_C$ is not zero, path (4) will be taken. But if $E_C$ is zero, and both L and F are zero, path (6) will be taken.

If a Compressed Index comprises multiple blocks, the End of Index CK may be distinguished from the end of each Block CK, except the last, by having an all-zero pointer length byte with L=0 and F=0, at the end of the last block, and a true pointer is used. Thus an end of block CK of a block which is not the last block of an index would have L=0 and F=0 and a nonzero pointer count byte. In either case, the end of block CK would take path (4) or (6).

Then Step 207 reads the first K-byte of the CK, and Step 208 is performed by comparing the K-byte with the current contents of the A-register.

One of the nine branch paths (7)–(15) is chosen after exiting from Step 208. Four of these branch paths (13), (7), (10), and (12) are dependent on the "greater than" or "less than" relationship between A and K. The remaining five paths, (8), (9), (11), (14), and (15) are entered only if A and K are equal. Paths (8), (14), and (15) are dependent upon the existence of more A-bytes after the current A-byte.

However, Steps (9) and (11) are used if no more A-bytes exist after the current A-byte, in which case the pointer is read following the current or next CK according to whether path

(11) or (9) is taken, respectively. Whenever the pointer is read, the operation for the current SA is ended by Step 227.

If Step 208 finds the A-byte greater than the K-byte, the search continues by going to the next CK via Step 206*a*, because the SA must be higher in the Compressed Index than the current CK. If Step 206*a* indicates more K-bytes remain to be read from the current CK, path (7) is taken to Step 209*a* for bypassing the remaining K-bytes. Then Step 211*a* is entered to bypass the associated pointer bytes in preparation for entering the next CK. But if Step 206*a* finds no more K-bytes are to follow, path (13) is taken to Step 211*a* which skips the associated pointer bytes in preparation for entering the next CK.

The execution of either or both of Steps 209*a* or 211*a* can be (1) by sensing and ignoring the required number of bytes in a serially provided Compressed Index byte stream, or (2) by indexing over the required number of bytes stored statically in a randomly accessible memory.

If Step 208 determines the A-byte is equal to the received K-byte, Step 216 is entered to test if there are more A-bytes. A retrieval decision is made at Step 216 only if the SA has been completely received. Step 216 can be executed in a number of ways. For example, if an SA byte count is available, it can be decremented with each received A-byte; and more A-bytes will remain as long as the decremented count is not zero. Or a request for a next A-byte can be made of an A-byte source such as a computer channel, and the response will pulse a line if more A-bytes exist. If there are no more A-bytes for the SA, the type of retrieval decision is dependent on whether more K-bytes exist. Step 206*c* tests if there are more K-bytes by the previously explained zero test of the decrement L-value in the L-register. If more K-bytes exist, the current CK must be greater than the SA, and path (11) is taken for reading the current pointer as the retrieval decision. Hence the remaining L-bytes are skipped by path (11) entering Step 209*c*, and then Step 226 stores the pointer associated with the current CK.

If there are no more K-bytes indicated by Step 206*c*, path (9) is taken, indicating that the SA is equal to the CK. But the SA is not necessarily equal to the UK represented by this CK. The UK from which this CK was derived could possibly be longer than the SA due to noise bytes which were dropped. Also, it is possible that this UK did not have any noise bytes, in which case the SA is equal to that UK represented by this CK. However, as previously stated, a CK derived from a UK equal to the SA cannot have the correct pointer, but the next CK will have the correct pointer. Hence, path (9) reads the pointer with the next compressed key as the found pointer, since the next sequential compressed key is the one which would obtain the *first* compare-high with the SA. Accordingly, path (9) enters Step 211*b* for skipping the current pointer with the current CK, then Step 223 skips the next F- and L-bytes followed by Step 209*c* which skips any K-bytes so that the next pointer is read (associated with the next CK) as the found pointer ending the search in this case.

However, path (8) is taken if Step 216 indicates there are more A-bytes. In this case, Step 217 is entered to cause the next A-byte to be handled. The Equal-Counter content $E_C$ is increased by one by entering and executing Step 218. When more K-bytes are indicated by zero-test Step 206*d*, the next K-byte is fetched, and Step 206 is re-entered to decrement L by one. The new A- and K-bytes are then compared via Step 208, and if there are more K- and A-bytes the same iteration via Steps 216, 217, 218, 206*d*, and 208 occurs until there are either no more K-bytes or no more A-bytes.

The Equal-Counter ($E_C$) is increased by Step 218 only when a K-byte is found equal to an A-byte by Step 208 and Step 216 finds more A-bytes exist to exit along path (8) for entering Step 217 to obtain the next A-byte. Only right-shift and no-shift (L=1) CK's can increase the Equal Counter $E_C$, because only these CK's can take path (3) which is the only way of getting to Steps 208, 216, 217, and 218.

If Step 206*d* indicates L has been incremented to zero, Step 211*a* is entered to skip the pointer associated with the current CK and enter the next CK Step 202.

The following Exit Table is a summary of the above-discussed exit paths for the different types of CK's. The legend used in the table is as follows:

LEGEND

| | |
|---|---|
| L | Left-Shift CK. |
| R | Right-Shift CK. |
| $N_0$ | No-Shift (L=0) CK. |
| $N_1$ | No-Shift (L=1) CK. |
| (B) | CK is less than SA, i.e., (SA>CK). |
| (E) | CK is equal to SA, i.e., (SA=CK). |
| (H) | CK is greater than SA, i.e., (SA<CK). |
| Post Number | To distinguish different exit conditions for same type of CK. |

For example, (B)L represents a left-shift CK which is less than the SA, and exits at path (1). Another example, (B)R–1, (B)R–2 and (B)R–3 represent different exit conditions for a right-shift CK when it is less than SA. Note that L is always appended to either (B), (E) or (H) when L represents a left shift CK, and hence it is distinguished from the stand-alone use of L to represent the content of the L-field in any CK.

EXIT TABLE

| Exit Path | Exit to Next CK When: |
|---|---|
| (1) | (B)L, (B)$N_0$, (B) R–3, (E)L, or (E)$N_0$. |
| (2) | (B) $N_1$–1. |
| (7) | (B) R–2. |
| (13) | (B) R–2, (B) $N_1$–2. |
| (14) | (B)R–1, (E)R, or (E)$N_1$, handled |
| **Exit Path** | **Exit to Read Pointer When:** |
| (4) | (H)L (min F). |
| (6) | (H)L (max F), or (H)$N_0$. |
| (9) | (E)R, or (E)$N_1$, and $E_C$ = number of bytes in SA. |
| (10) | (H)R with determination at last K-byte. |
| (12) | (H)R with determination before last K-bytes |

The exit-oriented CK representations in the above table are shown on FIG. 16, without any post numbers.

The above-described method of FIG. 16 continues until a pointer is read out by Step 226 in response to each SA, or until the End of Index is reached to indicate the SA is higher than any CK in the Index. The pointer found for any given search argument can obtain the record having the index of the search argument (SA) only if the search argument was in the Source Uncompressed Index. If the search argument was not represented in the Object Compressed Index being searched, the pointer read will not represent the search argument. As previously explained, the determination of whether or not the pointer represents the search argument requires that the pointer be used to retrieve its represented data block, from which the original Uncompressed Key is derived, which was used during the generation of the Object Compressed Index. The retrieved Uncompressed Key is then compared with the search argument. If they compare equal, the read pointer was the true pointer, and the search argument is represented in the Compressed Index. However, if the Uncompressed Key and search argument do not compare equal, the search argument was not represented in the Compressed Index and the read pointer represents a boundary condition and not the argument.

DETAILED EXAMPLE OF FIG. 16 OPERATION

A detailed example may readily be given for the operation of the inventive method shown in FIG. 16 to illustrate the use of this method. The search example may use the generation example of a compressed index shown in Table II herein. The CK's shown in Table II have the FLK format on each line, and when scanned from the top of Table II to its bottom only along its FLK fields, it provides a sequential index beginning at "0 12 Engelhard, L" and ending at "3 6 ris, R." Each CK in Table II is presumed to have a pointer, R, associated with it, as represented generically in FIG. 15A, so that the FLK pointer sequence for the compressed index is that shown in FIG. 11A. The pointer associated with a CK addresses the record having the UK shown on the same line in Table II.

With the method in FIG. 16, any of the UK's given in Table II may be used as a search argument to find the associated CK in Table II. For example, suppose that "Ericson, Oscar" (the fifth UK in Table II) is used as a search argument. In FIG. 16, we start with step 201; it initializes the equal counter $E_c$ by setting it to zero; and it reads the first A-byte which is the first character E of the search argument "Ericson, Oscar," which has 14 bytes including the blank between the comma and O.

Then step 202 enters the next CK and reads its F- and L-fields. Initially the next CK is the first CK; and this obtains "0 12" as the F- and L-fields, respectively, from the first CK in Table II.

Step 203 is entered, and it compares the current equal counter setting $E_c$ to the F-field. Since both $E_c$ and F are zero in this initial comparison, they compare equal, and the equal (=) exit is taken from comparison step 203 to step 202*c*. Step 202*c* tests L to sense if it is zero, and it finds that L is not zero (since L is 12). Exit path (3) is therefore taken from step 202*c* to step 206. Step 206 decrements L by one (i.e., L=12=1) to provide a new current value for L which now is 11. Then step 207 reads the first K-byte of the CK, which is the next byte E, since the bytes are being read in their recorded sequence in the compressed index. Next, step 208 compares E (which is the current A-byte) to E (which is the current K-byte), and finds they are equal. Hence the equal (=) exit is from step 208 to step 216. Step 16 indicates more A-bytes exist after the current A-byte, E, since there are 14 A-bytes in the search argument and only the first A-byte has been accessed. Step 217 is next entered to read the next A-byte, which is *r*.

Then step 218 is entered to recompute the equal counter setting by incrementing its existing setting. Hence its setting is increased from 0 to 1, which now becomes the current setting of $E_c$.

Step 206*d* is entered to determine if the current value of L is zero. Since L is not zero (it was last made 11 by step 206), the not equal ( ≠ ) exit (15) is taken from step 206*d*, and step 206 is re-entered.

Thus step 206 again decrements L to the value of 10 (i.e., 11−1), and step 207 reads the next K-byte, which is *n*. Step 208 compares the current A-byte, which is *r* (as last mentioned regarding step 217) and the current K-byte, which is *n*. Step 208 finds *r* is greater than *n;* and the greater than (>) exit is taken from step 208 to step 206*a*. Step 206*a* (like step 202*c* and 202*d*) compares L to zero. Here L is not zero; and the not equal ( ≠ ) exit (7) is taken to step 209*a*.

Step 209*a* bypasses the remaining bytes in the CK, which are "gelhard, L" by skipping them as they are serially read. Then step 211*a* is entered from step 209*a* to also bypass all bytes in any associated pointer. Step 202 is then re-entered to enter the next CK.

The next CK immediately follows in the input sequence of bytes; and in Table II the next CK is "4 0" which means that F is 4, L is zero, and the CK has no K-bytes. Step 202 accesses these F- and L-bytes. Then step 203 compares the current $E_c$ setting of 1 (last obtained by step 218) with the current F-field of 4. Hence step 203 finds that 1 is less than 4, and the less than (<) exit is taken to step 202*a*. Step 202*a* finds L is zero in the current CK, and exit (1) is taken to step 211*a* which bypasses the associated pointer. Then step 202 again is re-entered to access the next CK, which is "3 7 list, J" in Table II.

Step 203 then compares the current $E_c$ setting (which is still 1) with the F-field of 2 in the current CK. Step 203 finds 1 less than 3, and takes its less than (<) exit to step 202*a*, which finds L is not equal to zero (since L is 7). The not equal ( ≠ ) exit from step 202*a* is taken to step 209*a* to bypass the K-bytes of "lish, J" in the current CK, and step 211*a* is entered to bypass the associated pointer.

Step 202 is then re-entered to enter the next CK, which is "1 1 s" in Table II. Then step 203 compares the current $E_c$ setting (it is still 1) with the F-field of 1 in the current CK. Step 203 now finds $E_c$ and F are equal, and it takes its equal exit (=) to step 202*c*.

Step 202*c* finds L is not equal to zero (L is currently 1), and its not equal ( ≠ ) exit (3) is taken to step 206. Step 206 decrements L to generate the new current value of zero for L (i.e., 0=1−1). Step 207 is then entered to read the next byte, *s*, which is the K-byte. Step 208 compares the current A-byte, *r*, with the current K-byte, *s*. Thus step 208 finds *r* is less than *s*, and the less than (<) exit is taken to step 206*b*. Step 206*b* tests the current value of L, which is zero (due to the last operation of step 206). Accordingly, step 206*b* finds L equal to zero, and its equal (=) exit (10) is taken from step 206*b* to step 226, which reads the associated pointer. The search is then ended by step 227 at this current CK, which is "1, 1, s."

It is seen in Table II that the search ends at compressed key "1 1 s," which is the compressed key corresponding to the said argument "Ericson, Oscar" on the same line in Table II. This example therefore has shown how the method in FIG. 16 can be used to find a search argument represented in a compressed index. The associated pointer with the compressed key "1 1 s" can then be used to retrieve the data block having the UK "Ericson, Oscar."

ALTERNATE METHOD EMBODIMENTS

Many different implementations may be provided for the method represented in FIG. 16, such as the flow diagrams in FIG. 17A or 17B. FIG. 17B is an example of an adaptation of the method of FIG. 16 to the hardware data-flow path represented in FIG. 1.

In FIG. 16, a particular sequence is shown in the flow diagram. Nevertheless, the order of the events for a particular variable is unimportant within any subsequence part of the flow diagram as long as the variable does not change in the subsequence. Thus, the flow diagrams in FIGS. 17A and B modify the sequence order, or accomplishes certain functions in parallel, within some of the subsequences represented in FIG. 16, in which the pertinent variable does not change.

The same reference numerals are used for common steps in FIGS. 16 and 17A, although post reference indications are indicated in FIG. 17A where the Step in FIG. 16 has plural representations.

The flow diagrams in FIGS. 17A and 17B are, therefore, other embodiments obtaining operations similar to the flow diagram in FIG. 16. FIG. 17B obtains a maximum degree of uniformity among the blocks of the flow diagram in order to obtain optimization in the design of still another embodiment in FIG. 1.

The results obtained by the flow diagram of FIG. 16 may also be obtained by changing the illustrated order of certain Steps in FIG. 16. FIG. 17A obtains the same results as FIG. 16 but with a varied order of some of the steps. Thus, in FIG. 17A, the same reference numerals are used as in FIG. 16; except where a particular step in FIG. 16 is split into more than one step in FIG. 17A, there are added post-reference designators at the end of the same reference numeral used in FIG. 16. Steps 207 and 206 could be interchanged in sequence without modifying the operation of the invention.

In FIG. 17A, the L-value is decremented by Step 206–1, zero-tested by Step 206–2, and then the next K-byte is read by Step 207 with one added thereto in order to make it a 2's complement for executing the immediately following Comparison Step 208. The choice of 2's complement addition for the comparison step is preferred because of the choice of the type of adder 376 in a chosen data path. FIG. 17B does likewise with corresponding Steps 306, 307, and 308.

In FIG. 17A, Step 202 is split into two Steps (202–1 and 202–2), and Step 204 intervenes between them. This is permissible because Step 204 is dependent upon the reading of L in Step 202–1 but it is dependent of the reading of F in Step 202–2. Likewise, Step 203 is independent of Step 204; hence the order of the occurrence of Steps 203 and 204 is immaterial. This type of philosophy is found in the remaining differences between FIGS. 16, 17A and also 17B.

Thus, in FIG. 17A, the Zero Test Step 204 for L immediately follows the reading of L by Step 202–1, and they may be done in a single clock cycle. Next the F-byte is read by Step 202–2 and it may immediately be compared with $E_C$ by Step 203, which also may be done in a single clock cycle.

The logic in FIG. 16 requires that both the $E_c$:F comparison Step 203 and L=0 Test Step 204 be performed before a determination can be made of which of paths (1) and (6) can be taken. This same logic applies to FIG. 17A where the result of the zero test by Step 204 is stored pending determination of the $E_c$:F comparison. The test may be stored in a single bit position as either a zero or a one, and for example a zero representing L being not-zero, and a one representing L being zero. When comparison Step 203 is completed, the stored value for the zero test of L is sensed by one of Steps *202a1*, *202a2*, *202b1*, *202b2*, *202d1*, or *202d2* to chose one of path (1)–(6).

The method in FIG. 17B adapts the method in FIG. 17A to the particular data-path shown in FIG. 1. Some of the arbitrary choices mentioned above in the sequence of steps with respect to the methods of FIGS. 16 and 17A can be chosen in a particular way to assist in minimizing hardware requirements for a particular data-path adaptation. This has been done in FIG. 17B. Some of the Steps represented in FIGS. 16 and 17A have been broken into a plurality of substeps. Therefore, FIG. 17B handles the reading of a pointer length prior to either the bypassing or the reading of the pointer bytes. In FIG. 16, identity is observable among some of the steps such as 209, 224, and 225. This identity permits these steps to be performed by a common operation in the flow diagram of FIG. 17B.

Each box in FIG. 17B is followed by a testing or comparing operation for organizing the flow diagram operations for a minimum of clock cycles. They are identified respectively in FIG. 17B as clock cycles CO through C12. Respective clock cycles are broken down into clock phases which can be performed by a micro-order, which is a transfer between an output gate and an input gate. Each micro-order generally performs one of the expressions shown in a box in FIG. 17B for operation in the data-path shown in FIG. 1.

The last two digits in the reference numbers in FIG. 17B correspond to the last two digits in FIG. 16 for items having similar Steps. Thus, in FIG. 17B, Step 301 performs the same function as Step 201 in FIG. 16. FIG. 17B is an adaption of the flow diagram of FIG. 16 to a data-path represented by FIG. 1.

HARDWARE SEARCH SYSTEM

Briefly, the search-system data-path in FIG. 1 has a Compressed Index stored on an I/O Device 350. The Search Argument (SA) may be stored elsewhere, such as in the random access store of a Computer System 351. The SA can be provided by a CPU of computer system 351 through a channel *351a* to a Control Device which includes controls for executing the subject invention.

An I/O Control Interface 353 connects the I/O device 350 to the Control Device data-path in FIG. 1. The data-flow bytes X of the Compressed Index are read from an I/O Device 350 to an I/O-Control Interface 353. The X-byte stream from I/O Device 350 is inverted at the output of an Interface register $\bar{X}$ to its ones-complement form $\bar{X}$ which is provided to an output bus 361. Each byte X is gated from bus *351a* to a response to an Ingate signal IG($\bar{X}$)–1 received on a control line 362. That is, each $\bar{X}$-byte continues to be presented on line 361 until the next Ingate signal IG($\bar{X}$)–1 is received by a gating control circuit RC, when the next CK byte is needed. Before each $\bar{X}$-byte is transmitted from the device 350 to Interface 353, it is preceded by a clocking pulse $C_L$ which is presented from bus *351b* to interface line 363. The Ingating signal IG($\bar{X}$)–1 is generated using the clocking pulse $C_L$, and this will be discussed later in more detail.

An Input CPU-Control Interface *354a* receives bytes at a gate Y, which include the Search Argument (SA) bytes. Each A-byte is provided from gate Y in response to an Ingate signal IG(Y) provided on a control line 357 which requests each A-byte. An existence signal *e* is provided to lead 358 to indicate that an A-byte is to follow from source Y. Signal *e* may be represented by a signal level that goes down when bytes are to follow and remain down as long as bytes are being transmitted from source Y. The true output of gate Y is provided to a bus 356. A Start signal S is provided on lead 359 from Interface *354a* to begin a search operation. Signal S may be generated in response to a CPU instruction, a channel command, or a CPU interruption.

An output Control-CPU Interface *354b* is provided for the transmission of pointer bytes R from an interface register R to the CPU 351. A gating circuit $W_R$ receives an Ingating Signal IG(R) on a lead 367 each time a byte on an Adder Out bus 377 is to be stored into Interface register R for transmittal to the CPU 351. A signal END on control line 368 indicates that no more bytes are to follow on bus 377 for ending the current search.

The Search Control data-path in FIG. 1 requires that the L- and F-fields of each CK be transmitted at different times, such as when the L-field is transmitted as a byte followed by a byte containing the F-field. Three byte size registers are provided; they are an $E_C$ register 371, an L-register 372, and an A-register 373. The content of register 371 is the true binary value of $E_C$, the content of register 372 is the twos-complement of the number of K-bytes remaining of the current CK, and the content of register 373 is the true binary value of A.

Each A-byte transmitted from source Y is gated into A-register 373 by an Integrating IG(Y).

The twos-complement of the L-byte in each CK received from source $\bar{X}$ is provided to L-register 372 by passing the byte through an Adder 376 while adding a hot one (IG(+1), and an Adder Latch H using Ingating signal IG($H_R$), and then to L-register 372 using Ingating signal IG(L) while no signal is then provided to the other input to the Adder.

The Adder and its output bus transmits signals one byte wide. Thus Adder 376 is capable of adding two inputs, each one byte wide; and it provides their sum in its Adder Latch H. The sign of the sum is provided by an overflow register position G, in which a zero state indicates a positive result in Latch H, and a one bit indicates a negative result in Latch H. The negative state is provided by an overflow when using binary compliment addition to obtain a subtraction or comparison operation. A hot-one signal IG(+1) is provided to convert a ones-complement signal into a binary complement signal for a subtraction or comparison operation. The complementary signal is provided to the right leg of the adder while a true signal form is received by the left leg of the adder. An outgate signal OG(H) is received by Latch H for setting into it the sum of the Adder input, which sum is then outgated to the Adder Out bus 377.

The overflow sign position G is connected as an input to a Clock Control circuit 382, as also is the complementary signal $\bar{G}$ obtained from an Inverter I.

A Zero Tester 378 is connected to Adder Output bus 377 and it tests every adder output byte for a zero state. It is NOR circuitry which provides a zero output if any one bit is provided to its input. The Tester output signal E and its complement $\bar{E}$ are provided to a trigger 381 through a gate which can be activated by signal IG(T). The trigger provides true and complementary output signals T and $\bar{T}$. Trigger T retains a zero test indication until it receives the next signal IG(T). Tester 378 tests only the zero state of the result in Latch H without the sign position G, which is not provided to Bus 377. Signals E, $\bar{E}$, T, and $\bar{T}$ are provided as inputs to clock controls 382.

Equal Counter Register ($E_C$) 371 stores the total number of equal bytes sensed during comparisons of A-bytes and K-bytes during a search for a Search Argument SA.

Figure 9B:
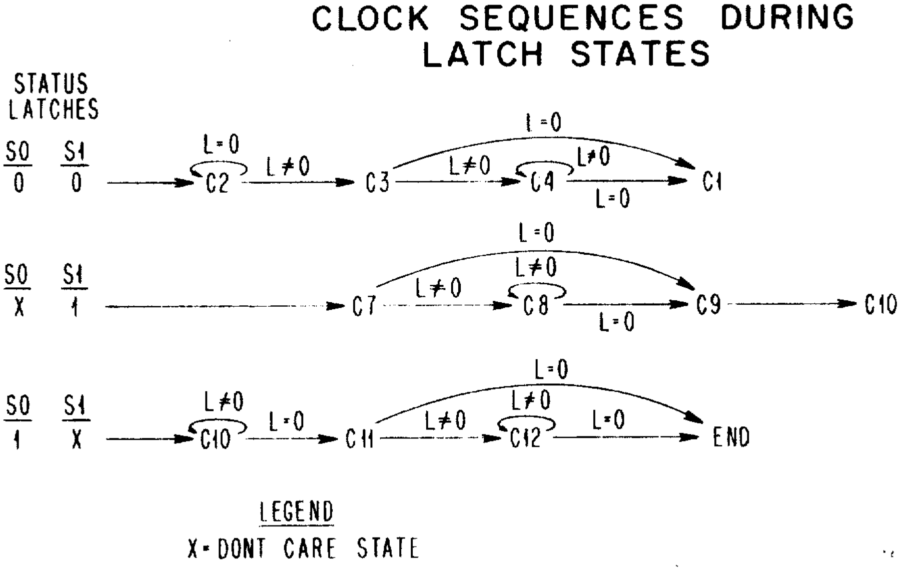

The table in FIGS. 8A, B, and C are titled "Search Mode Clocked Data Transfers." It represents the timing for the gating to obtain the data transfers required within the data-path shown in FIG. 1. In the table, the timing is represented by a respective Clock Cycle and a respective Clock Phase within each cycle. The gating signal reference symbols in the table comprise OG for outgating, IG for ingating, and BM for Branching Matrix operations which occur within the Clock Controls 382. Post-fixed with each operator is an item in parenthesis representing a register to which the prefix operator IG, OG, or BM applies. For example, OG(A) represents outgating register A. Each register gate in FIG. 1 has a control line represented in the table "Clocked Data Transfers." For example, the A-register 373 has an output gate to which a control line OG(A) is connected which when energized, causes the contents of register 373 to be outgated to bus 374. Similarly, $E_C$ register 371 has an input gate and an output gate. A control line IG($E_C$) is connected to its input gate and activation of the IG($E_C$) signal causes loading into register 371 of the electrical states Adder Out Bus 377 which are determined by the output from Adder Latch H. The outgating of register 371 by signal OG($E_c$) occurs simultaneously with the F-signal (on line 361 by ingate signal IG($\bar{X}$) in accordance with step 303 in FIG. 17B, so that adder 376 can perform the $E_C$:F comparison while F is being ingated, thereby eliminating the need for any extra register to store the inputed F-signal. Thus, each of the operations in the table applies to a corresponding Control line in FIG. 1. Each BM symbol operator in the table has in parenthesis a logic circuit item performed by the BM statement, in which a symbol (&) is an AND circuit operator, and a symbol (+) is an OR circuit operator. The BM circuit logic functions at clock signal C 1.4 control the result of the $E_c$:F comparison step 303 in FIG. 17B to choose one of the six branch exit paths (1)–(6) from step 303. Each BM operation statement in the table results in entering a clock cycle which is indicated on the right side of each BM statement, where a resulting operation may be indicated resulting from execution of the left-hand part of the statement. The left number in parenthesis for the BM statements at the end of Clock Cycles C1 and C5 represent the paths (1)–(13) shown in FIG. 16, and 17A and B chosen by the existence of the conditions represented in the parenthesis with the respective BM operators. BM operand symbols are provided within its parenthesis, such as T which represents the current state of the Zero-Test trigger 381 in FIG. 1. The BM operands S0 and S1 represent the current state of a pair of Clock Sequence Status Latches 620 and 630 in FIG. 5. FIG. 9B represents the control over the Basic Clock Sequence caused by different settings of Latches S0 and S1, in which the X symbol represents a "don't care" state for a Latch. FIG. 17B shows the entry points for these S0, S1 states. In the table, END represents ending the search operation for the current Search Argument (SA).

The overall clock sequencing for FIG. 17B is illustrated in FIG. 9A. This sequencing is obtained with the Clock Circuit shown in FIG. 7.

Figure 2:
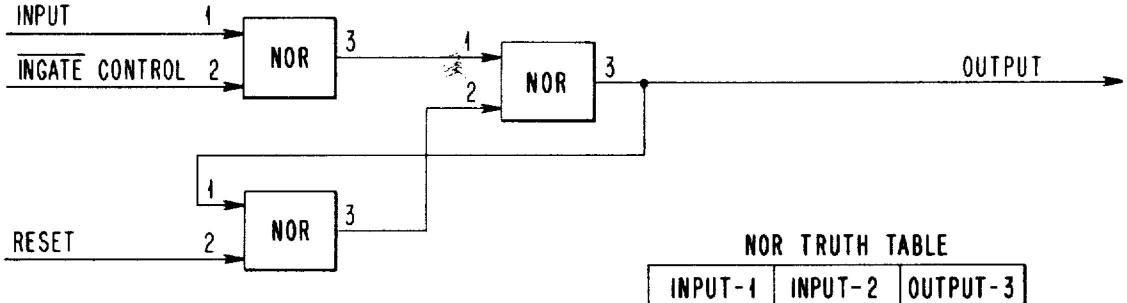
FIG. 2 represents a NOR latch circuit and its truth table, which may be used as a basic building block for the data-path system.

FIG. 2 illustrates a NOR latch and its Truth Table, which is a conventional circuit. This latch circuit can be used to construct each bit position within each register and latch in FIG. 1.

The overall control circuit layout is shown in FIG. 3 which identifies other FIGS. 4–7, in which detailed parts of the control circuit are shown. Thus FIG. 5 illustrates Branching Matrix circuits for controlling the states of Latches, S0 and S1. The Latch outputs are applied to the Clock Starting Controls in FIGS. 6A and B to control unique exits from common clock cycles C 2/10, C 3/7/11, and C 4/8/12. When leaving one of these common clock cycles, the choice of the next clock cycle to be started is dependent upon the state of Latches S0 and/or S1.

The clock circuits shown in FIG. 7 are started by the outputs of FIG. 6A and B. Each clock circuit 400–407 comprises a conventional ring or shift-register which is open-ended, and with its number of stages equal to the number of output phases shown in FIG. 7. The start input connects to the first stage of the respective shift register and sets a one into it in response to receiving a respective Start Signal from FIG. 6A or B. The one bit is shifted along by shift pulses received from an oscillator 411 through a gate 410.

The shift pulses comprise the positive one-half cycles of the oscillator cycles ($O_T$).

A Clock Trigger 412 controls when shift pulses can pass through gate 410. When set, the true (T) output of Trigger 412 enables gate 410. It is set in response to a $C_L$ pulse from I/O-Control Interface 353 in FIG. 18A. A $C_L$ pulse precedes or occurs at the beginning of each byte provided from I/O Source 350.

The $C_L$ pulse setting operation is phase-controlled by an AND-gate 414 which receives each $C_L$ pulse and a pulse generated by a differentiating circuit 413 at the rise of an $O_F$ cycle, which occurs at the fall of an $O_T$ shift pulse provided to gate 410. Thus one-half of an $O_T$ oscillator cycle exists in the down state (while the $O_F$ cycle is in the up state) before the next shift pulse (the positive one-half oscillator cycle) is provided to gate 410. Hence the control functions of circuits 413, 414, 412, 422, and 410 can respond by switching during the $O_T$ down time before the next shift pulse is provided. Differentiating circuit 413 receives the opposite-phased ($O_F$) output from Oscillator 411 relative to the True $O_T$ phase provided as the shift pulses.

The oscillator pulse rate is preferably six or more times faster than the byte rate of the I/O Device 350, which is the rate of the $C_L$ pulses. Hence any clock cycle can be shifted through all phases (C 4/8/12 has a maximum of five phases), before the next $C_L$ pulse can be provided.

It is necessary to be able to delay the clocking operations at various times to await the next $C_L$ pulse for synchronizing the next clock cycle. This delay occurs after each clock phase which requests the next I/O byte by providing a signal IG($\bar{X}$) on lead 421 from FIG. 4 to gate 422 in FIG. 7. This delay begins when the fall of the IG($\bar{X}$) clock phase is sensed by Differentiating circuit 413 providing a pulse at that time to activate gate 422 to reset Clock Trigger 412. A reset input to trigger 412 overrides a simultaneous set input and sets trigger 412. Each $C_L$ pulse has a duration longer than 1½ $O_T$ cycle. The IG($\bar{X}$) signal is active for only the positive half of an $O_T$ cycle.

The IG($\bar{X}$) signal is also provided through a Delay circuit 416 to an AND-gate 417 enabled by the F-output from Trigger 412. Hence circuit 416 must have a delay exceeding the reset time of Trigger 412 for the pulse to pass through gate 417. This pulse generates the IG($\bar{X}$)–1 signal on lead 362, which is connected to Interface Circuit $R_C$ in FIG. 1 to gate in the next CK byte into register $\bar{X}$.

The A-bytes of the Search Argument are provided in response to a signal IG(Y) generated in FIG. 4 as a result of Clock Phase C0.2 or C6.2. Signal IG(Y) activates an Interface Request Circuit $R_A$ which signals the Computer System 351 to send the next A-byte. The A-byte must be received by gate circuit Y within Interface 354a and transferred to the A-register 373 before clock phase 5.3 when the OG(A) signal outgates that A-register byte for processing. Hence the C0.2 request by IG(Y) is followed by five clock cycles before the A-byte is called by signal OG(A). However the C6.2 clock phase request of IG(Y) is followed by one clock cycle of time before the A-byte is called by signal OG(A), and this is the limiting case of computer response to circuit $R_A$.

The data-flow control signals from FIG. 4 are applied to the data path gates in FIG. 1 with the clock-phase timings shown in FIGS. 8A, B, and C. FIG. 9A represents the overall available sequencing among the clock cycles FIG. 9B represents the restricted clock sequencing available during a given state of Clock Status Latches S0 and S1.

EXTENDED CK FIELD EMBODIMENT

In practice, the average number of K-bytes in CK's has been observed to be small and largely independent of the byte length of the corresponding UK's. Furthermore, for many applications, the average number of factored bytes is also small. A second embodiment exploits this by treating CK's in which the number F of factor bytes, and the number L of K-bytes may be represented by a single byte, thus reducing the length of CK's. A multiple-byte representation for F and L is used whenever F, L, or both, are not representable by parts of a single byte. Thus four representations of F and L are possible, which are shown by example in FIGS. 26A–D. In each of these Figures, the first CK byte is split into two one-half byte parts of four bits each. A four-bit field represents a decimal maximum of 14, where 15 is used as an extender code for a respective field to indicate that the respective field will be found in a following extender byte of eight bits which can represent values up to but not including 256.

Figures 26A, 26B, 26C, 26D:
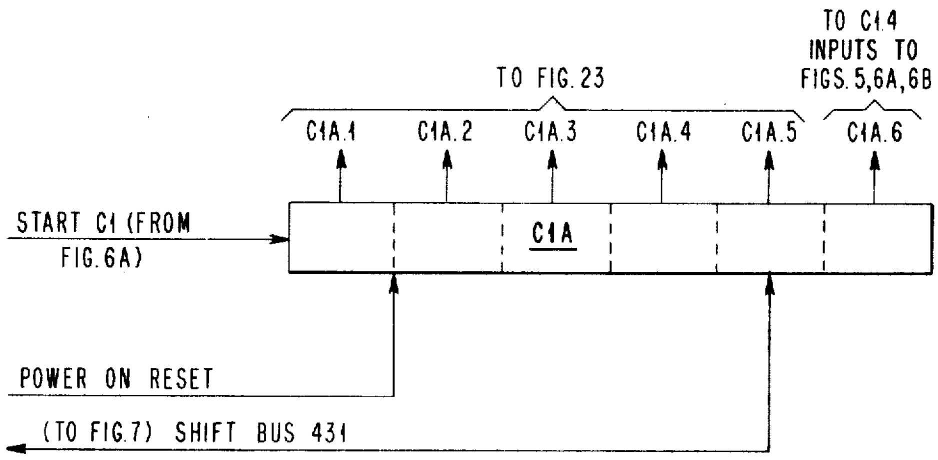

FIG. 26A shows a CK format with both $F<15$ and $L<15$, where F and L are represented in the upper and lower half-bytes, respectively, of the first CK byte.

FIG. 26B shows a CK format with $F<15$ but $L \geq 15$, where F is represented in the high-order half of the first byte, and L is represented as the second byte of the CK. The low-order half of the first byte (normally the L-field) contains an all-ones (15) code which denotes the existence of the L-byte following.

FIG. 26C shows a CK format with $F \geq 15$ but $L<15$, where F is represented as the second byte of the CK, whereas L is represented in the low-order half of the first byte. The first half-byte and the CK (normally the F-field) contains an all-ones (15) code denoting the existence of the subsequent F-byte.

FIG. 26D shows both $F \geq 15$ and $L \geq 15$, where the entire first byte contains ones (normally the F- and L-fields) denoting the existence of subsequent L- and F-extender bytes, in that order.

The second embodiment is described as a modification of the first. FIGS. 18 and 19 illustrate the modification. FIG. 18 replaces the sequence in FIG. 17A between point 701 and points 722–724, while FIG. 19 replaces the sequence of FIG. 17B lying between points 801 and 802–807 (related to the handling of F and L.)

The second embodiment is executed by the data path shown in FIG. 20. Changes from FIG. 1 include: half-byte paths between the I/O device interface 353 and the Adder 376A, the half-byte register Q and its gating IG($HH_R$) to the adder, two half-byte zero testers 395 and 396, and gating IG(1111) of four one bits to the high-order bit-positions to the Adder 376A.

FIG. 21 shows a layout configuration for the Special Clock and Controls 840 in FIG. 20 and also indicates thereon the Figure numbers in which detailed circuit positions are shown.

In FIG. 21 Special Clock Circuit 855 and Special Gating Controls 851 are combined with Clock and Controls Circuits 852, 853, and 854 of which the latter were also used by the previously described data path embodiment in FIGS. 1 and 3. Thus the Figures referenced by blocks in FIG. 3 are also referenced by blocks in FIG. 21, which includes the Branching Matrix and Status Latch Controls in FIG. 5, the Clock Starting Controls in FIG. 6A and B, the Clock Circuits of FIG. 7, and the Data Flow Controls of FIG. 4. However the connective combination among circuits 852, 853, and 854 in FIG. 21 is different from their connective combination in FIG. 3.

Clock 855 in FIG. 25 generates Clock Cycle C1A and is combined with the clock circuits shown in FIG. 7. The function of Clock C1 in FIG. 7 is replaced entirely by Clock C1A in FIG. 25, the function of the other Clocks 0 and 2–9 in FIG. 7 having the same function. Clock C1A is detailed in FIG. 22, which replaces only the functions detailed for Clock 1 in FIGS. 8A, B, and C.

FIG. 19 is a detailed method representing the steps performed in the data path of FIG. 20 by the six phases of clock cycle C1A.

The two half-byte paths 390 and 391 in FIG. 20 between the I/O device interface 353 and the Adder 376A are used together in lieu of the full-byte path 361 in FIG. 1. The other clocking sequences C0 and C2–C9 in FIG. 8A, B, and C are used to control the data path in FIG. 20.

During the first phase of Clock C1A (i.e., C1A.1) in FIG. 22, the first byte of a CK is requested by raising IG($\bar{X}$); the two half-bytes $\bar{X}_L$, $\bar{X}_R$ presented at the device interface 353 are treated separately to accommodate normal half-byte F- and L-fields in FIGS. 26A–D. Hence the Left half-byte $\bar{X}_L$ can contain the half-byte F-field, while the Right half-byte $\bar{X}_R$ can contain the L-field. The right half-byte $\bar{X}_R$ during clock phase C1A.1 is gated through Adder 376A along with four high-order ones, i.e., IG(1111) to provide the catenation of $\bar{X}_R$ and the high-order ones, which are summed with the hot one IG(+1) to obtain the eight-bit binary complement of $X_R$, that is passed to register L. Thus, the half-byte L quantity is placed in register L in two's-complement form. If the true value of L is zero, the two's complement will be zero, ignoring the state of overflow latch G which is not inputed to Tester 378.

Also during C1A.1, two zero tests are performed on L. Zero Tester 378 determines the zero or nonzero state of the Adder's output that is ingated by IG(T) into latch T, providing a means to later test the state of L. If T is set to one, L is zero if T is zero, L is not zero. The zero state of $\bar{X}_R$ is also sampled by a tester 396, and the result stored in status latch S0 which is otherwise not used during the operation of Clock 1A. Since $\bar{X}_R$ is the one's complement of the half-byte L-quantity, $\bar{X}_R$ comprises all-zero bits when L is 15. Hence an affirmative zero indicated by tester 396 indicates an L=15 code and that a full-byte extended representation of L follows. In this case, the quantity placed in the L-register is meaningless and will be replaced by the extended L-quantity.

The half-byte register Q receives the high-order left half-byte $\bar{X}_L$. If nonzero $\bar{X}_L$ represents F. Thus register Q contains either F or an indication that a full-byte extended representation of F will follow.

Clock phase C1A.2 merely insures that IG($\bar{X}$) falls for a clock phase so that its rise during the next phase is recognized by the I/O device interface. Whereas if IG($\bar{X}$) is dropped for only a short period, the interface may not recognize that another CK byte is required.

Clock phase C1A.3 controls the acquisition of the full-byte extended representation of L, if any. If S0 is zero, no gating occurs. If S0 is one, IG($\bar{X}$) is raised to request the next byte of the CK. Both halves $\bar{X}_L$, $\bar{X}_R$ of the extended L-byte are routed as a catenation to the adder by means of the IG($HH_L$) and IG($HH_R$) control signals. The catenation is summed with a hot one and routed through latch H to register L. The zero state of the sum is detected by Tester 378 and retained by setting latch T.

Clock phase C1A.4 ensures that IG($\bar{X}$) falls for a clock phase, in case IG($\bar{X}$) was raised during C1A.3. This assures recognition of the next CK byte at Interface 353 during C1A.5.

Clock phase C1A.5 compares the contents of register $E_c$ with either the half-byte or full-byte representation of F. Register $E_c$ is gated to the left side of Adder 376A. If zero tester 395 indicates a nonzero state in register Q, four high-order ones are gated by an IG(1111) control signal into the right side of Adder 376A. The hot one IG(+1) is also presented to the adder. The triple sum is retained in latch H to represent the comparison between $E_c$ and the half-byte F.

But if zero tester 395 indicates a zero state in Register Q, the full-byte representation of F is requested by raising the IG($\bar{X}$) Control Signals. Both half-bytes ($\bar{X}_L$, $\bar{X}_R$) representing the extended F-byte are received and routed to the right side of the Adder by IG($HH_R$), as is a hot one by IG(+1). The triple sum is retained in latch H to represent the result of the comparison between $E_c$ and the extended F-byte.

Clock phase C1A.6 effects the six-way branch resulting from the comparison of $E_c$ and F, and the zero test of L stored in trigger T, as was done in all prior described embodiments.

The Special Gating Control circuits shown in FIG. 23 are one of the many means for generating the gating control signals needed during clock cycle C1A.

FIG. 21 shows how controls 851 receive phases C1A.1, C1A.3 and C1A.5. Controls 851 also receive the $IG(H_R)$ output from controls 854 to operate the gates $IG(HH_L)$ and $IG(HH_R)$ in unison for clock cycles C0 and C2-C9. The Data Flow controls 854 only receive clock phases C0.1 through C0.3 and C2.1 through C9.2. C2.1 through C9.2 are provided to clock controls 852, which also receives at its C1.4 input the C1A.6 phase signal from Special Clock Circuit 855. The Start C1 signal from controls 852 is provided to the C1A input to Special Clock circuit 855 to start the clock cycle C1A in lieu of C1.

The outputs of Controls 851 and 854 are provided as inputs to Special Data Flow Combining Controls 856, shown in one detailed circuit form in FIG. 24. Circuits 856 select among the two sets of Controls 851 and 854 for the gating function needed in the Data Path of FIG. 20 to obtain a total operation for all Clock cycles according to the method of the second data path embodiments.

What is claimed is:

1. In a method of searching a sorted index of machine readable compressed keys representing different items of information, in which each compressed key includes a factor field containing a byte-count which provides a relationship between each compressed key and its adjacent compressed key, comprising the steps of machine-comparing the content of the factor field of each compressed key entered during a search with a current setting of an equal counter, said current setting being the setting existing for the equal counter when the search enters said compressed key, and generating a factor signal indicating the relationship between the content of the factor field and the setting of said equal counter to control search decision operations for the compressed key entered during the search.

2. In a method of searching as defined in claim 1, comprising the steps of ending the search of said compressed index having an ascending sequence at any compressed key in which said factor signal indicates the content of the factor field is less than the current setting of said equal counter, and retrieving an item of information represented by the compressed key detected by said ending step.

3. In a method of searching as defined in claim 1 comprising the step of machine-accessing the next compressed key in said compressed index to continue the search with the same equal counter setting in response to said factor signal indicating the content of said factor field is greater than said equal counter setting.

4. In a method of searching as defined in claim 1, in which at least some of said compressed keys include a key byte field containing at least a high-order difference byte, further comprising the step of:

machine-transferring a key byte from a compressed key beginning in sequence at its highest order key byte, in response to said factor signal indicating equality between the content of the factor field and the current setting of said counter.

5. In a method of searching as defined in claim 4, further comprising the steps of machine-fetching a first search byte, which is a byte of a search argument at its highest order byte-position, and machine-comparing said search byte with said key byte.

6. In a method of searching as defined in claim 5, further comprising the step of machine-accessing the next compressed key for an ascending index to continue the search for said search argument in response to said key byte being less than said search byte.

7. In a method of searching as defined in claim 5, further including the step of ending the search for said search argument by retrieving the item of information represented by a current compressed key in response to said key byte being greater than said search byte.

8. In a method of searching as defined in claim 10, including the steps of machine-signaling said next search byte as being the last byte in the search argument, and ending the search for the search argument in response to said machine-comparing step indicating said next search byte is equal to said next key byte.

9. In a method of searching as defined in claim 5, including the steps of machine-signaling that more search bytes exist after the current search byte, said machine-comparing step comparing each next key byte in the current compressed key with a next search byte as long as equality is found between each key byte and each search byte, incrementing the setting of said equal counter for each equality between each key byte and each search byte, and machine-accessing a next compressed key when a last key byte in the current compressed key indicates equality with a search byte that is not the last byte in the search argument, whereby the search in the compressed index is continued for the current search argument.

10. In a method of searching for a search argument using a compressed index of machine-readable compressed keys representing different items of information, each compressed key having at least a factor-byte-count field and a key byte-count field, including the steps of machine-reading bytes from said compressed index including the factor-byte-count field and the key-byte count field for each compressed key being searched, including any key bytes in any compressed key being searched, with a first key byte being a highest order key byte of a compressed key, initially setting a counter to an initialized state, machine-comparing the first key byte in said compressed index with a highest order byte of said search argument, generating a search-control signal indicating whether the key byte is less than, equal to, or higher than the byte of said search argument, and changing said counter in response to said search-control signal indicating said key byte is equal to the byte of said search argument.

11. In a method of searching as defined in claim 10 upon entering another compressed key which then becomes the current compressed key, further comprising the steps of said machine-reading step reading the factor byte-count field of the current compressed key, machine-comparing the factor byte-count field with a current setting of said counter, and generating a factor-control signal indicating whether the factor-byte-count field is less than, equal to, or higher than the current setting of said counter.

12. In a method of searching as defined in claim 11, further comprising the step of machine-accessing a next compressed key in response to said factor-control signal indicating said factor-byte-count field is greater than the setting of said counter.

13. In a method of searching for a search argument as defined in claim 11, in which said factor-control signal indicates a current factor-byte-count field is less than a current setting of said counter, further comprising the step of signaling for a retrieval of an item of information represented by the current compressed key, and ending the search for said search argument in said compressed index.

14. In a method of searching for a search argument as defined in claim 13, further comprising the steps of retrieving said item of information represented by said compressed key in response to said signaling step, comparing the retrieved item of information with said search argument for generating an equal or nonequal signal therefrom, and completion signalling a verification in response to said equal or nonequal signal, whereby the equal signal verifies the retrieval, and the nonequal signal verifies that the search argument is not represented in said compressed index.

15. In a method of searching for a search argument as defined in claim 11, in which said factor-control signal indicates said factor-byte-count field is equal to the current setting of said counter, further comprising the steps of machine-detecting the current compressed key for a nonexistence of key bytes and providing a nonexistence signal in response thereto, signaling for a retrieval of an item of information represented by the current compressed key in response to said nonexistence signal, and ending the search for said search argument in said compressed index.

16. In a method of searching for a search argument as defined in claim 11, in which said factor-control signal indicates said factor-byte-count field is equal to the current setting of said counter, further comprising the steps of machine-accessing a next search byte at a position in said search argument from its highest order position determined by the current setting of said counter, machine-comparing said search byte with a highest order key byte in the current compressed key, and generating a search-control signal in response to said machine-comparing step for signaling whether said search byte is greater than, less than, or equal to said key byte.

17. In a method for searching as defined in claim 16, in which said search-control signal indicates said search byte is greater than said key byte, including the steps of bypassing any remaining bytes within or associated with the current compressed key, and machine-accessing a next compressed key in the index to continue the search for said search argument.

18. In a method for searching as defined in claim 16, in which said search-control signal indicates said search byte is less than said key byte, including the steps of registering a pointer address associated with the current compressed key, said pointer address having the location of an item of information represented by said current compressed key, and ending the search in said compressed index for said search argument.

19. In a method of searching for a search argument as defined in claim 16, further comprising the steps of signaling that more search argument bytes remain after the current byte of the search argument, indicating that the current key byte is the last key byte of the current compressed key, and machine-accessing a next compressed key in the index in order to continue the search for said search argument.

20. In a method of searching for a search argument as defined in claim 11, in which said factor-control signal indicates said factor-byte-count signal is equal to the current setting of said equal counter, further including the steps of reading the key byte-count field of the current compressed key into a key-count register, machine-accessing a current search byte at a position in said search argument represented by the current setting of the counter, machine-reading a current key byte in the current compressed key in a sequence beginning with the highest order byte, machine-decrementing the setting of said key-count register for each current key byte obtained by said machine-reading step, the resultant setting of said register representing the remaining number of uncompared key bytes following the current key byte in the current compressed key, machine-comparing the current key byte and the current search byte to generate a search-control signal that indicates the current search byte is greater than, less than, or equal to the current key byte, and machine-testing the current setting of said key-count register as changed by said machine-decrementing step to provide byte-remaining signal of whether or not more key bytes remain after the current key byte in the current compressed key.

21. In a method of searching for a search argument as defined in claim 20, in which said search-control signal indicates the current search byte is greater than the current key byte, further comprising the steps of machine-skipping a number of key bytes represented by the current setting of said key-count register in response to the byte-remaining signal, machine-skipping any associated bytes following the current compressed key, and machine accessing a next compressed key in the index to continue the search for said search argument.

22. In a method of searching for a search argument as defined in claim 20, in which said search-control signal indicates the current search byte is less than the current key byte, further comprising the steps of machine-skipping a number of key bytes represented by the current setting of said key-count register in response to said byte-remaining signal indicating the existence of remaining key bytes in the current compressed key, and machine-registering a pointer associated with the current compressed key in order to end the search in the compressed index for the current search argument.

23. In a method of searching for a search argument as defined in claim 20, in which said search-control signal indicates the current search byte is equal to the current key byte, including the step of machine-signaling a last-byte signal indicating whether or not more search bytes exist in the search argument after the current search-byte.

24. In a method of searching for a search argument as defined in claim 23, in which said last-byte signal indicates no more search bytes remain for the current search argument, including the steps of machine-skipping a number of key bytes represented by the current setting of said key-count register in response to said byte-remaining signal indicating the existence of remaining key bytes in the current compressed key, and machine-registering a pointer associated with the current compressed key after said machine-skipping step is completed, whereby the search is ended in the compressed index for the current search argument.

25. In a method of searching for a search argument as defined in claim 23, in which said last-byte signal indicates no more search bytes remain to be handled for the current search argument, including the steps of said machine-testing step indicates no more key bytes exist for the current compressed key, machine-skipping a pointer and any following bytes associated with the current compressed key in the compressed index in response to said last-byte signal, and to said byte-remaining signal indicating the current key byte is the last in the current compressed key, machine-skipping the factor-byte-count field, the key-byte-count field, and the key bytes of the next compressed key, and machine-reading a pointer associated with said next compressed key in response to said last-byte signal and said byte-remaining signal, whereby the search is ended in the compressed index for the current search argument.

26. A system for searching an index of machine readable compressed keys representing different items of information, in which each compressed key includes a factor field containing a byte-count relationship between each compressed key and its adjacent compressed key, comprising an equal counter, means for comparing the content of the factor field of each compressed key entered during a search with a current setting of said equal counter, and means for generating a factor signal indicating the relationship between the factor field content and the setting of said equal counter.

27. A system for searching as defined in claim 26, in which said compressed index has an ascending sequence, comprising means for ending the search of said compressed index at any compressed key for which said factor signal indicates the factor field content is less than the current setting of said equal counter, and means for retrieving an item of information represented by the compressed key signaled by said means for ending the search.

28. A system for searching as defined in claim 26 comprising means for accessing the next compressed key in said compressed index to continue the search with a same setting of said equal counter in response to the content of said factor signal indicating said factor field is greater than said equal counter setting.

29. A system for searching as defined in claim 26, in which at least some of said compressed keys include a key byte field containing at least a high-order difference byte, further comprising means for transferring a key byte from a compressed key beginning in sequence from its highest order key byte in response to said factor signal indicating equality between the content of the factor field and a current setting of said equal counter.

30. A system for searching as defined in claim 29, further comprising means for fetching one search byte at a time from a search argument beginning in sequence from its highest order byte-position in response to the factor signal indicating equality, and means for comparing said search byte with said key byte from said transferring means in response to said factor signal indicating equality to generate a search control signal.

31 . A system for searching as defined in claim 30, further comprising means for accessing the next compressed key in an ascending index to continue the search for said search argument in response to said search-control signal indicating said key byte is less than said search byte.

32. A system for searching as defined in claim 30, further including means for ending the search for said search argument by retrieving the item of information represented by a current compressed key in response to said search-control signal indicating said key byte is greater than said search byte.

33. A system for searching as defined in claim 34, including means for signaling said next search byte as being the last byte in the search argument, and means for ending the search for the search argument in response to said search-control signal indicating said next search byte is equal to said next key byte.

34. A system for searching as defined in claim 30, including means for signaling that more search bytes exist after the current search byte, said comparing means also comparing each next key byte in the current compressed key with a next search byte as long as equality is signalled by the search control signal, means for changing the setting of said equal counter for each equality between each key byte and each search byte signaled by said search-control signal, and means for accessing a next compressed key when the search-control signal for a last key byte in the current compressed key indicates equality with a search byte that is not the last byte in the search argument, whereby the search in the compressed index is continued for the current search argument.

35. A system for searching for a search argument using a compressed index of machine-readable compressed keys representing different items of information, each compressed key having at least a factor-byte-count field and a key byte-count field, including means for reading bytes from said compressed index including the factor-byte-count field and the key-byte count field for each compressed key being searched, with a first key byte being a highest order key byte of a compressed key, an equal counter initially set to an initialized state, means for comparing the first key byte in said compressed index with a highest order byte of said search argument, means for generating a search-control signal indicating whether the key byte is less than, equal to, or higher than the byte of said search argument, and means for incrementing said equal counter in response to said search-control signal indicating said key byte is equal to the byte of said search argument.

36. A system for searching as defined in claim 35 upon entering another compressed key which then becomes a current compressed key, further comprising said reading means reading the factor byte-count field of the current compressed key for indicating a comparative byte location in the search argument, means for comparing the factor byte-count field with a current setting of said equal counter, and generating a factor-control signal indicating whether the factor-byte-count field is less than, equal to, or higher than the current setting of said equal counter.

37. A system for searching as defined in claim 36, further comprising means for accessing a next compressed key in response to said factor-control signal indicating said factor-byte-count field is greater than the setting of said equal counter.

38. A system searching for a search argument as defined in claim 36, in which said factor-control signal indicates a current factor-byte-count field less than a current setting of said equal counter, further comprising means for signaling to begin a retrieval of an item of information represented by the current compressed key in response to said factor-countrol signal, and means for ending the search for said search argument in said compressed index in response to said means for signalling.

39. A system for searching for a search argument as defined in claim 38, further comprising means for retrieving said item of information represented by said compressed key in response to said means for signaling, means for comparing the retrieved item of information with said search argument for generating an equal or nonequal signal therefrom, and means for completion signalling a verification in response to said equal or nonequal signal, whereby the equal signal verifies the retrieval, and the nonequal signal verifies that the search argument is not represented in said compressed index.

40. A system for searching for a search argument as defined in claim 36, in which said factor-control signal indicates said factor-byte-count field is equal to the current setting of said equal counter, further comprising means for detecting the current compressed key for nonexistence of key bytes and providing a nonexistence signal in response thereto, means for signaling for a retrieval of an item of information represented by the current compressed key in response to said nonexistence signal, and means for ending the search for said search argument in said compressed index.

41. A system for searching for a search argument as defined in claim 36, in which said factor-control signal indicates said factor-byte-count field is equal to the current setting of said equal counter, further comprising means for accessing a next search byte at a position in said search argument from its highest order position determined by the current setting of said equal counter, means for comparing said search byte with a highest order key byte in the current compressed key, and means for generating a search-control signal in response to said means for comparing for signalling whether said search byte is greater than, less than, or equal to said key byte.

42. A system for searching as defined in claim 41, in which said search-control signal indicates said search byte is greater than said key byte, including means for bypassing any remaining bytes within or associated with the current compressed key, and means for accessing a next compressed key in the index to continue the search for said search argument.

43. A system for searching as defined in claim 41, in which said search-control signal indicates said search byte is less than said key byte, including means for registering a pointer address associated with the current compressed key, said pointer address having the location of an item of information represented by said current compressed key, and means for ending the search in said compressed index for said search argument.

44. A system for searching for a search argument as defined in claim 41, further comprising means for signaling that more search argument bytes remain after the current byte of the search argument, means for indicating that the current key byte is the last key byte of the current compressed key, and means for accessing a next compressed key in the index in order to continue the search for said search argument.

45. A system for searching for a search argument as defined in claim 44, in which said factor-control signal indicates said factor-byte-count signal is equal to the current setting of said equal counter, further including means for reading the key byte-count field of the current compressed key into a key-count register, means for accessing a current search byte at a position in said search argument represented by the current setting of the equal counter, means for reading a current key byte in the current compressed key in a sequence beginning with the highest order byte, means for decrementing the setting of said key-count register for each current key byte obtained by said means for reading, the resultant setting of said register representing the remaining number of uncompared key bytes following the current key byte in the current compressed key, means for comparing the current key byte and the current search byte to generate a search-control signal that indicates the current search byte is greater than, less than, or equal to the current key byte, and means for testing the current setting of said key-count register as changed by said means for decrementing to provide a byte-remaining signal of whether or not more key bytes remain after the current key byte in the current compressed key.

46. A system of searching for a search argument as defined in claim 45, in which said search-control signal indicates the current search byte is greater than the current key byte, further comprising means for skipping a number of key bytes represented by the current setting of said key-count register in response to the byte-remaining signal, means for skipping any associated bytes following the current compressed key, and means for accessing a next compressed key in the index to continue the search for said search argument.

47. A system of searching for a search argument as defined in claim 45, in which said search-control signal indicates the current search byte is less than the current key byte, further comprising means for skipping a number of key bytes represented by the current setting of said key-count register in response to said byte-remaining signal indicating the existence of remaining key bytes in the current compressed key, and means for registering a pointer associated with the current compressed key in order to end the search in the compressed index for the current search argument.

48. A system of searching for a search argument as defined in claim 45, in which said search-control signal indicates the current search byte is equal to the current key byte, including means for signaling a last-byte signal indicating whether or not more search bytes exist in the search argument after the current search-byte.

49. A system of searching for a search argument as defined in claim 48, in which said last-byte signal indicates no more search bytes remain for the current search argument, including means for skipping a number of key bytes represented by the current setting of said key-count register in response to said byte-remaining signal indicating the existence of remaining key bytes in the current compressed key, and means for registering a pointer associated with the current compressed key after the operation of said means for skipping is completed, whereby the search is ended in the compressed index for the current search argument.

50. A system of searching for a search argument as defined in claim 48, in which said last-byte signal indicates no more search bytes remain to be handled for the current search argument, and said testing means indicates no more key bytes exist for the current compressed key, including means for bypassing any following bytes associated with the current compressed key, any following pointer, and a next compressed key in response to said last-byte signal and said testing means, and means for reading a pointer associated with said next compressed key in response to said last-byte signal and said testing means, whereby the search is ended in the compressed index for the search argument.

51. In a system for searching for a search argument representation in a sorted compressed index in which each compressed index entry contains an upper bound representation of the real index entry it represents, comprising the steps of machine-storing said sorted compressed index, sequentially machine-reading entries of said stored compressed index, machine-comparing corresponding byte positions in said search argument against those of each compressed entry provided by said machine-reading step, said corresponding byte positions of each compressed key being indicated by an upper bound representation, machine-generating a signal in response to any compressed index entry comparing-high with said search argument, and signaling an end to the search of said compressed index at the compressed index entry for which said machine-generating step first provides said signal.

52. A system for searching as defined in claim 51 in which each compressed index entry also has at least one associated pointer address indicating the location of information represented by said entry, further comprising the step of machine-transferring the pointer address of said comparing-high compressed key entry to a predetermined storage location in response to said signal.

* * * * *